United States Patent
Matovic et al.

(10) Patent No.: US 12,352,149 B2
(45) Date of Patent: Jul. 8, 2025

(54) COMPOSITIONS CONTAINING FRICTION REDUCERS AND METHODS OF USING THEREOF IN OIL AND GAS OPERATIONS

(71) Applicant: CHEVRON U.S.A. INC., San Ramon, CA (US)

(72) Inventors: Gojko Matovic, Houston, TX (US); Nabijan Nizamidin, Houston, TX (US); Michael Ogechukwuka Unomah, Midland, TX (US); Do Hoon Kim, Katy, TX (US); Varadarajan Dwarakanath, Houston, TX (US); Taimur Malik, Houston, TX (US); Gayani W. Pinnawala, Katy, TX (US); Dennis A. Alexis, Richmond, TX (US); Samuel Wei-en Lau, Bellaire, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/326,409

(22) Filed: May 31, 2023

(65) Prior Publication Data

US 2023/0383636 A1 Nov. 30, 2023

Related U.S. Application Data

(60) Provisional application No. 63/347,530, filed on May 31, 2022.

(51) Int. Cl.
*E21B 43/267* (2006.01)
*C09K 8/584* (2006.01)
*C09K 8/588* (2006.01)

(52) U.S. Cl.
CPC ............ *E21B 43/267* (2013.01); *C09K 8/584* (2013.01); *C09K 8/588* (2013.01); *C09K 2208/28* (2013.01)

(58) Field of Classification Search
CPC ...................................................... E21B 27/02
See application file for complete search history.

(56) References Cited

U.S. PATENT DOCUMENTS

| 3,811,504 A | 5/1974 | Haferkamp et al. |
| 3,811,505 A | 5/1974 | Flournoy et al. |
| 3,811,507 A | 5/1974 | Flournoy et al. |
| 3,890,239 A | 6/1975 | Dycus et al. |
| 4,463,806 A | 8/1984 | Hurd |
| 5,488,148 A | 1/1996 | Weerasooriya et al. |

(Continued)

FOREIGN PATENT DOCUMENTS

| WO | 2008/079855 A2 | 7/2008 |
| WO | 2011/094442 A1 | 8/2011 |
| WO | 2012/027757 A1 | 3/2012 |

OTHER PUBLICATIONS

Zhang, Jincai, and Shang-Xian Yin. "Fracture gradient prediction: an overview and an improved method." Petroleum Science 14 (2017): 720-730.

(Continued)

*Primary Examiner* — William D Hutton, Jr.
*Assistant Examiner* — Avi T Skaist
(74) *Attorney, Agent, or Firm* — Meunier Carlin & Curfman LLC

(57) ABSTRACT

Described are compositions and methods for use in oil and gas operations. The methods can decrease pressure drop along a lateral segment of a wellbore in an unconventional subterranean formation.

25 Claims, 10 Drawing Sheets

(56) References Cited

U.S. PATENT DOCUMENTS

| | | | |
|---|---|---|---|
| 6,022,843 | A | 2/2000 | Shanks et al. |
| 6,225,267 | B1 | 5/2001 | Eckard et al. |
| 7,629,299 | B2 | 12/2009 | Berger et al. |
| 7,770,641 | B2 | 8/2010 | Dwarakanath et al. |
| 8,211,837 | B2 | 7/2012 | Weerasooriya et al. |
| 8,372,788 | B2 | 2/2013 | Weerasooriya et al. |
| 8,822,391 | B2 | 9/2014 | Weerasooriya et al. |
| 9,422,469 | B2 | 8/2016 | Dwarakanath et al. |
| 9,605,198 | B2 | 3/2017 | Shong et al. |
| 9,617,464 | B2 | 4/2017 | Dwarakanath et al. |
| 9,783,729 | B2 | 10/2017 | Weerasooriya et al. |
| 9,840,898 | B2 | 12/2017 | Kasevich et al. |
| 9,890,627 | B2 | 2/2018 | Kasevich et al. |
| 9,976,072 | B2 | 5/2018 | Shong et al. |
| 10,266,750 | B2 | 4/2019 | Oghena et al. |
| 10,337,303 | B2 | 7/2019 | Dwarakanath et al. |
| 2005/0199395 | A1 | 9/2005 | Berger et al. |
| 2006/0185845 | A1 | 8/2006 | Shpakoff et al. |
| 2006/0189486 | A1 | 8/2006 | Shpakoff et al. |
| 2007/0191633 | A1 | 8/2007 | Berger et al. |
| 2009/0090506 | A1* | 4/2009 | Schafer ............ E21B 27/02 166/278 |
| 2009/0112014 | A1 | 4/2009 | Campbell et al. |
| 2009/0270281 | A1 | 10/2009 | Steinbrenner et al. |
| 2010/0004843 | A1 | 1/2010 | Yu et al. |
| 2010/0292110 | A1 | 11/2010 | Pope et al. |
| 2010/0319920 | A1 | 12/2010 | Pope et al. |
| 2011/0046024 | A1 | 2/2011 | Campbell et al. |
| 2011/0048721 | A1 | 3/2011 | Pope et al. |
| 2011/0059872 | A1 | 3/2011 | Weerasooriya et al. |
| 2011/0059873 | A1 | 3/2011 | Weerasooriya et al. |
| 2011/0071057 | A1 | 3/2011 | Weerasooriya et al. |
| 2011/0100402 | A1 | 5/2011 | Soane et al. |
| 2011/0190174 | A1 | 8/2011 | Weerasooriya et al. |
| 2011/0190175 | A1 | 8/2011 | Steinbrenner et al. |
| 2011/0201531 | A1 | 8/2011 | Sharma et al. |
| 2017/0198202 | A1 | 7/2017 | Shong et al. |
| 2018/0202273 | A1 | 7/2018 | Kasevich et al. |
| 2021/0156210 | A1* | 5/2021 | Nizamidin ............ G01N 11/04 |
| 2023/0167353 | A1* | 6/2023 | Pinnawala ............ C09K 8/602 166/270.1 |

OTHER PUBLICATIONS

Barnes, Julian R., et al. "Application of internal olefin sulfonates and other surfactants to EOR. Part 1: Structure-Performance relationships for selection at different reservoir conditions." SPE improved oil recovery symposium. OnePetro, 2010. SPE-129766-MS https://doi.org/10.2118/129766-MS.

* cited by examiner

Vertical Friction Effect (Water vs FR)
Use of FR allows for higher injection rates
<u>Low Conc. FR Case</u>

Pressure Profile along lateral

Increasing injection rate w/o FR leads to higher heel → toe pressure drop and poor rate distribution in lateral

COMPOSITIONS CONTAINING FRICTION REDUCERS AND METHODS OF USING THEREOF IN OIL AND GAS OPERATIONS

CROSS-REFERENCE TO RELATED APPLICATIONS

The application claims the benefit of U.S. Provisional Application No. 63/347,530, filed May 31, 2022, which is hereby incorporated herein by reference in its entirety.

BACKGROUND

Enhanced oil recovery (EOR) is an increasingly important supplemental technique for recovering oil from a reservoir after primary and secondary recovery. Many hydrocarbon reservoirs trap a significant amount of oil that is bound tightly and difficult to remove. Poor fluid distribution along the lateral segment and into the toe of a wellbore can lead to a decreased hydrocarbon recovery. Therefore, there is a need to improve fluid distribution along the lateral segment and into the toe of a wellbore.

The compositions and methods disclosed herein address these and other needs.

SUMMARY

Provided herein are methods for treating an unconventional subterranean formation. These methods can, for example, decrease pressure drop along a lateral segment of a wellbore in an unconventional subterranean formation, improve fluid distribution along a lateral segment of a wellbore and into a toe of a wellbore in an unconventional subterranean formation, or any combination thereof. These methods can include injecting an aqueous fluid into the unconventional subterranean formation via a wellbore in fluid communication with the unconventional subterranean formation. In some embodiments, the method can further include producing hydrocarbons from the wellbore. In some embodiments, injection of the aqueous fluid can increase a flow of hydrocarbons from the wellbore.

In some embodiments, injection of the aqueous fluid can decrease pressure drop along the lateral segment of the wellbore. The decrease in pressure drop along the lateral segment of the wellbore can be measured as a drag reduction percentage (DR %) calculated using the equation below:

$$DR\ \% = \frac{dP_{water} - dP_{FR}}{dP_{water}} * 100\%,$$

wherein $dP_{water}$ is the calculated value for pressure drop along the lateral segment of the wellbore for water, and $dP_{FR}$ is the pressure drop along the later segment of the wellbore for the aqueous fluid. In some embodiments, the drag reduction percentage (DR %) can be from 50% to 95%.

In some embodiments, the decrease in pressure drop along the lateral segment of the wellbore can improve fluid distribution along the lateral segment and into the toe of the wellbore.

In some embodiments, the pressure drop along the lateral segment of the wellbore can be calculated using the equation below:

$$dP_{FR} = dP_{water} - (DR \times dP_{water}),$$

wherein drag reduction factor (DR) can be from 0.5 to 0.95, wherein $dP_{water}$ is the calculated value for pressure drop along the lateral segment of the wellbore for water, and $dP_{FR}$ is the pressure drop along the lateral segment of the wellbore for the aqueous fluid. In some embodiments, the pressure drop along the lateral segment of the wellbore can be from 10 psi/1000 ft to 600 psi/1000 ft.

In some embodiments, the aqueous fluid can include a well treatment agent; and a friction reducer in a concentration of from 0.1 to 5 gpt.

In some embodiments, the friction reducer can include, for example, a synthetic polymer selected from polyacrylamides, polyacrylic acid (PAA), polyvinyl alcohol (PVA), co-polymers of polyacrylamide (PAM) and 2-acrylamido 2-methylpropane sulfonic acid, or any combination thereof.

In some embodiments, the well treatment agent can include one or more of an acid, an alkali agent, a polymer, a gelling agent, a crosslinker, a biocide, a scale inhibitor, a breaker, a pH adjusting agent, a non-emulsifier agent, an iron control agent, a chelating agent, a corrosion inhibitor, a clay stabilizing agent, a wettability alteration chemical, an antifoam agent (e.g., chemical defoamer), a sulfide scavenger, a mobility control agent, a co-solvent, a surfactant, a surfactant package, or any combination thereof. In some embodiments, the well treatment agent can include one or more surfactant(s).

In some embodiments, the methods can further include monitoring the fluid distribution within the wellbore (e.g., along a lateral segment of the wellbore, within the toe of the wellbore, or any combination thereof) in an unconventional subterranean formation. This can be accomplished using fiber optic equipment, such as fiber optic pressure sensors used to monitor fluid distribution downhole.

In some embodiments, the wellbore can include tubing having an inner diameter of from 1.5 inches to less than 4 inches. In some embodiments, the wellbore can include a casing having a diameter of from 4 inches to 9 inches. In some embodiments, the tubing and/or casing can include a coating layer. In some embodiments, the coating layer can have a roughness of from 1 µm to 50 µm. In some embodiments, the coating layer can include a coating material comprising a thermoplastic, a ceramic, or any combination thereof.

Also described herein are methods for the pressure protection of an existing wellbore that has previously been fractured in proximity to a new wellbore to be fractured. The methods can include injecting an aqueous fluid described herein into the unconventional subterranean formation via the existing wellbore in fluid communication with the unconventional subterranean formation prior to and/or during injection of a fracturing fluid into the unconventional subterranean formation via a new wellbore in fluid communication with the unconventional subterranean formation.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
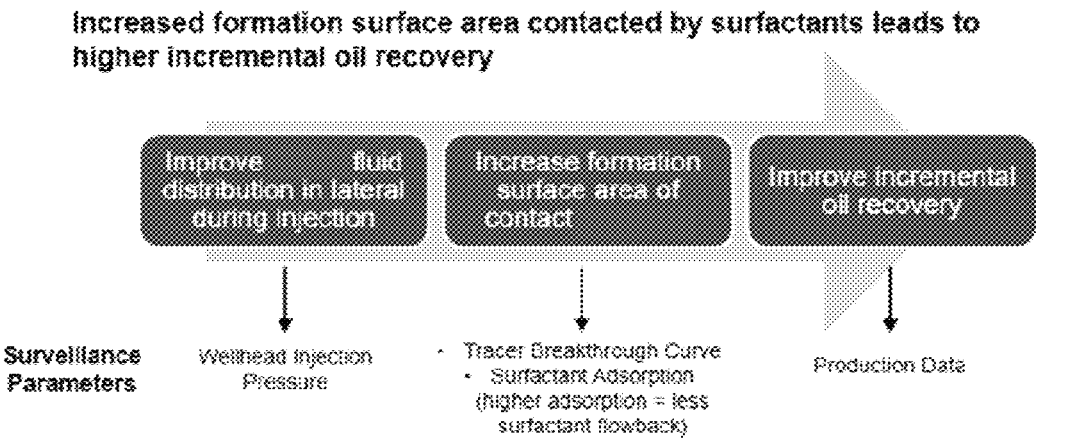
FIG. 1 shows a diagram to increase fluid injection efficiency and lead to improved uplift.

A number of embodiments of the disclosure have been described. Nevertheless, it will be understood that various modifications may be made without departing from the spirit and scope of the invention. Accordingly, other embodiments are within the scope of the following claims.

Definitions

To facilitate understanding of the disclosure set forth herein, a number of terms are defined below. Unless defined otherwise, all technical and scientific terms used herein can have the same meaning as commonly understood by one of ordinary skill in the art to which this disclosure belongs. Unless otherwise specified, all percentages are in weight percent and the pressure is in atmospheres. All citations referred to herein are expressly incorporated by reference.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

The use of the term "about" applies to all numeric values, whether or not explicitly indicated. This term can refer to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) can includes 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Unless defined otherwise, all technical and scientific terms used herein have the same meanings as commonly understood by one of skill in the art to which the disclosed invention belongs. Publications cited herein and the materials for which they are cited are specifically incorporated by reference.

Chemical terms used herein will have their customary meaning in the art unless specified otherwise. The organic moieties mentioned when defining variable positions within the general formulae described herein (e.g., the term "halogen") are collective terms for the individual substituents encompassed by the organic moiety. The prefix $C_n$-$C_m$ preceding a group or moiety indicates, in each case, the possible number of carbon atoms in the group or moiety that follows.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, heteroatoms present in a compound or moiety, such as nitrogen, can have hydrogen substituents and/or any permissible substituents of organic compounds described herein which satisfy the valency of the heteroatom. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound (e.g., a compound that does not spontaneously undergo transformation such as by rearrangement, cyclization, elimination, etc.

As used herein, the term "alkyl" refers to saturated, straight-chained, cyclic, or branched saturated hydrocarbon moieties. Unless otherwise specified, $C_7$-$C_{32}$ (e.g., $C_7$-$C_{28}$, $C_7$-$C_{24}$, $C_7$-$C_{20}$, $C_7$-$C_{18}$, $C_7$-$C_{16}$, $C_7$-$C_{14}$, $C_7$-$C_{12}$, $C_{12}$-$C_{24}$, $C_{12}$-$C_{18}$, $C_{16}$-$C_{24}$, or $C_{12}$-$C_{18}$) alkyl groups are intended. Alkyl substituents may be unsubstituted or substituted with one or more chemical moieties. The alkyl group can be substituted with one or more groups including, but not limited to, hydroxy, halogen, acyl, alkyl, alkoxy, alkenyl, alkynyl, aryl, heteroaryl, acyl, aldehyde, amino, carboxylic acid, ester, ether, ketone, nitro, silyl, sulfo-oxo, sulfonyl, sulfone, sulfoxide, or thiol, as described below, provided that the substituents are sterically compatible and the rules of chemical bonding and strain energy are satisfied. The alkyl group can also include one or more heteroatoms (e.g., from one to three heteroatoms) incorporated within the hydrocarbon moiety. Examples of heteroatoms include, but are not limited to, nitrogen, oxygen, sulfur, and phosphorus.

Throughout the specification "alkyl" can be used to refer to both unsubstituted alkyl groups and substituted alkyl groups; however, substituted alkyl groups are also specifically referred to herein by identifying the specific substituent(s) on the alkyl group.

As used herein, the term "alkenyl" refers to unsaturated, straight-chained, or branched hydrocarbon moieties containing a double bond. Unless otherwise specified, $C_7$-$C_{32}$ (e.g., $C_7$-$C_{28}$, $C_7$-$C_{24}$, $C_7$-$C_{20}$, $C_7$-$C_{18}$, $C_7$-$C_{16}$, $C_7$-$C_{14}$, $C_7$-$C_{12}$, $C_{12}$-$C_{24}$, $C_{12}$-$C_{18}$, $C_{16}$-$C_{24}$, or $C_{12}$-$C_{18}$) alkenyl groups are intended. Asymmetric structures such as $(Z^1Z^2)C=C(Z^3Z^4)$ are intended to include both the E and Z isomers. This can be presumed in structural formulae herein wherein an asymmetric alkene is present, or it can be explicitly indicated by the bond symbol C=C. Alkenyl substituents may be unsubstituted or substituted with one or more chemical moieties. Examples of suitable substituents include, for example, alkyl, halogenated alkyl, alkoxy, alkenyl, alkynyl, aryl, heteroaryl, acyl, aldehyde, amino, carboxylic acid, ester, ether, halide, hydroxy, ketone, nitro, silyl, sulfo-oxo, sulfonyl, sulfone, sulfoxide, or thiol, as described below, provided that the substituents are sterically compatible and the rules of chemical bonding and strain energy are satisfied.

As used herein, the term "aryl," as well as derivative terms such as aryloxy, refers to groups that include a monovalent aromatic carbocyclic group of from 3 to 20 carbon atoms. Aryl groups can include a single ring or multiple condensed rings. In some embodiments, aryl groups include C6-C10 aryl groups. Examples of aryl groups include, but are not limited to, phenyl, biphenyl, naphthyl, tetrahydronaphthyl, phenylcyclopropyl, and indanyl. In some embodiments, the aryl group can be a phenyl, indanyl or naphthyl group. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is included in the term "aryl," defines a group that contains an aromatic group that does not contain a heteroatom. The aryl or heteroaryl substituents may be unsubstituted or substituted with one or more chemical moieties. Examples of suitable substituents include, for example, alkyl, halogenated alkyl, alkoxy, alkenyl, alkynyl, aryl, heteroaryl, acyl, aldehyde, amino, carboxylic acid, cycloalkyl, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

"Hydrocarbon-bearing formation" or simply "formation" refers to the rock matrix in which a wellbore may be drilled. For example, a formation refers to a body of rock that is sufficiently distinctive and continuous such that it can be mapped. It should be appreciated that while the term "formation" can refer to geologic formations of interest, that the term "formation," as used herein, may, in some instances, include any geologic points or volumes of interest (such as a survey area).

"Unconventional formation" or "unconventional subterranean formation" is a subterranean hydrocarbon-bearing formation that can require intervention in order to recover hydrocarbons from the reservoir at economic flow rates or volumes. For example, an unconventional formation includes reservoirs having an unconventional microstructure in which fractures are used to recover hydrocarbons from the reservoir at sufficient flow rates or volumes (e.g., an unconventional reservoir may need to be fractured under pressure or have naturally occurring fractures in order to recover hydrocarbons from the reservoir at sufficient flow rates or volumes).

In some embodiments, the unconventional formation can include a reservoir having a permeability of less than 25 millidarcy (mD) (e.g., 20 mD or less, 15 mD or less, 10 mD or less, 5 mD or less, 1 mD or less, 0.5 mD or less, 0.1 mD or less, 0.05 mD or less, 0.01 mD or less, 0.005 mD or less, 0.001 mD or less, 0.0005 mD or less, 0.0001 mD or less, mD or less, 0.00001 mD or less, 0.000005 mD or less, 0.000001 mD or less, or less). In some embodiments, the unconventional formation can include a reservoir having a permeability of at least 0.000001 mD (e.g., at least 0.000005 mD, at least 0.00001 mD, mD, at least 0.0001 mD, 0.0005 mD, 0.001 mD, at least 0.005 mD, at least 0.01 mD, at least 0.05 mD, at least 0.1 mD, at least 0.5 mD, at least 1 mD, at least 5 mD, at least mD, at least 15 mD, or at least 20 mD).

The unconventional formation can include a reservoir having a permeability ranging from any of the minimum values described above to any of the maximum values described above. For example, in some embodiments, the unconventional formation can include a reservoir having a permeability of from 0.000001 mD to 25 mD (e.g., from 0.001 mD to 25 mD, from 0.001 mD to 10 mD, from 0.01 mD to 10 mD, from 0.1 mD to 10 mD, from mD to 5 mD, from 0.01 mD to 5 mD, or from 0.1 mD to 5 mD).

The formation may include faults, fractures (e.g., naturally occurring fractures, fractures created through hydraulic fracturing, etc.), geobodies, overburdens, underburdens, horizons, salts, salt welds, etc. The formation may be onshore, offshore (e.g., shallow water, deep water, etc.), etc. Furthermore, the formation may include hydrocarbons, such as liquid hydrocarbons (e.i., oil or petroleum), gas hydrocarbons, any combination of liquid hydrocarbons and gas hydrocarbons (e.g., including gas condensate), etc.

The formation, the hydrocarbons, or both may also include non-hydrocarbon items, such as pore space, connate water, brine, fluids from enhanced oil recovery, etc. The formation may also be divided up into one or more hydrocarbon zones, and hydrocarbons can be produced from each desired hydrocarbon zone.

The term formation may be used synonymously with the term "reservoir" or "subsurface reservoir" or "subsurface region of interest" or "subsurface formation" or "subsurface volume of interest". For example, in some embodiments, the reservoir may be, but is not limited to, a shale reservoir, a carbonate reservoir, a tight sandstone reservoir, a tight siltstone reservoir, a gas hydrate reservoir, a coalbed methane reservoir, etc. Indeed, the terms "formation," "reservoir," "hydrocarbon," and the like are not limited to any description or configuration described herein.

"Wellbore" refers to a continuous hole for use in hydrocarbon recovery, including any openhole or uncased portion of the wellbore. For example, a wellbore may be a cylindrical hole drilled into the formation such that the wellbore is surrounded by the formation, including rocks, sands, sediments, etc. A wellbore may be used for injection. A wellbore may be used for production. A wellbore may be used for hydraulic fracturing of the formation. A wellbore even may be used for multiple purposes, such as injection and production. The wellbore may have vertical, inclined, horizontal, or any combination of trajectories. For example, the wellbore may be a vertical wellbore, a horizontal wellbore, a multilateral wellbore, or slanted wellbore. The wellbore may include a "build section." "Build section" refers to practically any section of a wellbore where the deviation is changing. As an example, the deviation is changing when the wellbore is curving. The wellbore may include a plurality of components, such as, but not limited to, a casing, a liner, a tubing string, a heating element, a sensor, a packer, a screen, a gravel pack, etc. The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. The wellbore may also include at least one artificial lift device, such as, but not limited to, an electrical submersible pump (ESP) or gas lift. The term wellbore is not limited to any description or configuration described herein. The term wellbore may be used synonymously with the terms borehole or well.

"Slickwater," as used herein, refers to water-based aqueous fluid comprising a friction reducer which can be pumped at high rates to fracture a reservoir. Optionally when employing slickwater, smaller sized proppant particles (e.g., 40/70 or 50/140 mesh size) are used due to the fluid having a relatively low viscosity (and therefore a diminished ability to transport sizable proppants relative to more viscous fluids). In some embodiments, proppants are added to some stages of completion/stimulation during production of an unconventional reservoir. In some embodiments, slickwater is injected with a small quantity of proppant.

"Fracturing" is one way that hydrocarbons may be recovered (sometimes referred to as produced) from the formation. For example, hydraulic fracturing may entail preparing a fracturing fluid and injecting that fracturing fluid into the wellbore at a sufficient rate and pressure to open existing fractures and/or create fractures in the formation. The fractures permit hydrocarbons to flow more freely into the wellbore. In the hydraulic fracturing process, the fracturing fluid may be prepared on-site to include at least proppants. The proppants, such as sand or other particles, are meant to hold the fractures open so that hydrocarbons can more easily flow to the wellbore. The fracturing fluid and the proppants may be blended together using at least one blender. The fracturing fluid may also include other components in addition to the proppants.

The wellbore and the formation proximate to the wellbore are in fluid communication (e.g., via perforations), and the fracturing fluid with the proppants is injected into the wellbore through a wellhead of the wellbore using at least one pump (oftentimes called a fracturing pump). The fracturing fluid with the proppants is injected at a sufficient rate and pressure to open existing fractures and/or create fractures in the subsurface volume of interest. As fractures become sufficiently wide to allow proppants to flow into those fractures, proppants in the fracturing fluid are deposited in those fractures during injection of the fracturing fluid. After the hydraulic fracturing process is completed, the fracturing fluid is removed by flowing or pumping it back out of the wellbore so that the fracturing fluid does not block the flow of hydrocarbons to the wellbore. The hydrocarbons can enter the same wellbore from the formation and go up to the surface for further processing.

The equipment to be used in preparing and injecting the fracturing fluid may be dependent on the components of the fracturing fluid, the proppants, the wellbore, the formation, etc. However, for simplicity, the term "fracturing apparatus" is meant to represent any tank(s), mixer(s), blender(s), pump(s), manifold(s), line(s), valve(s), fluid(s), fracturing fluid component(s), proppants, and other equipment and non-equipment items related to preparing the fracturing fluid and injecting the fracturing fluid.

Other hydrocarbon recovery processes may also be utilized to recover the hydrocarbons. Furthermore, those of ordinary skill in the art will appreciate that one hydrocarbon recovery process may also be used in combination with at least one other recovery process or subsequent to at least one other recovery process. Moreover, hydrocarbon recovery processes may also include stimulation or other treatments.

"Friction reducer," as used herein, refers to a chemical additive that alters fluid rheological properties to reduce friction created within the fluid as it flows through small-diameter tubulars or similar restrictions (e.g., valves, pumps). Polymers, or similar friction reducing agents, can add viscosity to the fluid, which reduces the turbulence induced as the fluid flows. Reductions in fluid friction of greater than 50% are possible depending on the friction reducer utilized, which allows the aqueous fluid to be injected into a wellbore at a much higher injection rate (e.g., between 5 to 150 barrels per minute) and also lower pumping pressure during proppant injection.

"Aqueous fluid" as used herein, refers to any fluid which is injected into a reservoir via a well. The aqueous fluid may include one or more of a well treatment agent; and a friction reducer, to increase the efficacy of the aqueous fluid. The aqueous fluid may be a low particle aqueous fluid having a maximum particle size of less than 0.1 micrometers in diameter in particle size distribution measurements performed at a temperature and salinity of the unconventional formation for which injection is to occur. For example, the low particle size aqueous fluid can be formed by mixing an aqueous fluid with a surfactant package.

The term "well treatment agent" as used herein, refers to one or more of an acid, an alkali agent, a polymer, a gelling agent, a crosslinker, a biocide, a scale inhibitor, a breaker, a pH adjusting agent, a non-emulsifier agent, an iron control agent, a chelating agent, a corrosion inhibitor, a clay stabilizing agent, a wettability alteration chemical, an anti-foam agent (e.g., chemical defoamer), a sulfide scavenger, a mobility control agent, a co-solvent, a surfactant, a surfactant package, or any combination thereof.

The term "interfacial tension" or "IFT" as used herein refers to the surface tension between test oil and water of different salinities containing a surfactant formulation at different concentrations. Interfacial tensions can be measured using a spinning drop tensiometer or calculated from phase behavior experiments.

The term "proximate" is defined as "near." If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The term "contacting" as used herein, refers to materials or compounds being sufficiently close in proximity to react or interact. For example, in methods of contacting an unrefined petroleum material, a hydrocarbon-bearing formation, and/or a wellbore, the term "contacting" can include placing a compound (e.g., a surfactant) or an aqueous composition (e.g., chemical, surfactant, or polymer) within a hydrocarbon-bearing formation using any suitable manner known in the art (e.g., pumping, injecting, pouring, releasing, displacing, spotting, or circulating the chemical into a well, wellbore, or hydrocarbon-bearing formation).

The terms "unrefined petroleum" and "crude oil" are used interchangeably and in keeping with the plain ordinary usage of those terms. "Unrefined petroleum" and "crude oil" may be found in a variety of petroleum reservoirs (also referred to herein as a "reservoir," "oil field deposit," "deposit," and the like) and in a variety of forms including oleaginous materials, oil shales (i.e., organic-rich fine-grained sedimentary rock), tar sands, light oil deposits, heavy oil deposits, and the like. "Crude oils" or "unrefined petroleums" refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes may yield more heat upon burning, but have lower gravity as defined by the American Petroleum Institute (API) (i.e., API gravity) and market price in comparison to light (or sweet) crude oils. Crude oil may also be characterized by its Equivalent Alkane Carbon Number (EACN). The term "API gravity" refers to the measure of how heavy or light a petroleum liquid is compared to water. If an oil's API gravity is greater than 10, it is lighter and floats on water, whereas if it is less than 10, it is heavier and sinks. API gravity is thus an inverse measure of the relative density of a petroleum liquid and the density of water. API gravity may also be used to compare the relative densities of petroleum liquids. For example, if one petroleum liquid floats on another and is therefore less dense, it has a greater API gravity.

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified into three groups, according to the nature of the hydrocarbons they contain. (i) Paraffin-based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

"Reactive" crude oil, as referred to herein, is crude oil containing natural organic acidic components (also referred to herein as unrefined petroleum acid) or their precursors such as esters or lactones. These reactive crude oils can generate soaps (carboxylates) when reacted with alkali. More terms used interchangeably for crude oil throughout this disclosure are hydrocarbons, hydrocarbon material, or active petroleum material. An "oil bank" or "oil cut" as referred to herein, is the crude oil that does not contain the injected chemicals and is pushed by the injected fluid during an enhanced oil recovery process. A "nonactive oil," as used herein, refers to an oil that is not substantially reactive or crude oil not containing significant amounts of natural organic acidic components or their precursors such as esters or lactones such that significant amounts of soaps are generated when reacted with alkali. A nonactive oil as referred to herein includes oils having an acid number of less than 0.5 mg KOH/g of oil.

"Unrefined petroleum acids" as referred to herein are carboxylic acids contained in active petroleum material (reactive crude oil). The unrefined petroleum acids contain $C_{11}$-$C_{20}$ alkyl chains, including napthenic acid mixtures. The recovery of such "reactive" oils may be performed using alkali (e.g., NaOH, $NaHCO_3$, or $Na_2CO_3$) in a surfactant composition. The alkali reacts with the acid in the reactive oil to form soap in situ. These in situ generated soaps serve as a source of surfactants minimizing the levels of added surfactants, thus enabling efficient oil recovery from the reservoir.

The term "polymer" refers to a molecule having a structure that essentially includes the multiple repetitions of units derived, actually or conceptually, from molecules of low relative molecular mass. In some embodiments, the polymer is an oligomer.

The term "productivity" as applied to a petroleum or oil well refers to the capacity of a well to produce hydrocarbons (e.g., unrefined petroleum); that is, the ratio of the hydrocarbon flow rate to the pressure drop, where the pressure drop is the difference between the average reservoir pressure and the flowing bottom hole well pressure (i.e., flow per unit of driving force).

The term "oil solubilization ratio" is defined as the volume of oil solubilized divided by the volume of surfactant in microemulsion. All the surfactant is presumed to be in the microemulsion phase. The oil solubilization ratio is applied for Winsor type I and type III behavior. The volume of oil solubilized is found by reading the change between initial aqueous level and excess oil (top) interface level. The oil solubilization ratio is calculated as follows:

$$\sigma_o = \frac{V_o}{V_s}$$

where $\sigma_o$ is the oil solubilization ratio, $V_o$ is the volume of oil solubilized, and $V_s$ is the volume of surfactant.

The term "water solubilization ratio" is defined as the volume of water solubilized divided by the volume of surfactant in microemulsion. All the surfactant is presumed to be in the microemulsion phase. The water solubilization ratio is applied for Winsor type III and type II behavior. The volume of water solubilized is found by reading the change between initial aqueous level and excess water (bottom) interface level. The water solubilization parameter is calculated as follows:

$$\sigma_w = \frac{V_w}{V_s}$$

where $\sigma_w$ is the water solubilization ratio, $V_w$ is the volume of oil solubilized, and $V_s$ is the volume of surfactant.

The optimum solubilization ratio occurs where the oil and water solubilization ratios are equal. The coarse nature of phase behavior screening often does not include a data point at optimum, so the solubilization ratio curves are drawn for the oil and water solubilization ratio data and the intersection of these two curves is defined as the optimum. The following is true for the optimum solubilization ratio:

$$\sigma_o = \sigma_w = \sigma^*$$

where $\sigma^*$ is the optimum solubilization ratio.

The term "solubility" or "solubilization" refers to the property of a solute, which can be a solid, liquid, or gas, to dissolve in a solid, liquid, or gaseous solvent thereby forming a homogenous solution of the solute in the solvent. Solubility occurs under dynamic equilibrium, which means that solubility results from the simultaneous and opposing processes of dissolution and phase joining (e.g., precipitation of solids). The solubility equilibrium occurs when the two processes proceed at a constant rate. The solubility of a given solute in a given solvent can depend on temperature. For many solids dissolved in liquid water, the solubility increases with temperature. In liquid water at high temperatures, the solubility of ionic solutes tends to decrease due to the change of properties and structure of liquid water. In more particular, solubility and solubilization as referred to herein is the property of oil to dissolve in water and vice versa.

"Viscosity" refers to a fluid's internal resistance to flow or being deformed by shear or tensile stress. In other words, viscosity may be defined as thickness or internal friction of a liquid. Thus, water is "thin", having a lower viscosity, while oil is "thick", having a higher viscosity. The less viscous a fluid is, the greater its ease of fluidity.

The term "salinity" as used herein, refers to concentration of salt dissolved in an aqueous phase. Examples for such salts are without limitation, sodium chloride, magnesium and calcium sulfates, and bicarbonates. In more particular, the term salinity as it pertains to the present invention refers to the concentration of salts in brine and surfactant solutions.

The term "co-solvent," as used herein, refers to a compound having the ability to increase the solubility of a solute (e.g., a surfactant as disclosed herein) in the presence of an unrefined petroleum acid. In some embodiments, the co-solvents provided herein have a hydrophobic portion (alkyl or aryl chain), a hydrophilic portion (e.g., an alcohol) and optionally an alkoxy portion. Co-solvents as provided herein include alcohols (e.g., $C_1$-$C_6$ alcohols, $C_1$-$C_6$ diols), alkoxy alcohols (e.g., $C_1$-$C_6$ alkoxy alcohols, $C_1$-$C_6$ alkoxy diols, and phenyl alkoxy alcohols), glycol ether, glycol, and glycerol. The term "alcohol" is used according to its ordinary meaning and refers to an organic compound containing an —OH groups attached to a carbon atom. The term "diol" is used according to its ordinary meaning and refers to an organic compound containing two —OH groups attached to two different carbon atoms. The term "alkoxy alcohol" is used according to its ordinary meaning and refers to an organic compound containing an alkoxy linker attached to a —OH group The phrase "point of zero charge," as used herein, refers to the pH at which the surface charge (i.e., zeta potential) of a solid material is zero.

The phrase "surfactant package," as used herein, refers to a composition that includes a blend of multiple components including one or more surfactants.

Methods

Provided are methods of using aqueous fluids described herein in oil and gas operations. The oil and gas operation can include for example, an enhanced oil recovery (EOR) operation (e.g., an improved oil recovery (IOR) operation, a surfactant (S) flooding operation, an alkaline-surfactant (AS) flooding operation, a surfactant-polymer (SP) flooding operation, an alkaline-surfactant-polymer (ASP) flooding operation, a conformance control operation, or any combination thereof), a wellbore clean-up operation, a stimulation operation, a pressure protection operation, a fracturing operation, or any combination thereof.

Provided herein are methods for treating an unconventional subterranean formation. These methods can, for example, decrease pressure drop along a lateral segment of a wellbore in an unconventional subterranean formation, improve fluid distribution along a lateral segment of a wellbore and into a toe of a wellbore in an unconventional subterranean formation, improve hydrocarbon production from an unconventional subterranean formation, or any combination thereof. These methods can include injecting an aqueous fluid into the unconventional subterranean formation via a wellbore in fluid communication with the unconventional subterranean formation. In some embodiments, the method can further include producing hydrocarbons from the wellbore. In some embodiments, injection of the aqueous fluid can increase a flow of hydrocarbons from the wellbore.

In some embodiments, the method can further include monitoring a fluid distribution in the wellbore using a production logging tool, fiber optics equipment, or any combination thereof.

In some embodiments, the aqueous fluid can include a well treatment agent; and a friction reducer in a concentration of from 0.1 gpt to 5 gpt (e.g., from 0.1 gpt to 4.5 gpt, from 0.1 gpt to 4 gpt, from 0.1 gpt to 3.5 gpt, from 0.1 gpt to 3 gpt, from 0.1 gpt to 2.5 gpt, from 0.1 gpt to 2 gpt, from 0.1 gpt to 1.5 gpt, from 0.1 gpt to 1 gpt, from 0.1 gpt to 0.5 gpt, from 1 gpt to 2 gpt, from 1 gpt to 3 gpt, from 1 gpt to 4 gpt, from 1 gpt to 5 gpt, from 0.5 gpt to 2 gpt, from 0.5 gpt to 3 gpt, from 0.5 gpt to 4 gpt, from 0.5 gpt to 5 gpt, from 2 gpt to 4 gpt, from 2 gpt to 5 gpt, from 2 gpt to 3 gpt, from 3 gpt to 5 gpt, from 3 gpt to 4 gpt, or from 4 gpt to 5 gpt).

In some embodiments, injection of the aqueous fluid can decrease pressure drop along the lateral segment of the wellbore. Similar effects can also be seen in vertical segments of the wellbore. In some embodiments, the decrease in pressure drop along the lateral segment of the wellbore can be measured as a drag reduction percentage (DR %) calculated using the equation below:

$$DR\ \% = \frac{dP_{water} - dP_{FR}}{dP_{water}} * 100\%,$$

wherein $dP_{water}$ is the calculated value for pressure drop along the lateral segment of the wellbore for water, and $dP_{FR}$ is the pressure drop along the later segment of the wellbore for the aqueous fluid.

In some embodiments, injection of the aqueous fluid can decrease pressure drop along the lateral segment of the existing wellbore. In some embodiments, the decrease in pressure drop along the lateral segment of the existing wellbore can be measured as a drag reduction percentage (DR %) calculated using the equation below:

$$DR\ \% = \frac{dP_{water} - dP_{FR}}{dP_{water}} * 100\%,$$

wherein $dP_{water}$ is the calculated value for pressure drop along the lateral segment of the existing wellbore for water, and $dP_{FR}$ is the pressure drop along the later segment of the existing wellbore for the aqueous fluid.

In some embodiments, the drag reduction percentage (DR %) can be at least 50% (e.g., at least 55%, at least 60%, at least 65%, at least 70%, at least 75%, at least 80%, at least 85%, or at least 90%). In some embodiments, the drag reduction factor (DR) can be 95% or less (e.g., 90% or less, 85% or less, 80% or less, 75% or less, 70% or less, 65% or less, 60% or less, or 55% or less).

The drag reduction percentage (DR %) can range from any of the minimum values described above to any of the maximum values described above. For example, in some embodiments, the drag reduction percentage (DR %) can range of from 50% to 95% (e.g., from 50% to 90%, from 50% to 85%, from 50% to 80%, from 50% to 75%, from 50% to 70%, from 50% to 65%, from 50% to 60%, from 65% to 85%, from 65% to 90%, from 60% to 75%, from 65% to 75%, from 75% to 85%, or from 75% to 95%).

In some embodiments, the decrease in pressure drop along the lateral segment of the wellbore improves fluid distribution along the lateral segment and into the toe of the wellbore. In some embodiments, the pressure drop along the lateral segment of the wellbore is calculated using the equation below:

$$dP_{FR} = dP_{water} - (DR \times dP_{water}),$$

wherein $dP_{water}$ is the calculated value for pressure drop along the lateral segment of the wellbore for water, and $dP_{FR}$ is the pressure drop along the lateral segment of the wellbore for the aqueous fluid.

In some embodiments, the decrease in pressure drop along the lateral segment of the existing wellbore improves fluid distribution along the lateral segment and into the toe of the wellbore. In some embodiments, the pressure drop along the lateral segment of the existing wellbore is calculated using the equation below:

$$dP_{FR} = dP_{water} - (DR \times dP_{water}),$$

wherein $dP_{water}$ is the calculated value for pressure drop along the lateral segment of the existing wellbore for water, and $dP_{FR}$ is the pressure drop along the lateral segment of the existing wellbore for the aqueous fluid. $dP_{water}$ can be a calculated value for pressure drop along the lateral segment of the existing wellbore for a reference fluid that does not include a friction reducer, such as an aqueous fluid without the friction reducer.

In some embodiments, the drag reduction factor (DR) can be at least 0.5 (e.g., at least 0.55, at least 0.6, at least 0.65, at least 0.7, at least 0.75, at least 0.8, at least 0.85, or at least 0.9). In some embodiments, the drag reduction factor (DR) can be 0.95 or less (e.g., or less, 0.85 or less, 0.8 or less, 0.75 or less, 0.7 or less, 0.65 or less, 0.6 or less, or 0.55 or less).

The drag reduction factor (DR) can range from any of the minimum values described above to any of the maximum values described above. For example, in some embodiments, the drag reduction factor (DR) can range from 0.5 to 0.95 (e.g., 0.5 to 0.90, from 0.5 to 0.85, from 0.5 to 0.80, from 0.5 to 0.75, from 0.5 to 0.70, from 0.5 to 0.65, from to 0.6, from 0.65 to 0.85, from 0.65 to 0.90, from 0.6 to 0.75, from 0.65 to 0.75, from to 0.85, or from 0.75 to 0.95).

In some embodiments, the pressure drop along the lateral segment of the wellbore can be at least 10 psi/1000 ft (e.g., at least 25 psi/1000 ft, at least 50 psi/1000 ft, at least 75 psi/1000 ft, at least 100 psi/1000 ft, at least 150 psi/1000 ft, at least 200 psi/1000 ft, at least 250 psi/1000 ft, at least 300 psi/1000 ft, at least 350 psi/1000 ft, at least 400 psi/1000 ft, at least 450 psi/1000 ft, at least 500 psi/1000 ft, or at least 550 psi/1000 ft). In some embodiments, the pressure drop along the lateral segment of the wellbore when the aqueous fluid is injected can be 600 psi/1000 ft or less (e.g., 550 psi/1000 ft or less, 500 psi/1000 ft or less, 450 psi/1000 ft or less, 400 psi/1000 ft or less, 350 psi/1000 ft or less, 300 psi/1000 ft or less, 250 psi/1000 ft or less, 200 psi/1000 ft or less, 150 psi/1000 ft or less, 100 psi/1000 ft or less, 50 psi/1000 ft or less, or 25 psi/1000 ft or less).

The pressure drop along the lateral segment of the wellbore when the aqueous fluid is injected can range from any of the minimum values described above to any of the maximum values described above. For example, in some embodiments, the pressure drop along the lateral segment of the wellbore when the aqueous fluid is injected can be from 10 psi/1000 ft to 600 psi/1000 ft (e.g., from 10 psi/1000 ft to 550 psi/1000 ft, from 10 psi/1000 ft to 500 psi/1000 ft, from 10 psi/1000 ft to 450 psi/1000 ft, from 10 psi/1000 ft to 400 psi/1000 ft, from 10 psi/1000 ft to 350 psi/1000 ft, from 10 psi/1000 ft to 300 psi/1000 ft, from 10 psi/1000 ft to 250 psi/1000 ft, from 10 psi/1000 ft to 200 psi/1000 ft, from 10 psi/1000 ft to 150 psi/1000 ft, from 10 psi/1000 ft to 100 psi/1000 ft, from 10 psi/1000 ft to 50 psi/1000 ft, from 10 psi/1000 ft to 25 psi/1000 ft, from 25 psi/1000 ft to 600 psi/1000 ft, from 25 psi/1000 ft to 550 psi/1000 ft, from 25 psi/1000 ft to 500 psi/1000 ft, from 25 psi/1000 ft to 450 psi/1000 ft, from 25 psi/1000 ft to 400 psi/1000 ft, from 25 psi/1000 ft to 350 psi/1000 ft, from 25 psi/1000 ft to 300 psi/1000 ft, from 25 psi/1000 ft to 250 psi/1000 ft, from 25 psi/1000 ft to 200 psi/1000 ft, from 25 psi/1000 ft to 150 psi/1000 ft, from 25 psi/1000 ft to 100 psi/1000 ft, from 25 psi/1000 ft to 50 psi/1000 ft, from 50 psi/1000 ft to 600 psi/1000 ft, from 50 psi/1000 ft to 550 psi/1000 ft, from 50 psi/1000 ft to 500 psi/1000 ft, from 50 psi/1000 ft to 450 psi/1000 ft, from 50 psi/1000 ft to 400 psi/1000 ft, from 50 psi/1000 ft to 350 psi/1000 ft, from 50 psi/1000 ft to 300 psi/1000 ft, from 50 psi/1000 ft to 250 psi/1000 ft, from 50 psi/1000 ft to 200 psi/1000 ft, from 50 psi/1000 ft to 150 psi/1000 ft, from 50 psi/1000 ft to 100 psi/1000 ft, from 100 psi/1000 ft to 600 psi/1000 ft, from 100 psi/1000 ft to 550 psi/1000 ft, from 100 psi/1000 ft to 500 psi/1000 ft, from 100 psi/1000 ft to 450 psi/1000 ft, from 100 psi/1000 ft to 400 psi/1000 ft, from 100 psi/1000 ft to 350 psi/1000 ft, from 100 psi/1000 ft to 300 psi/1000 ft, from 100 psi/1000 ft to 250 psi/1000 ft, from 150 psi/1000 ft to 600 psi/1000 ft, from 150 psi/1000 ft to 550 psi/1000 ft, from 150 psi/1000 ft to 500 psi/1000 ft, from 150 psi/1000 ft to 450 psi/1000 ft, from 150 psi/1000 ft to 400 psi/1000 ft, from 150 psi/1000 ft to 350 psi/1000 ft, from 150 psi/1000 ft to 300 psi/1000 ft, from 150 psi/1000 ft to 250 psi/1000 ft, from 150 psi/1000 ft to 200 psi/1000 ft, from 200 psi/1000 ft to 600 psi/1000 ft, from 200 psi/1000 ft to 550 psi/1000 ft, from 200 psi/1000 ft to 500 psi/1000 ft, from 200 psi/1000 ft to 450 psi/1000 ft, from 200 psi/1000 ft to 400 psi/1000 ft, from 200 psi/1000 ft to 350 psi/1000 ft, from 200 psi/1000 ft to 300 psi/1000 ft, from 200 psi/1000 ft to 250 psi/1000 ft, from 250 psi/1000 ft to 600 psi/1000 ft, from 250 psi/1000 ft to 550 psi/1000 ft, from 250 psi/1000 ft to 500 psi/1000 ft, from 250 psi/1000 ft to 450 psi/1000 ft, from 250 psi/1000 ft to 400 psi/1000 ft, from 250 psi/1000 ft to 350 psi/1000 ft, from 250 psi/1000 ft to 300 psi/1000 ft, from 300 psi/1000 ft to 600 psi/1000 ft, from 300 psi/1000 ft to 550 psi/1000 ft, from 300 psi/1000 ft to 500 psi/1000 ft, from 300 psi/1000 ft to 450 psi/1000 ft, from 300 psi/1000 ft to 400 psi/1000 ft, from 300 psi/1000 ft to 350 psi/1000 ft, from 400 psi/1000 ft to 600 psi/1000 ft, from 400 psi/1000 ft to 550 psi/1000 ft, from 400 psi/1000 ft to 500 psi/1000 ft, from 400 psi/1000 ft to 450 psi/1000 ft, from 500 psi/1000 ft to 600 psi/1000 ft, or from 500 psi/1000 ft to 550 psi/1000 ft).

In some embodiments, the wellbore can include tubing having an inner diameter of from 1.5 inches to less than 4 inches. In some embodiments, the existing wellbore can include tubing having an inner diameter of from 1.5 inches to less than 4 inches. In some embodiments, the tubing inner diameter can be at least 1.5 inches (e.g., at least 2 inches, at least 2.5 inches, at least 3 inches, or at least 3.5 inches). In some embodiments, the tubing inner diameter can be 4 inches or less (e.g., 3.5 inches or less, 3 inches or less, 2.5 inches or less, or 2 inches or less).

The tubing inner diameter can range from any of the minimum values described above to any of the maximum values described above. For example, in some embodiments, tubing inner diameter can range from 1.5 inches to less than 4 inches (e.g., from 1.5 inches to 2 inches, from 1.5 inches to 2.5 inches, from 1.5 inches to 3 inches, from 1.5 inches to 3.5 inches, from 2.5 inches to less than 4 inches, or from 3 inches to less than 4 inches). In some embodiments, the tubing inner diameter can be 2.441 inches.

In some embodiments, the wellbore can include a casing having a diameter from 4 inches to 9 inches. In some embodiments, the existing wellbore can include a casing having a diameter from 4 inches to 9 inches. In some embodiments, the casing diameter can be at least 4 inches (e.g., at least 4.5 inches, at least 5 inches, at least 6 inches, at least 7 inches, at least 8 inches, or at least 8.5 inches). In some embodiments, the casing diameter can be 9 inches or less (e.g., 8 inches or less, 7 inches or less, 6 inches or less, or 5 inches or less).

The casing diameter can range from any of the minimum values described above to any of the maximum values described above. For example, in some embodiments, casing diameter can be from 4 inches to 9 inches (e.g., from 4 inches to 8 inches, from 4 inches to 7 inches, from 4 inches to 6 inches, from 4 inches to 5 inches, from 4 inches to 5.5 inches, or from 4.5 inches to 6.5 inches). In some embodiments, the casing diameter can be 4.778 inches.

In some embodiments, the tubing and/or casing can include a coating layer. In some embodiments, the coating layer can include a coating material. In some embodiments, suitable coating materials can include, but are not limited to, thermoplastic materials, ceramic materials, or any combinations thereof. In some embodiments, the coating layer can be a thermoplastic coating layer formed from a thermoplastic material. In some embodiments, the coating layer can be a ceramic coating layer formed from a ceramic material. In one embodiment, the coating layer is disposed directly onto an inner surface of the tubing and/or casing.

In some embodiments, depending on the coating material employed, the roughness of the coating layer can vary. In some embodiments, the coating layer can have a roughness of at least 1 µm (e.g., at least 2 µm, at least 2.5 µm, at least 5 µm, at least 10 µm, at least 15 µm, at least 20 µm, at least 30 µm, or at least 40 µm). In some embodiments, the coating layer can have a roughness of 50 µm or less (e.g., 40 µm or less, 30 µm or less, 20 µm or less, 15 µm or less, 10 µm or less, 5 µm or less, 2.5 µm or less, or 2 µm or less).

The coating layer can have a roughness ranging from any of the minimum values described above to any of the maximum values described above. For example, in some embodiments, the coating layer can have a roughness of from 1 µm to 50 µm (e.g., from 2 µm to 50 µm, from 2 µm to 40 µm, from 2 µm to 30 µm, from 2 µm to 20 µm, from 2 µm to 10 µm, from 2 µm to 5 µm, from 5 µm to 50 µm, from 5 µm to 40 µm, from 5 µm to 30 µm, from 5 µm to 20 µm, from 5 µm to 10 µm, from 10 µm to 50 µm, from 10 µm to 40 µm, from 10 µm to 30 µm, from 10 µm to 20 µm, from 20 µm to 50 µm, from 20 µm to 40 µm, from 20 µm to 30 µm, from 30 µm to 50 µm, from 30 µm to 40 µm, from 40 µm to 50 µm, from 1 µm to 40 µm, from 1 µm to 30 µm, from 1 µm to 20 µm, from 1 µm to 10 µm, from 1 µm to 5 µm, or from 1 µm to 2.5 µm).

Depending on the coating material employed, the thickness of the coating layer can vary.

In some embodiments, when a thermoplastic material is used as the coating material, the coating layer can have a thickness of at least 0.5 mm (e.g., at least 1 mm, at least 2.5 mm, at least 5 mm, at least 10 mm, at least 15 mm, or at least 20 mm).

In some embodiments, when a thermoplastic material is used as the coating material, the coating layer can have a thickness of 25 mm or less (e.g., 20 mm or less, 15 mm or less, mm or less, 5 mm or less, 2.5 mm or less, or 1 mm or less).

When a thermoplastic material is used as the coating material, the coating layer can have a thickness of ranging from any of the minimum values described above to any of the maximum values described above. For example, when a thermoplastic material is used as the coating material, the coating layer can have a thickness of from 0.5 mm to 25 mm (e.g., from 0.5 mm to 20 mm, from 0.5 mm to 15 mm, from 0.5 mm to 10 mm, from 0.5 mm to 5 mm, from 0.5 mm to 2.5 mm, from 0.5 mm to 1 mm, from 1 mm to 20 mm, from 1 mm to mm, from 1 mm to 10 mm, from 1 mm to 5 mm, from 1 mm to 2.5 mm, from 5 mm to mm, from 5 mm to 15 mm, from 5 mm to 10 mm, from 10 mm to 20 mm, from 10 mm to 15 mm, from 15 mm to 20 mm, from 1 mm to 25 mm, from 5 mm to 25 mm, from 10 mm to 25 mm, from 15 mm to 25 mm, or from 20 mm to 25 mm).

In some embodiments, when a ceramic material is used as the coating material, the coating layer can have a thickness of at least 0.01 mm (e.g., at least 0.05 mm, at least 0.1 mm, at least 0.5 mm, at least 1 mm, at least 2.5 mm, at least 5 mm, at least 7.5 mm, or at least 10 mm).

In some embodiments, when a ceramic material is used as the coating material, the coating layer can have a thickness of 10 mm or less (e.g., 7.5 mm or less, 5 mm or less, 2.5 mm or less, 1 mm or less, 0.5 mm or less, 0.1 mm or less, or 0.05 mm or less).

When a ceramic material is used as the coating material, the coating layer can have a thickness of ranging from any of the minimum values described above to any of the maximum values described above. For example, when a ceramic material is used as the coating material, the coating layer can have a thickness of from 0.01 mm to 10 mm (e.g., from 0.01 mm to 5 mm, from 0.01 mm to 2.5 mm, from 0.01 mm to 1 mm, from 0.01 mm to 0.5 mm, from 0.01 mm to 0.05 mm, from 0.05 mm to 10 mm, from 0.05 mm to 5 mm, from 0.05 mm to 2.5 mm, from 0.05 mm to 1 mm, from 0.05 mm to 0.5 mm, from 0.1 mm to 10 mm, from 0.1 mm to 5 mm, from 0.1 mm to 2.5 mm, from 0.1 mm to 1 mm, from 0.1 mm to 0.5 mm, from 0.5 mm to 10 mm, from 0.5 mm to 5 mm, from 0.5 mm to 2.5 mm, from 0.5 mm to 1 mm, from 1 mm to 10 mm, from 1 mm to 5 mm, from 1 mm to 2.5 mm, from 2.5 mm to 10 mm, from 2.5 mm to 5 mm, or from 5 mm to 10 mm).

Suitable thermoplastic materials can include, but are not limited to for example, polyvinyl chloride, polypropylene, high density polyethylene, polyvinylidene fluoride (Kynar™), ethylene-chlorotrifluoro-ethylene (Halar™), polytetrafluoroethylene (Teflon™), polyphenylene sulfide (PPS or Ryton™), perfluoroalkoxy fluorocarbon, ionomer and terionomer (Surlyn™) compositions, thermoplastic elastomeric rubber, or any combination thereof. In one embodiment, the thermoplastic material is polytetrafluoroethylene. In another embodiment, the material is polyphenylene sulfide.

In one embodiment, the ceramic material can include a metal oxide, e.g., titania ($TiO_2$), zirconia ($ZrO_2$), tantala ($Ta_2O_5$), alumina ($Al_2O_3$), hafnia ($HFO_2$), ceria ($CeO_2$), silica ($SiO_2$), phase-stabilized zirconias such as yttria-stabilized zirconias, calcia-stabilized zirconias, scandia-stabilized zirconias, magnesia-stabilized zirconias, zirconias stabilized by any rare earth oxide, or similar oxides; metal carbide such as silicon carbide, aluminum carbide, boron carbide, and zirconium carbide; a metal nitride such as silicon nitride, boron nitride, and aluminum nitride; a metal silicate such as aluminum silicate, cordierite, zircon, and steatite; and a metal boride such as silicon tetraboride, tungsten boride, and zirconium boride; or any combinations thereof. In one embodiment, the ceramic material can include a cermet material, i.e., a ceramic-metal composite with a ceramic phase and a metal binder phase. The ceramic phase can be a carbide, boride, carbonitride, oxide, nitride ceramic, or any combination thereof. The metal phase can be a metal such as cobalt, nickel, iron, molybdenum, titanium, zirconium, aluminum, or any combination thereof. In one embodiment, the ceramic material can include from 30 to 95 vol. % of a ceramic phase, and a metal binder phase. In one embodiment, the metal binder phase can include at least 30 wt. % of a metal selected from the group consisting of Fe, Ni, Co, Mn and any combination thereof, and at least an element selected from the group of Cr, Al, Si, and Y. In one embodiment, the ceramic material can include nickel aluminide, iron aluminide, tantalum aluminide, titanium aluminide such as gamma Ti-aluminide, or any combination thereof.

Aqueous fluids as described herein can be optimized for each formation and/or for the desired oil and gas operation. For example, an aqueous fluid can be tested at a specific reservoir temperature and salinity, and with specific additional components. Actual native reservoir fluids may also be used to test the compositions.

In some embodiments, the unconventional subterranean formation can be a subsea reservoir and/or subsurface reservoir.

In some embodiments, the unconventional subterranean formation can have a temperature of at least 75° F. (e.g., at least 80° F., at least 85° F., at least 90° F., at least 95° F., at least 100° F., at least 105° F., at least 110° F., at least 115° F., at least 120° F., at least 125° F., at least 130° F., at least 135° F., at least 140° F., at least 145° F., at least 150° F., at least 155° F., at least 160° F., at least 165° F., at least 170° F., at least 175° F., at least 180° F., at least 185° F., at least 190° F., at least 195° F., at least 200° F., at least 205° F., at least 210° F., at least 215° F., at least 220° F., at least 225° F., at least 230° F., at least 235° F., at least 240° F., at least 245° F., at least 250° F., at least 255° F., at least 260° F., at least 265° F., at least 270° F., at least 275° F., at least 280° F., at least 285° F., at least 290° F., at least 295° F., at least 300° F., at least 305° F., at least 310° F., at least 315° F., at least 320° F., at least 325° F., at least 330° F., at least 335° F., at least 340° F., or at least 345° F.). In some embodiments, the unconventional subterranean formation can have a temperature of 350° F. or less (e.g., 345° F. or less, 340° F. or less, 335° F. or less, 330° F. or less, 325° F. or less, 320° F. or less, 315° F. or less, 310° F. or less, 305° F. or less, 300° F. or less, 295° F. or less, 290° F. or less, 285° F. or less, 280° F. or less, 275° F. or less, 270° F. or less, 265° F. or less, 260° F. or less, 255° F. or less, 250° F. or less, 245° F. or less, 240° F. or less, 235° F. or less, 230° F. or less, 225° F. or less, 220° F. or less, 215° F. or less, 210° F. or less, 205° F. or less, 200°

F. or less, 195° F. or less, 190° F. or less, 185° F. or less, 180° F. or less, 175° F. or less, 170° F. or less, 165° F. or less, 160° F. or less, 155° F. or less, 150° F. or less, 145° F. or less, 140° F. or less, 135° F. or less, 130° F. or less, 125° F. or less, 120° F. or less, 115° F. or less, 110° F. or less, 105° F. or less, 100° F. or less, 95° F. or less, 90° F. or less, 85° F. or less, or 80° F. or less).

The unconventional subterranean formation can have a temperature ranging from any of the minimum values described above to any of the maximum values described above. For example, in some embodiments, the unconventional subterranean formation can have a temperature of from 75° F. to 350° F. (approximately 24° C. to 176° C.), from 150° F. to 250° F. (approximately 66° C. to 121° C.), from 110° F. to 350° F. (approximately 43° C. to 176° C.), from 110° F. to 150° F. (approximately 43° C. to 66° C.), from 150° F. to 200° F. (approximately 66° C. to 93° C.), from 200° F. to 250° F. (approximately 93° C. to 121° C.), from 250° F. to 300° F. (approximately 121° C. to 149° C.), from 300° F. to 350° F. (approximately 149° C. to 176° C.), from 110° F. to 240° F. (approximately 43° C. to 116° C.), or from 240° F. to 350° F. (approximately 116° C. to 176° C.).

In some embodiments, the salinity of unconventional subterranean formation can be at least 5,000 ppm TDS (e.g., at least 25,000 ppm TDS, at least 50,000 ppm TDS, at least ppm TDS, at least 100,000 ppm TDS, at least 125,000 ppm TDS, at least 150,000 ppm TDS, at least 175,000 ppm TDS, at least 200,000 ppm TDS, at least 225,000 ppm TDS, at least 250,000 ppm TDS, or at least 275,000 ppm TDS). In some embodiments, the salinity of unconventional subterranean formation can be 300,000 ppm TDS or less (e.g., 275,000 ppm TDS or less, 250,000 ppm TDS or less, 225,000 ppm TDS or less, 200,000 ppm TDS or less, 175,000 ppm TDS or less, 150,000 ppm TDS or less, 125,000 ppm TDS or less, 100,000 ppm TDS or less, 75,000 ppm TDS or less, 50,000 ppm TDS or less, or ppm TDS or less).

The salinity of unconventional subterranean formation can range from any of the minimum values described above to any of the maximum values described above. For example, in some embodiments, the salinity of unconventional subterranean formation can be from 5,000 ppm TDS to 300,000 ppm TDS (e.g., from 100,000 ppm to 300,000 ppm TDS, from 200,000 ppm to 300,000 ppm TDS, from 100,000 ppm to 200,000 ppm TDS, from 10,000 ppm to 100,000 ppm TDS, from 10,000 ppm to 200,000 ppm TDS, from ppm to 300,000 ppm TDS, from 5,000 ppm to 100,000 ppm TDS, from 5,000 ppm to 200,000 ppm TDS, from 5,000 ppm to 10,000 ppm TDS, or from 5,000 ppm to 50,000 ppm TDS).

In some embodiments, the unconventional subterranean formation can be oil-wet. In some embodiments, the unconventional subterranean formation can be water-wet. In some embodiments, the unconventional subterranean formation can be mixed-wet. In some embodiments, the unconventional subterranean formation can be intermediate-wet.

In some embodiments, the injection of the aqueous fluid increases a flow of hydrocarbons. In some embodiments, the method of treating the unconventional subterranean formation improves hydrocarbon production from an unconventional subterranean formation. In some embodiments, the method includes: (a) injecting an aqueous fluid into the unconventional subterranean formation via a wellbore in fluid communication with the unconventional subterranean formation; and (b) producing a hydrocarbon from the wellbore.

In some embodiments, the method comprises: (a) injecting an aqueous fluid into the unconventional subterranean formation via an existing wellbore in fluid communication with the unconventional subterranean formation prior to and/or during injection of a fracturing fluid into the unconventional subterranean formation via a new wellbore in fluid communication with the unconventional subterranean formation; and (b) producing a hydrocarbon from the existing wellbore during and/or after the injection of the fracturing fluid into the unconventional subterranean formation via the new wellbore; wherein the unconventional subterranean formation in proximity to the existing wellbore is fractured.

In some embodiments, the methods of treating the unconventional subterranean formation can comprise a stimulation operation. For example, the method can comprise (a) injecting the aqueous fluid through the wellbore into the unconventional subterranean formation; (b) allowing the fluid to imbibe into the subterranean formation for a period of time; and (c) producing fluids from the subterranean formation through the wellbore.

In some embodiments, the aqueous fluid described herein can be used as part of a reservoir stimulation operation. In such operations, the fluid can be injected to alter the wettability of existing fractures within the formation (without further fracturing the formation significantly by either forming new fractures within the formation and/or extending the existing fractures within the formation). In such stimulation operations, no proppant is used, and fluid injection can occur at a lower pressure.

In some cases, the existing fractures can be naturally occurring fractures present within a formation. For example, in some embodiments, the formation can include naturally fractured carbonate or naturally fractured sandstone. The presence or absence of naturally occurring fractures within a subterranean formation can be assessed using standard methods known in the art, including seismic surveys, geology, outcrops, cores, logging, reservoir characterization including preparing grids, etc.

In some embodiments, methods for stimulating an unconventional subterranean formation with a fluid can include injecting an aqueous fluid as described herein through a wellbore into the subterranean formation; allowing the aqueous fluid to imbibe into the subterranean formation for a period of time; and producing fluids from the subterranean formation through the wellbore. In these methods, the same wellbore can be used for both introducing the aqueous fluids and producing fluids from the unconventional subterranean formation, the same wellbore can be used. In some embodiments, introduction of the aqueous fluid can increase the production of hydrocarbons from the same wellbore, from a different wellbore in fluid communication with the unconventional subterranean formation, or any combination thereof.

In some embodiments, the stimulation operation can further include preparing the aqueous fluid. For example, in some embodiments, the stimulation operation can further include combining a friction reducer at a concentration of from 0.1 gpt to 5 gpt with a well treatment agent to form an aqueous fluid.

In some embodiments, the well treatment agent can be one or more of an acid, an alkali agent, a polymer, a gelling agent, a crosslinker, a biocide, a scale inhibitor, a breaker, a pH adjusting agent, a non-emulsifier agent, an iron control agent, a chelating agent, a corrosion inhibitor, a clay stabilizing agent, a wettability alteration chemical, an anti-foam agent (e.g., chemical defoamer), a sulfide scavenger, a mobility control agent, a co-solvent, a surfactant, a surfactant package, or any combination thereof.

In some embodiments when used in a stimulation operation, the well treatment agent can include one or more surfactants.

In some embodiments, the aqueous fluid can have a total surfactant concentration of at least 0.01% by weight, based on the total weight of the aqueous fluid (e.g., at least 0.5%, at least 1%, at least 2%, at least 3%, or at least 4%). In some embodiments, the aqueous fluid can have a total surfactant concentration of 5% by weight or less, based on the total weight of the aqueous fluid (e.g., 4% by weight or less, 3% by weight or less, 2% by weight or less, 1% by weight or less, 0.5% by weight or less, or 0.1% by weight or less).

The aqueous fluid can have a total surfactant concentration ranging from any of the minimum values described above to any of the maximum values described above. For example, in some embodiments, the aqueous fluid can have a total surfactant concentration of from 0.01% to 5% by weight, based on the total weight of the aqueous fluid (e.g., from 0.01% to 4%, from 0.01% to 3%, from 0.01% to 2%, from 0.01% to 1%, from 0.01% to from 0.01% to 0.1%, from 0.1% to 4%, from 0.1% to 3%, from 0.1% to 2%, from to 1%, from 0.1% to 0.5%, from 0.5% to 4%, from 0.5% to 3%, from 0.5% to 2%, from 0.5% to 1%, from 1% to 4%, from 1% to 3%, from 1% to 2%, from 2% to 4%, from 2% to 3%, from 3% to 4%, from 3% to 5%, from 4% to 5%, from 2% to 5%, from 1% to 5%, from 0.5% to 5%, or from 0.1% to 5%).

In some embodiments, injecting an aqueous fluid as described herein through a wellbore into the unconventional subterranean formation can include injecting the aqueous fluid through the wellbore and into the unconventional subterranean formation at a sufficient pressure and at a sufficient rate to stimulate hydrocarbon production from naturally occurring fractures in the unconventional subterranean formation without refracturing the wellbore.

The aqueous fluid as described herein can be allowed to contact (e.g., to imbibe) the unconventional subterranean formation for varying periods of time depending on the nature of the rock matrix. The imbibing can occur during the injection step, between the injecting and producing step, or any combination thereof. In some examples, the aqueous fluid can be allowed to imbibe into the unconventional subterranean formation for at least one day (e.g., at least two days, at least three days, at least four days, at least five days, at least six days, at least one week, at least two weeks, at least three weeks, at least one month, at least two months, at least three months, at least four months, or at least five months). In some examples, the aqueous fluid can be allowed to imbibe into the subterranean formation for six months or less (e.g., five months or less, four months or less, three months or less, two months or less, one month or less, three weeks or less, two weeks or less, one week or less, six days or less, five days or less, four days or less, three days or less, or two days or less).

In some embodiments, the wellbore used in the stimulation operation may have a substantially vertical portion and a substantially horizontal portion below the substantially vertical portion.

In some embodiments, the stimulation methods described herein can include stimulating a naturally fractured region of the unconventional subterranean formation proximate to a new wellbore (e.g., an infill well). In some embodiments, the stimulation methods described herein can include stimulating a naturally fractured region of the unconventional subterranean formation proximate to an existing wellbore.

In some embodiments, the stimulation methods described herein can include stimulating a previously fractured or previously refractured region of the unconventional subterranean formation proximate to a new wellbore (e.g., an infill well). In some embodiments, the stimulation methods described herein can include stimulating a previously fractured or previously refractured region of the unconventional subterranean formation proximate to an existing wellbore.

The previous refracturing operation may include hydraulic fracturing, fracturing using electrodes such as described in U.S. Pat. Nos. 9,890,627, 9,840,898, U.S. Patent Publication No. 2018/0202273, or refracturing with any other available equipment or methodology. In some embodiments, after a formation that has fractures, such as naturally occurring factures, fractures from a fracture operation, fractures from a refracturing operation, or any combination thereof, the fractured formation may be stimulated. For example, a formation may be stimulated after a sufficient amount of time has passed since the fracturing operation with electrodes or refracturing operation with electrodes occurred in that formation so that the electrical pulses utilized to fracture or refracture that formation do not substantially affect the aqueous fluid.

In some embodiments, the stimulation operation can further include adding a tracer to the aqueous fluid prior to introducing the aqueous fluid through the wellbore into the subterranean formation; recovering the tracer from the fluids produced from the subterranean formation through the wellbore, fluids recovered from a different wellbore in fluid communication with the subterranean formation, or any combination thereof; and comparing the quantity of tracer recovered from the fluids produced to the quantity of tracer introduced to the aqueous fluid. The tracer can be any suitable tracer, such as a water tracer or an oil tracer.

Also provided are methods of displacing a hydrocarbon material in contact with a solid material. These methods can include contacting a hydrocarbon material with the aqueous fluid described herein, wherein the hydrocarbon material is in contact with a solid material. The hydrocarbon material is allowed to separate from the solid material thereby displacing the hydrocarbon material in contact with the solid material. In some embodiments, the aqueous fluid can comprise a borate-acid buffer.

In other embodiments, the hydrocarbon material is unrefined petroleum (e.g., in a petroleum reservoir). In some further embodiments, the unrefined petroleum is a light oil. A "light oil" as provided herein is an unrefined petroleum with an API gravity greater than 30. In some embodiments, the API gravity of the unrefined petroleum is greater than 30. In other embodiments, the API gravity of the unrefined petroleum is greater than 40. In some embodiments, the API gravity of the unrefined petroleum is greater than 50. In other embodiments, the API gravity of the unrefined petroleum is greater than 60. In some embodiments, the API gravity of the unrefined petroleum is greater than 70. In other embodiments, the API gravity of the unrefined petroleum is greater than 80. In some embodiments, the API gravity of the unrefined petroleum is greater than 90. In other embodiments, the API gravity of the unrefined petroleum is greater than 100. In some other embodiments, the API gravity of the unrefined petroleum is between 30 and 100.

In other embodiments, the hydrocarbons or unrefined petroleum can include crude having an $H_2S$ concentration of at least 0.5%, a $CO_2$ concentration of 0.3%, or any combination thereof.

In some embodiments, the hydrocarbons or unrefined petroleum can include crude having an $H_2S$ concentration of at least 0.5% (e.g., at least 1%, at least 1.5%, at least 2%, at least 2.5%, at least 3%, at least 3.5%, at least 4%, or at least 4.5%). In some embodiments, the hydrocarbons or unrefined petroleum can include crude having an $H_2S$ concentration of 5% or less (e.g., 4.5% or less, 4% or less, 3.5% or less, 3% or less, 2.5% or less, 2% or less, 1.5% or less, or 1% or less).

The hydrocarbons or unrefined petroleum can include crude having an $H_2S$ concentration ranging from any of the minimum values described above. For example, in some embodiments, the hydrocarbons or unrefined petroleum can comprise crude having an $H_2S$ concentration of from 0.5% to 5% (e.g., from 0.5% to 2.5%, from 1% to 2%, from to 1%, from 1% to 2.5%, or from 2% to 2.5%).

In some embodiments, the hydrocarbons or unrefined petroleum can include crude having a $CO_2$ concentration of at least 0.3% (e.g., at least 0.5%, at least 1%, at least 1.5%, at least 2%, at least 2.5%, at least 3%, at least 3.5%, at least 4%, or at least 4.5%). In some embodiments, the hydrocarbons or unrefined petroleum can include crude having a $CO_2$ concentration of 5% or less (e.g., 4.5% or less, 4% or less, 3.5% or less, 3% or less, 2.5% or less, 2% or less, 1.5% or less, 1% or less, or 0.5% or less).

The hydrocarbons or unrefined petroleum can include crude having a $CO_2$ concentration ranging from any of the minimum values described above. For example, in some embodiments, the hydrocarbons or unrefined petroleum can include crude having a $CO_2$ concentration of from 0.3% to 5% (e.g., from 0.3% to 2.5%, from 0.5% to 5%, from 1% to 5%, from 0.5% to 2.5%, from 1% to 2%, from 0.5% to 1%, from 1% to 2.5%, from 3% to 5%, or from 2% to 5%).

The solid material may be a natural solid material (i.e., a solid found in nature such as rock). The natural solid material may be found in a petroleum reservoir. In some embodiments, the method is an enhanced oil recovery method. Enhanced oil recovery methods are well known in the art. A general treatise on enhanced oil recovery methods is Basic Concepts in Enhanced Oil Recovery Processes edited by M. Baviere (published for SCI by Elsevier Applied Science, London and New York, 1991). For example, in an enhanced oil recovery method, the displacing of the unrefined petroleum in contact with the solid material is accomplished by contacting the unrefined with an aqueous fluid provided herein, wherein the unrefined petroleum is in contact with the solid material. The unrefined petroleum may be in an oil reservoir. The composition can be pumped into the reservoir in accordance with enhanced oil recovery parameters. Upon contacting the unrefined petroleum, the composition can form an emulsion composition with the unrefined petroleum.

In some embodiments, the natural solid material can be rock or regolith. The natural solid material can be a geological formation such as elastics or carbonates. The natural solid material can be either consolidated or unconsolidated material or mixtures thereof. The hydrocarbon material may be trapped or confined by "bedrock" above or below the natural solid material. The hydrocarbon material may be found in fractured bedrock or porous natural solid material. In other embodiments, the regolith is soil. In other embodiments, the solid material can be, for example, oil sand or tar sands.

In other embodiments, the solid material can comprise equipment associated with an oil and gas operation. For example, the solid material can comprise surface processing equipment, downhole equipment, pipelines and associated equipment, pumps, and other equipment which contacts hydrocarbons during the course of an oil and gas operation.

In some embodiments, the aqueous fluid described herein can be introduced at a wellhead pressure of at least 0 PSI (e.g., at least 1,000 PSI, at least 2,000 PSI, at least 3,000 PSI, at least 4,000 PSI, at least 5,000 PSI, at least 6,000 PSI, at least 7,000 PSI, at least 8,000 PSI, at least 9,000 PSI, at least 10,000 PSI, at least 15,000 PSI, at least 20,000 PSI, or at least 25,000 PSI). In some embodiments, the aqueous fluid can be introduced at a wellhead pressure of 30,000 PSI or less (e.g., 25,000 PSI or less, 20,000 PSI or less, 15,000 PSI or less, 10,000 PSI or less, 9,000 PSI or less, 8,000 PSI or less, 7,000 PSI or less, 6,000 PSI or less, 5,000 PSI or less, 4,000 PSI or less, 3,000 PSI or less, 2,000 PSI or less, or 1,000 PSI or less).

The aqueous fluid described herein can be introduced at a wellhead pressure ranging from any of the minimum values described above to any of the maximum values described above. For example, in some embodiments, the aqueous fluid can be introduced at a wellhead pressure of from 0 PSI to 30,000 PSI (e.g., from 6,000 PSI to 30,000 PSI, from 0 PSI to 10,000 PSI, from 0 PSI to 5,000 PSI, or from 5,000 PSI to 10,000 PSI). In some embodiments, the aqueous fluid can be used in a reservoir stimulation operation, and the aqueous fluid can be introduced at a wellhead pressure of from 0 PSI to 1,000 PSI.

In some embodiments, there is no need to drill the wellbore. In some embodiments, the wellbore has been drilled and completed, and hydrocarbon production has occurred from the wellbore. In other embodiments, methods described herein can optionally include one or more of drilling the wellbore, completing the wellbore, and producing hydrocarbons from the wellbore (prior to injection of the aqueous fluid).

Also provided are methods for the pressure protection of an existing wellbore (e.g., by pre-loading the wells) that has previously been fractured in proximity to a new wellbore to be fractured. The methods can include injecting an aqueous fluid described herein into the unconventional subterranean formation via the existing wellbore in fluid communication with the unconventional subterranean formation prior to and/or during injection of a fracturing fluid into the unconventional subterranean formation via a new wellbore in fluid communication with the unconventional subterranean formation.

The unconventional subterranean formation in proximity to the existing wellbore can be fractured. For example, in some embodiments, the unconventional subterranean formation in proximity to the existing wellbore can have been previously fractured (e.g., by injection of a fracturing fluid). In other embodiments, the unconventional subterranean formation in proximity to the existing wellbore has not been previously fractured, but the unconventional subterranean formation is naturally fractured. In other embodiments, the unconventional subterranean formation is naturally fractured and the unconventional subterranean formation in proximity to the existing wellbore has been previously fractured (e.g., by injection of a fracturing fluid).

The aqueous fluid can be injected at a pressure and flowrate effective to increase the existing wellbore pressure, stress, or any combination thereof without substantially refracturing the existing wellbore. The volume of aqueous fluid injected can be selected to increase the existing wellbore pressure and stress without substantially refracturing the existing wellbore.

The pressure profile can be monitored during injection of the aqueous fluid into the existing wellbore. During injection without substantially refracturing the existing wellbore, the pressure can increase as the aqueous fluid is injected into the existing wellbore. When the injection pressure begins to plateau, this indicates substantial refracturing of the existing wellbore is occurring. The phrase "substantially refracturing the existing wellbore," as used herein, refers to circumstances where no fracturing is observed (in the form of plateauing) when monitoring injection pressure during injection of the aqueous fluid.

In some embodiments, there is no need to drill the existing wellbore and the new wellbore. In some embodiments, the existing wellbore has been drilled, the existing wellbore has been completed, and hydrocarbon production has occurred from the existing wellbore. In some embodiments, the new wellbore has been drilled. Furthermore, in some embodiments, the new wellbore may not be completed and the region proximate to the new wellbore has not been previously fractured by hydraulic fracturing. In other embodiments, methods can optionally include one or more of drilling the existing wellbore, completing the existing wellbore, producing hydrocarbons from the existing wellbore (prior to injection of the aqueous fluid), or drilling the new wellbore in proximity to the existing wellbore.

Further, while embodiments discussed herein may reference a single existing wellbore and a single new wellbore, one of ordinary skill in the art will understand that the methods described herein apply to circumstances which include a plurality of existing wellbores proximate to a single new wellbore, a plurality of new wellbores proximate to a single existing wellbore, or a plurality of existing wellbores proximate to a plurality of new wellbores.

In some embodiments, the existing wellbore was under production prior to injection of the aqueous fluid. For example, in some embodiments, the existing wellbore was under production for at least three months (e.g., at least six months, at least one year, at least two years, at least three years, at least four years, at least five years, at least ten years, at least twenty years, or more) prior to injection of the aqueous fluid. In certain embodiments, the existing wellbore was under production for from three months to twenty years (e.g., from one year to ten years, or from one year to five years) prior to injection of the aqueous fluid.

In some embodiments, at least 10,000 barrels of hydrocarbon (e.g., at least 20,000 barrels of hydrocarbon, at least 30,000 barrels of hydrocarbon, at least 40,000 barrels of hydrocarbon, at least 50,000 barrels of hydrocarbon, at least 100,000 barrels of hydrocarbon, at least 200,000 barrels of hydrocarbon, at least 300,000 barrels of hydrocarbon, at least 400,000 barrels of hydrocarbon, at least 500,000 barrels of hydrocarbon, or more) were produced from the existing wellbore prior to injection of the aqueous fluid. In some embodiments, from 10,000 barrels of hydrocarbon to 500,000 barrels of hydrocarbon were produced from the existing wellbore prior to injection of the aqueous fluid.

In some examples, the existing wellbore can have a pressure that of from 5% to 70% of the original reservoir pressure. The original reservoir pressure and the existing wellbore pressure can be measured using standard methods known in the art. The original reservoir pressure can be measured during and/or after of drilling of the existing wellbore (prior to any hydrocarbon production) using, for example, downhole gauges, fiber optics equipment, or other logging equipment. Should no equipment be available, the surface pressure can be used along with the density/height of the fluid column to estimate the original reservoir pressure using the equation: P(surface pressure)+pgh=P(bottomhole pressure). Likewise, the existing wellbore pressure can be measured immediately prior to injection of the aqueous fluid using, for example, downhole gauges, fiber optics equipment, or other logging equipment. Should no equipment be available, the surface pressure can be used along with the density/height of the fluid column to estimate the original reservoir pressure using the equation: P(surface pressure)+pgh=P(bottomhole pressure).

The original reservoir fracture pressure and existing reservoir fracture pressure can be measured using standard methods. For example, the original reservoir fracture pressure can be measured using a mini-frac and DFIT method between drilling and fracturing to measure the original reservoir fracture pressure (see, for example, the methods described at http://www.fekete.com/SAN/TheoryAndEquations/WellTestTheoryEquations/Minifrac.htm). Likewise, the existing reservoir fracture pressure can be measured using a mini-frac and DFIT method between drilling and fracturing to measure the existing reservoir fracture pressure. Empirical equations, such as those described in Zhang et al. ("Fracture Gradient Prediction: An Overview and an Improved Method," *Pet. Sci.*, 2017, 14: 720-730, which is hereby incorporated by reference), can be used to account for changes in stresses and pore pressure due to the depletion of fluids. The existing reservoir fracture pressure can also be measured in a laboratory using reservoir rock, fluids, and standard testing methods.

Step (a) can comprise injecting the aqueous fluid at a pressure and flowrate effective to increase the existing wellbore pressure by at least 5% (e.g., at least 10% at least 20%, at least 30%, at least 40%, at least 50%, at least 60%, at least 70%, at least 80%, at least 90%, at least 100%, at least 110%, at least 120%, at least 130%, at least 140%, at least 150%, at least 160%, at least 170%, at least 180%, at least 190%, at least 200%, at least 250%, at least 300%, at least 400%, or at least 450%) (without substantially refracturing the existing wellbore). In some embodiments, step (a) can comprise injecting the aqueous fluid at a pressure and flowrate effective to increase the existing wellbore pressure by from 5% to 500% (e.g., from 50% to 500%, or from 100% to 500%) (without substantially refracturing the existing wellbore).

Step (a) can comprise injecting a volume of the aqueous fluid effective to increase the existing wellbore pressure by at least 5% (e.g., at least 10% at least 20%, at least 30%, at least 40%, at least 50%, at least 60%, at least 70%, at least 80%, at least 90%, at least 100%, at least 110%, at least 120%, at least 130%, at least 140%, at least 150%, at least 160%, at least 170%, at least 180%, at least 190%, at least 200%, at least 250%, at least 300%, at least 400%, or at least 500%) (without substantially refracturing the existing wellbore). In some embodiments, step (a) can comprise injecting a volume of the aqueous fluid effective to increase the existing wellbore pressure by from 5% to 500% (e.g., from 50% to 500%, or from 100% to 500%) (without substantially refracturing the existing wellbore).

In some examples, step (a) can comprise injecting the aqueous fluid at a pressure and flowrate effective to increase the existing wellbore pressure to from greater than the original reservoir pressure to 150% of the original reservoir pressure (without substantially refracturing the existing wellbore).

In some examples, step (a) can comprise injecting a volume of the aqueous fluid effective to increase the existing wellbore pressure to from greater than the original reservoir pressure to 150% of the original reservoir pressure (without substantially refracturing the existing wellbore).

In some examples, step (a) can comprise injecting the aqueous fluid at a pressure and flowrate effective to increase the existing wellbore pressure to within 15% (e.g., ±15%) of existing reservoir fracture pressure (so as to not substantially refracture the existing wellbore). Step (b) can comprise injecting the aqueous fluid at least two weeks before fracturing, optionally injecting the aqueous fluid at least one week before fracturing, at least days before fracturing, at least 4 days before fracturing, at least 3 days before fracturing, at least 2 days before fracturing, or at least 1 day before fracturing.

In some examples, step (a) can comprise injecting a volume of the aqueous fluid effective to increase the existing wellbore pressure to within 15% (e.g., ±15%) of existing reservoir fracture pressure (so as to not substantially refracture the rock matrix in proximity to the existing wellbore).

In some embodiments, the original reservoir pressure can be at least 4000 psia (e.g., at least 5000 psia, at least 6000 psia, at least 7000 psia, at least 8000 psia, or at least 9000 psia). In some embodiments, the original reservoir pressure can be 10000 psia or less (e.g., 9000 psia or less, 8000 psia or less, 7000 psia or less, 6000 psia or less, or 5000 psia or less). In some cases, the original reservoir pressure can range from any of the minimum values described above to any of the maximum values described above. For example, in some embodiments, the original reservoir pressure can be from 4000 psia to 10000 psia (e.g., from 5000 psia to 10000 psia).

In some embodiments, the original reservoir fracture pressure can be at least 5000 psia (e.g., at least 6000 psia, at least 7000 psia, at least 8000 psia, at least 9000 psia, at least 10000 psia, or at least 11000 psia). In some embodiments, the original reservoir fracture pressure can be 12000 psia or less (e.g., 11000 psia or less, 10000 psia or less, 9000 psia or less, 8000 psia or less, 7000 psia or less, 6000 psia or less, or 5000 psia or less).

In some cases, the original reservoir fracture pressure can range from any of the minimum values described above to any of the maximum values described above. For example, in some embodiments, the original reservoir fracture pressure can be from 5000 psia to 12000 psia (e.g., from 6000 psia to 10000 psia).

In some embodiments, the existing wellbore pressure can be at least 500 psia (e.g., at least 1000 psia, at least 2000 psia, at least 3000 psia, at least 4000 psia, or at least 5000 psia). In some embodiments, the existing wellbore pressure can be 6000 psia or less (e.g., 5000 psia or less, 4000 psia or less, 3000 psia or less, 2000 psia or less, or 1000 psia or less).

In some cases, the existing wellbore pressure can range from any of the minimum values described above to any of the maximum values described above. For example, in some embodiments, the existing wellbore pressure can be from 500 psia to 6000 psia (e.g., from 1000 psia to 4000 psia).

In some embodiments during a pressure protection operation described herein, the aqueous fluid can be injected at a pressure and flowrate effective to increase the existing wellbore pressure to at least 4000 psia (e.g., at least 5000 psia, at least 6000 psia, at least 7000, at least 8000 psia, or at least 9000 psia). In some embodiments during a pressure protection operation described herein, the aqueous fluid can be injected at a pressure and flowrate effective to increase the existing wellbore pressure to 10000 psia or less (e.g., 9000 psia or less, 8000 psia or less, 7000 psia or less, 6000 psia or less, or 5000 psia or less).

In some cases during a pressure protection operation described herein, the aqueous fluid can be injected at a pressure and flowrate effective to increase the existing wellbore pressure to a pressure ranging from any of the minimum values described above to any of the maximum values described above. For example, in some embodiments during a pressure protection operation described herein, the aqueous fluid can be injected at a pressure and flowrate effective to increase the existing wellbore pressure to from 4000 psia to 10000 psia.

In some embodiments during a pressure protection operation described herein, the volume of the aqueous fluid injected can be effective to increase the existing wellbore pressure to at least 4000 psia (e.g., at least 5000 psia, at least 6000 psia, at least 7000, at least 8000 psia, or at least 9000 psia). In some embodiments during a pressure protection operation described herein, the volume of the aqueous fluid injected can be effective to increase the existing wellbore pressure to 10000 psia or less (e.g., 9000 psia or less, 8000 psia or less, 7000 psia or less, 6000 psia or less, or 5000 psia or less).

In some cases during a pressure protection operation described herein, the volume of the aqueous fluid injected can be effective to increase the existing wellbore pressure to a pressure ranging from any of the minimum values described above to any of the maximum values described above. For example, in some embodiments during a pressure protection operation described herein, the volume of the aqueous fluid injected can be effective to increase the existing wellbore pressure to from 4000 psia to 10000 psia.

By way of example, in some embodiments, the original reservoir pressure can be approximately 6000-7000 psia, and an original reservoir fracture pressure of from approximately 8000-9000 psia. After 1 year of production, the existing wellbore can have a wellbore pressure substantially below original reservoir pressure. For example, after 1 year of production, the existing wellbore pressure can drop to approximately 3000-4000 psia. After more than a year, the existing wellbore pressure can drop even further (e.g., to approximately 2000-3000 psia). During a pressure protection operation described herein, the aqueous fluid can be injected at a pressure and flowrate effective to increase the existing wellbore pressure to approximately 4000-9000 psia.

In some embodiment, a single aqueous fluid can be injected into the existing wellbore. In other embodiments, injection of the aqueous fluid into the existing wellbore can comprise sequential injection of a series (e.g., two, three, four, or five) of aqueous fluid of varying composition into the existing wellbore. The series of injections can, in combination, increase the existing wellbore pressure to its desired level. In some embodiments, the series of injections, can in combination increase the existing wellbore pressure to is desired level for pressure protection of the existing wellbore.

By way of example, in some embodiments, injection can comprise injection of a first aqueous fluid into the existing wellbore followed by injection of a second aqueous fluid into the existing wellbore.

In some of these embodiments, the first aqueous fluid can be allowed to soak in contact with the formation for a period of time (e.g., 1 hour, 2 hours, 6 hours, 12 hours, 24 hours, 48 hours, 72 hours, 1 week, 2 week, 3 weeks, 1 month or more) prior to injection of the second aqueous fluid.

In some of these embodiments, the first aqueous fluid can be allowed to soak in contact with the formation for a period of time of at least 1 hour (e.g., at least 2 hours, at least 6 hours, at least 12 hours, at least 24 hours, at least 48 hours, at least 72 hours, at least 1 week, at least 2 weeks, at least 3 weeks, at least 1 month, or at least 1.5 months).

In some of these embodiments, the first aqueous fluid can be allowed to soak in contact with the formation for a period of time of 2 months or less (e.g., 1 month or less, 3 weeks or less, 2 weeks or less, 1 week or less, 72 hours or less, 48 hours or less, 24 hours or less, 12 hours or less, 6 hours or less, or 2 hours or less).

The first aqueous fluid can be allowed to soak in contact with the formation for a period of time ranging from any of the minimum values described above to any of the maximum values described above. For example, in some embodiments, the first aqueous fluid can be allowed to soak in contact with the formation for a period of time of from 1 hour to 2 months prior to injection of the second aqueous fluid (e.g., from 1 hour to 1 month, from 1 hour to 3 weeks, from 1 hour to 2 weeks, from 1 hour to 1 week, from 1 hour to 72 hours, from 1 hour to 48 hours, from 1 hour to 24 hours, from 1 hour to 12 hours, from 1 hour to 6 hours, from 1 hour to 2 hours, from 6 hours to 2 month, from 6 hours to 1 month, from 6 hours to 3 weeks, from 6 hours to 2 weeks, from 6 hours to 1 week, from 6 hours to 72 hours, from 6 hours to 48 hours, from 6 hours to 24 hours, from 6 hours to 12 hours, from 12 hours to 2 months, from 12 hours to 1 month, from 12 hours to 3 weeks, from 12 hours to 2 weeks, from 12 hours to 1 week, from 12 hours to 72 hours, from 12 hours to 48 hours, from 12 hours to 24 hours, from 24 hours to 2 months, from 24 hours to 1 month, from 24 hours to 3 weeks, from 24 hours to 2 weeks, from 24 hours to 1 week, from 24 hours to 72 hours, from 24 hours to 48 hours, from 48 hours to 2 months, from 48 hours to 1 month, from 48 hours to 3 weeks, from 48 hours to 2 weeks, from 48 hours to 1 week, from 48 hours to 72 hours, from 72 hours to 2 months, from 72 hours to 1 month, from 72 hours to 3 weeks, from 72 hours to 2 weeks, from 72 hours to 1 week, from 1 week to 2 months, from 1 week to 1 month, from 1 week to 3 weeks, from 1 week to 2 weeks, from 2 weeks to 3 weeks, from 2 weeks to 1 month, from 2 weeks to 2 months, from 3 weeks to 1 month, from 3 weeks to 2 months, or from 1 month to 2 months).

In some of these embodiments, the first aqueous fluid can comprise acid (e.g., HCl or HF). In some of these embodiments, the second aqueous fluid can comprise an alkali, a surfactant, or any combination thereof. In some of these embodiments, the total volume of the first aqueous fluid and the second aqueous fluid can be effective to increase the existing wellbore pressure to from greater than the original reservoir pressure to 150% of the original reservoir pressure. In some of these embodiments, methods can further comprise injection of a third aqueous fluid (e.g., a hydrocarbon solvent such as LPG). In some embodiments, methods can further comprise injection of a gas (such as $CO_2$ or natural gas, as discussed in more detail below) into the existing wellbore.

In another embodiment, injection can comprise injection of a first aqueous fluid into the existing wellbore followed by injection of a second aqueous fluid into the existing wellbore. In some embodiments, the first aqueous fluid can comprise an alkali, a surfactant, or any combination thereof. In some embodiments, the second aqueous fluid can comprise a hydrocarbon solvent such as LPG. In some embodiments, methods can further comprise injection of a gas (such as $CO_2$ or natural gas, as discussed in more detail below) into the existing wellbore.

In another embodiment, injection can comprise alternating injections of an aqueous fluid (e.g., comprising an alkali, a surfactant, or any combination thereof) and a gas (e.g., $CO_2$ or natural gas). In some embodiments, injection can comprise injection of a first aqueous fluid (e.g., comprising an acid such as HCl or HF) followed by alternating injections of an aqueous fluid (e.g., an alkali, a surfactant, or any combination thereof) and a gas (e.g., $CO_2$ or natural gas).

In another embodiment, injection can comprise alternating injections of an aqueous fluid comprising a hydrocarbon solvent (e.g., LPG) and a gas (e.g., $CO_2$ or natural gas). In some embodiments, injection can comprise injection of a first aqueous fluid (e.g., comprising an acid such as HCl or HF) followed by alternating injections of an aqueous fluid comprising a hydrocarbon solvent (e.g., LPG) and a gas (e.g., $CO_2$ or natural gas).

The aqueous fluid can be injected into the existing wellbore prior to and/or during injection of a fracturing fluid into the unconventional subterranean formation via the new wellbore. The aqueous fluid can be maintained within the existing wellbore during the course of a fracturing operation performed in the new wellbore. If desired, injection of the aqueous fluid can be continued after completion of a fracturing operation performed using the new wellbore.

In some embodiments, methods can further comprise performing a fracturing operation in the new wellbore. For example, methods can further comprise injecting a fracturing fluid into the unconventional subterranean formation via the new wellbore at a sufficient pressure to create or extend at least one fracture in the unconventional subterranean formation in a region proximate to the new wellbore.

In some embodiments, injection of the aqueous fluid in the existing wellbore impacts a direction, a geometry, or any combination thereof of the at least one fracture created or extended during injection of the fracturing fluid into the unconventional subterranean formation via the new wellbore. For example, the aqueous fluid in the existing wellbore can direct fracture formation away from the fractured region proximate to the existing wellbore, and towards virgin rock proximate to the new wellbore.

In some embodiments, the injection of the aqueous fluid in the existing wellbore can reduce entry of fluid, debris, or any combination thereof into the existing wellbore during injection of the fracturing fluid into the unconventional subterranean formation via the new wellbore.

In some embodiments, the method further includes producing a hydrocarbon from the existing wellbore during and/or after the injection of the fracturing fluid into the unconventional subterranean formation via the new wellbore. In some embodiments, injection of the aqueous fluid into the existing wellbore can decrease the decline of a decline curve fit to production history of the existing wellbore.

In some embodiments, the method can further result in increased hydrocarbon recovery from the existing wellbore, the new wellbore, or any combination thereof. For example, injection of the aqueous fluid into the existing wellbore can result in increased hydrocarbon recovery from the existing wellbore as compared to an expected level of hydrocarbon recovery projected from a decline curve fit to production history of the existing wellbore. The decline curve can be fit to production history of the existing wellbore using, for example, Arp's Equation. Methods for determining decline curves for production wells are well known in the art. See, for example, "Estimating Ultimate Recovery of Developed Wells in Low-Permeability Reservoirs," Monograph 4, Society of Petroleum Engineers (ISBN 9781938330018) and "Guidelines for the Practical Evaluation of Undeveloped Reserves in Resource Plays," Monograph 3, Society of Petroleum Engineers (2010), each of which is hereby incorporated by reference in its entirety.

In some embodiments, injection of the aqueous fluid in the existing wellbore can increase the relative permeability in a region proximate to the existing wellbore. In some embodiments, injection of the aqueous fluid in the existing wellbore releases hydrocarbons from pores in the region proximate to the existing wellbore.

Optionally, in some embodiments, the method can further comprise modeling the existing wellbore and the region proximate to the existing wellbore to determine a volume of the aqueous fluid to be injected into the unconventional subterranean formation via the existing wellbore.

In some embodiments, described is a method for pressure protection of a first wellbore in proximity to a second wellbore, the method comprising injecting an aqueous fluid into the first wellbore in fluid communication with an unconventional subterranean formation prior to and/or during fracturing of the second wellbore in fluid communication with the unconventional subterranean formation. The first wellbore can have an existing reservoir pressure that is less than original reservoir pressure. The aqueous fluid can be injected at a pressure and flowrate effective to increase the first wellbore pressure without fracturing the first wellbore.

The methods described herein may involve one or more of the following:

(1) Determining which wells require/would benefit from preloading based on geomechanical analysis (e.g., performing preloading on all existing wells that lie on the fracture plane adjacent to the planned new child well).

(2) Preparing existing (parent or teenage) wells for preloading. This can include pulling/replacing any low pressure downhole valves that may be damaged during the new (child) well fracturing operation due to higher expected pressures. For example, a slickline intervention can be performed to retrieve low pressure side pocket mandrel valves used for gas lifted wells and the tubing, rods, and pump can be pulled on rod pump artificial lift wells. Existing wells may also be shut-in for a period of time (e.g., as long as 1 week) prior to the preload operation.

(3) Installing downhole surveillance equipment to monitor pressure in existing (parent or teenage) wells. Use of pressure information may aid in identifying the ideal time period to perform fracturing operations in the child well, as well as, determining the amount of aqueous fluid to use during a preload operation in the existing wells.

(4) Shutting-in the existing wells closer to the new child well for at least for 24 hours.

(5) Preloading existing wells closer to the new child well with larger amount of aqueous fluid (e.g., injecting 20,000 bbls of aqueous fluid in an existing parent well immediately adjacent to the new child well and injecting only 10,000 bbls of aqueous fluid in an existing teenage well that is further from the new child well). Existing wells farther away from the new child well may alternatively be shut-in or continue producing instead of undergoing a preload operation.

(6) Pre-loading can involve injection of an aqueous fluid all at once or in multiple steps. For example, acid can be injected at the beginning to clean out the wellbore area and alter the rock wettability mixed with or followed by a surfactant and/or alkaline solutions.

(7) Preloading existing wells closer to the new child well with one aqueous fluid and preloading existing wells farther from the new child well with a similar aqueous fluid or a different aqueous fluid.

(8) Injecting a sulfide scavenger with the aqueous fluid to reduce the risk of sulfide stress cracking of wells if hydrogen sulfide has been detected or is a factor in the reservoir being produced.

(9) Shut-in the pre-loaded existing wells during the fracturing of the new child well.

(10) Swabbing in existing wells to unload preload aqueous fluids from the production tubing and return existing wells to production subsequent to performing the fracturing operation on the child well.

(11) Optionally continuing injection of the aqueous fluid for a period of time after the new wellbore has been fractured.

As discussed herein, the methods described can also be used to monitor surface roughness of a tubing and/or casing. In some embodiments, methods of monitoring surface roughness of a tubing and/or casing can include: measuring pressure drop of water; measuring pressure drop of an aqueous fluid described herein; calculating a drag reduction (DR) factor using the equation below:

$$DR=(dP_{water}-dP_{FR})/dP_{water}$$

wherein $dP_{water}$ is the calculated value for pressure drop along the lateral segment of the wellbore for water, and $dP_{FR}$ is the pressure drop along the later segment of the wellbore for the aqueous fluid; and correlating the drag reduction factor to a surface roughness value. In some embodiments, surface roughness can be based on calculating pressure drop of an aqueous fluid at a flow rate over Reynolds number using a Colebrook-White equation or Moody Chart. In some further embodiments, the surface roughness can also be dependent on the internal diameter of the tubing and/or casing.

In some embodiments, the surface roughness value can be an indicator of the effectiveness of the aqueous fluid described herein. In some other embodiments, an increase in surface roughness value can be an indicator of corrosion, scaling, or any combination thereof. In some embodiments, a decrease in the diameter of the tubing and/or casing can be associated with corrosion, scaling, or any combination thereof. In some embodiments, the methods can further include reducing or inhibiting corrosion, scaling, or any combination thereof in the tubing and/or casing by administering to the wellbore a clean-up treatment, corrosion treatment, corrosion inhibitor, descaling treatment, or any combination thereof when an increase in surface roughness value, a decrease in the diameter of the tubing and/or casing, or any combination thereof is identified using the methods described herein.

Aqueous Fluid

The aqueous fluid described herein can include a well treatment agent and a friction reducer.

The one or more well treatment agents can include water, an acid, an alkali agent, a polymer, a gelling agent, a crosslinker, a biocide, a scale inhibitor, a breaker, a pH adjusting agent, a non-emulsifier agent, an iron control agent, a chelating agent, a corrosion inhibitor, a clay stabilizing agent, a wettability alteration chemical, an anti-foam agent (e.g., chemical defoamer), a sulfide scavenger, a mobility control agent, a co-solvent, a surfactant, a surfactant package, or any combination thereof.

The aqueous fluid can include any type of water, treated or untreated, and can vary in salt content. For example, the aqueous fluid can include sea water, brackish water, flowback or produced water, wastewater (e.g., reclaimed or recycled), river water, brine (e.g., reservoir or synthetic brine), fresh water (e.g., fresh water comprises <1,000 ppm TDS water), or any combination thereof. In some embodiments, the aqueous fluid can include slickwater.

In some embodiments, the water can include hard water or hard brine. The hard water or hard brine can include a divalent metal ion chosen from $Ca^{2+}$, $Mg^{2+}$, $Sr^{2+}$, $Ba^{2+}$, or any combination thereof. In certain embodiments, the hard water or hard brine can include at least 10 ppm, at least 100 ppm, at least 500 ppm, at least 1,000 ppm, at least 5,000 ppm, or at least 10,000 ppm of divalent metal ions can be chosen from $Ca^{2+}$, $Mg^{2+}$, $Sr^{2+}$, $Ba^{2+}$, or any combination thereof. In certain examples, the hard water or hard brine can include from 100 ppm to 25,000 ppm of divalent metal ions chosen from $Ca^{2+}$, $Mg^{2+}$, $Sr^{2+}$, $Ba^{2+}$, or any combination thereof.

In some embodiments, the aqueous fluid can be substantially free of proppant particles.

In some embodiments, the aqueous fluid can be in the form of an aqueous solution. In these embodiments, the aqueous fluid can include from 30% to 99.85% by weight of the total composition of water, for example from 70% to 98% water, from 70% to 90% water, from 70% to 80% water, from 50% to 90% water, from 50% to 70% water, from 50% to 80% water, from 40% to 98% water, or from 50% to 99% water.

In some embodiments, the aqueous fluid can include a friction reducer. Examples of friction reducers are known in the art. Examples of suitable polymers include synthetic polymers such as polyacrylamides. Examples of suitable polymers include synthetic polymers such as partially hydrolyzed polyacrylamides (HPAMs or PHPAs) and hydrophobically-modified associative polymers (APs). Also included are co-polymers of polyacrylamide (PAM) and one or both of 2-acrylamido 2-methylpropane sulfonic acid (and/or sodium salt) commonly referred to as AMPS (e.i., acrylamido tertiobutyl sulfonic acid or ATBS), N-vinyl pyrrolidone (NVP), and the NVP-based synthetic may be single-, co-, or ter-polymers. In one embodiment, the synthetic polymer is polyacrylic acid (PAA). In one embodiment, the synthetic polymer is polyvinyl alcohol (PVA). Copolymers may be made of any combination or mixture above, for example, a combination of NVP and ATBS. Indeed, the terminology "mixtures thereof" or "combinations thereof" can include "modifications thereof" herein.

In some embodiments, the friction reducer can be present in the aqueous fluid in a concentration of at least 0.1 gpt (e.g., at least 0.5 gpt, at least 1 gpt, at least 2 gpt, at least 3 gpt, or at least 4 gpt). In some embodiments, the friction reducer can be present in the aqueous fluid in a concentration of 5 gpt or less (e.g., 4 gpt or less, 3 gpt or less, 2 gpt or less, 1 gpt or less, or 0.5 gpt or less).

The friction reducer can be present in the aqueous fluid in a concentration ranging from any of the minimum values described above to any of the maximum values described above. For example, in some embodiments, the friction reducer can be present in the aqueous fluid in a concentration ranging from 0.1 gpt to 5 gpt (e.g., from 0.1 gpt to 4.5 gpt, from 0.1 gpt to 4 gpt, from 0.1 gpt to 3.5 gpt, from 0.1 gpt to 3 gpt, from 0.1 gpt to 2.5 gpt, from 0.1 gpt to 2 gpt, from 0.1 gpt to 1.5 gpt, from 0.1 gpt to 1 gpt, from 0.1 gpt to 0.5 gpt, from 1 gpt to 2 gpt, from 1 gpt to 3 gpt, from 1 gpt to 4 gpt, from 1 gpt to 5 gpt, from 0.5 gpt to 2 gpt, from 0.5 gpt to 3 gpt, from 0.5 gpt to 4 gpt, from 0.5 gpt to 5 gpt, from 2 gpt to 4 gpt, from 2 gpt to 5 gpt, from 2 gpt to 3 gpt, from 3 gpt to 5 gpt, from 3 gpt to 4 gpt, or from 4 gpt to 5 gpt).

In some embodiments, the aqueous fluid can include alkoxylated C6-C32 alcohol. In some embodiments, the aqueous fluid can include disulfonate. In some embodiments, the aqueous fluid can include polyacrylamides polymer or co-polymers (e.g., partially hydrolyzed polyacrylamides (HPAMs or PHPAs) and hydrophobically-modified associative polymers (Aps), co-polymers of polyacrylamide (PAM) and one or both of 2-acrylamido 2-methylpropane sulfonic acid (and/or sodium salt), N-vinyl pyrrolidone (NVP), and the NVP-based synthetic polymers). In some embodiments, the aqueous fluid can include alkoxylated C6-C32 alcohol, disulfonate, and polyacrylamide polymer or co-polymers.

In some embodiments, the aqueous fluid can include at least 0.04% by weight alkoxylated C6-C32 alcohol, based on the weight of the aqueous fluid (e.g., at least 0.05%, at least 0.075%, at least 0.1%, at least 0.25%, at least 0.5%, or at least 0.75%).

In some embodiments, the aqueous fluid can include 1% by weight or less alkoxylated C6-C32 alcohol, based on the weight of the aqueous fluid (e.g., 0.75% or less, or less, 0.25% or less, 0.1% or less, 0.075% or less, or 0.05% or less).

The aqueous fluid can have a concentration of the alkoxylated C6-C32 alcohol ranging from any of the minimum values described above to any of the maximum values described above. For example, in some embodiments, the aqueous fluid can have a concentration of from 0.04% to 1% by weight alkoxylated C6-C32 alcohol, based on the weight of the aqueous fluid (e.g., from 0.05% to 1%, from 0.075% to 1%, from 0.1% to 1%, from 0.25% to 1%, from 0.5% to 1%, from 0.75% to 1%, from 0.04% to 0.75%, from 0.05% to 0.75%, from 0.075% to 0.75%, from 0.1% to 0.75%, from 0.25% to 0.75%, from 0.5% to from 0.04% to 0.75%, from 0.04% to 0.5%, from 0.05% to 0.5%, from 0.075% to from 0.1% to 0.5%, from 0.25% to 0.5%, from 0.04% to 0.25%, from 0.05% to from 0.075% to 0.25%, from 0.1% to 0.25%, from 0.04% to 0.1%, from 0.05% to from 0.075% to 0.1, from 0.04% to 0.075%, or from 0.05% to 0.075%).

In some embodiments, the aqueous fluid can include at least 0.03% by weight disulfonate, based on the weight of the aqueous fluid (e.g., at least 0.05%, at least 0.075%, at least 0.1%, at least 0.25%, or at least 0.5%).

In some embodiments, the aqueous fluid can include 0.75% by weight or less disulfonate, based on the weight of the aqueous fluid (e.g., 0.5% or less, 0.25% or less, or less, 0.075% or less, or 0.05% or less).

The aqueous fluid can have a concentration of the disulfonate ranging from any of the minimum values described above to any of the maximum values described above. For example, in some embodiments, the aqueous fluid can have a concentration of from 0.03% to 0.75% by weight disulfonate, based on the weight of the aqueous fluid (e.g., from 0.05% to 0.75%, from 0.075% to 0.75%, from 0.1% to 0.75%, from 0.25% to 0.75%, from 0.5% to from 0.03% to 0.5%, from 0.05% to 0.5%, from 0.075% to 0.5%, from 0.1% to 0.5%, from 0.25% to 0.5%, from 0.03% to 0.25%, from 0.05% to 0.25%, from 0.075% to from 0.1% to 0.25%, from 0.03% to 0.1%, from 0.05% to 0.1%, from 0.075% to from 0.03% to 0.075%, from 0.05% to 0.075%, or from 0.03% to 0.05%).

In some embodiments, the aqueous fluid can include at least 0.1 gpt polyacrylamide polymer or copolymers (e.g., at least 0.5 gpt, at least 1 gpt, at least 2 gpt, at least 3 gpt, or at least 4 gpt).

In some embodiments, the aqueous fluid can include 5 gpt or less polyacrylamide polymer or copolymers (e.g., 4 gpt or less, 3 gpt or less, 2 gpt or less, 1 gpt or less, or 0.5 gpt or less).

The aqueous fluid can have a concentration of the polyacrylamide polymer or copolymers ranging from any of the minimum values described above to any of the maximum values described above. For example, in some embodiments, the aqueous fluid can have a concentration of from 0.1 gpt to 5 gpt polyacrylamide polymer or copolymers (e.g., from 0.1 gpt to 4.5 gpt, from 0.1 gpt to 4 gpt, from 0.1 gpt to 3.5 gpt, from 0.1 gpt to 3 gpt, from 0.1 gpt to 2.5 gpt, from 0.1 gpt to 2 gpt, from 0.1 gpt to 1.5 gpt, from 0.1 gpt to 1 gpt, from 0.1 gpt to 0.5 gpt, from 1 gpt to 2 gpt, from 1 gpt to 3 gpt, from 1 gpt to 4 gpt, from 1 gpt to 5 gpt, from 0.5 gpt to 2 gpt, from 0.5 gpt to 3 gpt, from 0.5 gpt to 4 gpt, from gpt to 5 gpt, from 2 gpt to 4 gpt, from 2 gpt to 5 gpt, from 2 gpt to 3 gpt, from 3 gpt to 5 gpt, from 3 gpt to 4 gpt, or from 4 gpt to 5 gpt).

In some embodiments, the aqueous fluid can include at least 0.04% alkoxylated C6-C32 alcohol (e.g., at least 0.05%, at least 0.075%, at least 0.1%, at least 0.25%, at least or at least 0.75%), at least 0.03% disulfonate (e.g., at least 0.05%, at least 0.075%, at least 0.1%, at least 0.25%, or at least 0.5%), and at least 0.1 gpt polyacrylamides polymer or co-polymers (e.g., at least 0.5 gpt, at least 1 gpt, at least 2 gpt, at least 3 gpt, or at least 4 gpt).

In some embodiments, the aqueous fluid can include 1% or less alkoxylated C6-C32 alcohol (e.g., 0.75% or less, 0.5% or less, 0.25% or less, 0.1% or less, 0.075% or less, or or less), 0.75% or less disulfonate (e.g., 0.5% or less, 0.25% or less, 0.1% or less, or less, or 0.05% or less), and 5 gpt or less polyacrylamides polymer or co-polymers (e.g., 4 gpt or less, 3 gpt or less, 2 gpt or less, 1 gpt or less, or 0.5 gpt or less).

The aqueous fluid can have a concentration of alkoxylated C6-C32 alcohol, disulfonate, and polyacrylamides polymer or co-polymers ranging from any of the minimum values described above to any of the maximum values described above. For example, in some embodiments, the aqueous fluid can have a concentration of from 0.04% to 1% by weight alkoxylated C6-C32 alcohol, based on the total weight of the aqueous fluid (e.g., from 0.05% to 1%, from 0.075% to 1%, from 0.1% to 1%, from 0.25% to 1%, from to 1%, from 0.75% to 1%, from 0.04% to 0.75%, from 0.05% to 0.75%, from 0.075% to 0.75%, from 0.1% to 0.75%, from 0.25% to 0.75%, from 0.5% to 0.75%, from 0.04% to from 0.04% to 0.5%, from 0.05% to 0.5%, from 0.075% to 0.5%, from 0.1% to 0.5%, from 0.25% to 0.5%, from 0.04% to 0.25%, from 0.05% to 0.25%, from 0.075% to from 0.1% to 0.25%, from 0.04% to 0.1%, from 0.05% to 0.1%, from 0.075% to from 0.04% to 0.075%, or from 0.05% to 0.075%), from 0.03% to 0.75% by weight disulfonate, based on the total weight of the aqueous fluid (e.g., from 0.05% to 0.75%, from to 0.75%, from 0.1% to 0.75%, from 0.25% to 0.75%, from 0.5% to 0.75%, from 0.03% to 0.5%, from 0.05% to 0.5%, from 0.075% to 0.5%, from 0.1% to 0.5%, from to 0.5%, from 0.03% to 0.25%, from 0.05% to 0.25%, from 0.075% to 0.25%, from 0.25% to 0.25%, from 0.03% to 0.1%, from 0.05% to 0.1%, from 0.075% to 0.1%, from to 0.075%, from 0.05% to 0.075%, or 0.03% to 0.05%), and from 0.1 gpt to 5 gpt polyacrylamides polymer or co-polymers (e.g., from 0.1 gpt to 4.5 gpt, from 0.1 gpt to 4 gpt, from 0.1 gpt to 3.5 gpt, from 0.1 gpt to 3 gpt, from 0.1 gpt to 2.5 gpt, from 0.1 gpt to 2 gpt, from 0.1 gpt to 1.5 gpt, from 0.1 gpt to 1 gpt, from 0.1 gpt to 0.5 gpt, from 1 gpt to 2 gpt, from 1 gpt to 3 gpt, from 1 gpt to 4 gpt, from 1 gpt to 5 gpt, from 0.5 gpt to 2 gpt, from gpt to 3 gpt, from 0.5 gpt to 4 gpt, from 0.5 gpt to 5 gpt, from 2 gpt to 4 gpt, from 2 gpt to 5 gpt, from 2 gpt to 3 gpt, from 3 gpt to 5 gpt, from 3 gpt to 4 gpt, or from 4 gpt to 5 gpt).

Acids

In some embodiments, the aqueous fluid can include an acid (e.g., at least 10% acid, such as from 10% to 20% by weight acid). The acid can include any suitable acid known in the art. In some embodiments, the acid can include a strong acid, such as HCl, HF, or any combination thereof. In other embodiments, the acid can include a weak acid, such as an organic acid (e.g., acetic acid, citric acid, tartric acid, or any combination thereof).

In some embodiments, the aqueous fluid can have a pH of at least 2 (e.g., at least 2.5, at least 3, at least 3.5, at least 4, at least 4.5, at least 5, or at least 5.5). In some embodiments, the aqueous fluid can have a pH of 6 or less (e.g., 5.5 or less, 5 or less, 4.5 or less, 4 or less, 3.5 or less, 3 or less, or 2.5 or less).

The aqueous fluid can have a pH ranging from any of the minimum values described above to any of the maximum values described above. For example, in some embodiments, the aqueous fluid can have a pH of from 2 to 6 (e.g., from 2 to 5.5, from 2 to 4, or from 2 to 3).

Alkali Agents

In some embodiments, the aqueous fluid can include an alkali agent. The term "alkali agent" is used herein according to its conventional meaning and includes basic, ionic salts of alkali metals or alkaline earth metals. Alkali agents as provided herein can be capable of reacting with an unrefined petroleum acid (e.g., an acid in crude oil (reactive oil)) to form soap (a surfactant salt of a fatty acid) in situ. These in situ generated soaps serve as a source of surfactants capable of reducing the interfacial tension of hydrocarbons with an aqueous fluid. Examples of suitable alkali agents include, but are not limited to, sodium hydroxide, potassium hydroxide, sodium carbonate, potassium carbonate, sodium silicate, sodium metaborate, and salts of EDTA (e.g., EDTA tetrasodium salt or EDTA tetrapotassium salt). In one embodiment, the alkali agent is NaOH. In other embodiments, the alkali agent is $Na_2CO_3$.

In some embodiments, the aqueous fluid can have a pH of at least 8 (e.g., at least 8.5, at least 9, at least 9.5, at least 10, at least 10.5, at least 11, or at least 11.5). In some embodiments, the aqueous fluid can have a pH of 12 or less (e.g., 11.5 or less, 11 or less, or less, 10 or less, 9.5 or less, 9 or less, or 8.5 or less).

The aqueous fluid can have a pH ranging from any of the minimum values described above to any of the maximum values described above. For example, in some embodiments, the aqueous fluid can have a pH of from 8 to 12 (e.g., from 8.5 to 12, from 9 to 12, from 8.5 to 11.5, from 9 to 11.5, from 8.5 to 11, or from 9 to 11).

Co-Solvents

In some embodiments, the aqueous fluid can include a co-solvent. The co-solvent can include any suitable water-miscible solvent. Suitable co-solvents include alcohols, such as lower carbon chain alcohols such as isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycol ethers, ethoxylated phenol, or any other common organic co-solvent or combinations of any two or more co-solvents. In one embodiment, the co-solvent can comprise alkyl ethoxylate (C1-C6)-XEO X=1-30-linear or branched. In some embodiments, the co-solvent can comprise ethylene glycol butyl ether (EGBE), diethylene glycol monobutyl ether (DGBE), triethylene glycol monobutyl ether (TEGBE), ethylene glycol dibutyl ether (EGDE), polyethylene glycol monomethyl ether (mPEG), dimethyl ether, or any combination thereof. Examples of suitable co-solvents are also described in U.S. Pat. No. 10,337,303, which is incorporated by reference herein in its entirety.

In some embodiments, the co-solvent can be present in the aqueous fluid in an amount of from 0.1% to 25% by weight (e.g., from 0.1% to 10% by weight, or from 0.5% to 5% by weight) of the total weight of the aqueous fluid.

Polymers

In some embodiments, the aqueous fluid can include a polymer. Examples of polymer are known in the art. Examples of suitable polymers include biopolymers such as polysaccharides. For example, polysaccharides can be xanthan gum, scleroglucan, guar gum, a mixture thereof (e.g., any modifications thereof such as a modified chain), etc. Indeed, the terminology "mixtures thereof" or "combinations thereof" can include "modifications thereof" herein.

In some embodiments, the polymer can be present in the aqueous fluid in an amount of at least 0.003% by weight (e.g., at least 0.01% by weight, at least 0.05% by weight, at least 0.1% by weight, at least 0.5% by weight, at least 1% by weight, at least 5% by weight, at least 10% by weight, at least 15% by weight, or at least 20% by weight) of the total weight of the aqueous fluid. In some embodiments, the polymer can be present in the aqueous fluid in an amount of 25% by weight or less (e.g., 20% by weight or less, 15% by weight or less, 10% by weight or less, 5% by weight or less, 1% by weight or less, 0.5% by weight or less, 0.1% by weight or less, 0.05% by weight or less, or 0.01% by weight or less) of the total weight of the aqueous fluid.

The polymer can be present in the aqueous fluid in an amount ranging from any of the minimum values described above to any of the maximum values described above. For example, in some embodiments, the polymer can be present in the aqueous fluid in an amount of from 0.003% to 25% by weight (e.g., from 0.003% to 10% by weight, from to 10% by weight, from 0.01% to 25% by weight, from 0.1% to 25% by weight, from 0.1% to 5% by weight, from 0.1% to 10% by weight, from 0.5% to 25%, from 0.5% to 10% by weight, from 0.5% to 5% by weight from 0.5% to 25% by weight, from 1% to 5%, from 1% to 10%, from 1% to 25%, from 5% to 10%, from 5% to 25%, or from 10% to 25%) of the total weight of the aqueous fluid.

Surfactants

Suitable surfactants can include one or more anionic surfactant, non-ionic surfactant, cationic surfactant, zwitterionic surfactant, or any combination thereof. In some embodiments the surfactant can be a surfactant package.

Suitable surfactant packages can include a primary surfactant and optionally one or more secondary surfactants.

In some cases, the primary surfactant can include an anionic surfactant. In these cases, one or more secondary surfactants can include one or more non-ionic surfactants, one or more additional anionic surfactants, one or more cationic surfactants, one or more zwitterionic surfactants, or any combination thereof.

In other cases, the primary surfactant can include a non-ionic surfactant. In these cases, one or more secondary surfactants can include one or more additional non-ionic surfactants, one or more anionic surfactants, one or more cationic surfactants, one or more zwitterionic surfactants, or any combination thereof.

In other cases, the primary surfactant can include a cationic surfactant. In these cases, one or more secondary surfactants can include one or more non-ionic surfactants, one or more anionic surfactants, one or more additional cationic surfactants, one or more zwitterionic surfactants, or any combination thereof.

In other cases, the primary surfactant can include a zwitterionic surfactant. In these cases, one or more secondary surfactants can include one or more non-ionic surfactants, one or more anionic surfactants, one or more cationic surfactants, one or more additional zwitterionic surfactants, or any combination thereof.

In some embodiments, the primary surfactant can include at least 10% by weight (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, or at least 85% by weight) of the aqueous fluid, based on the total weight of the aqueous fluid. In some embodiments, the primary surfactant can include 90% by weight or less (e.g., 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less) of the aqueous fluid, based on the total weight of the aqueous fluid.

The primary surfactant can be present in the aqueous fluid in an amount ranging from any of the minimum values described above to any of the maximum values described above. For example, in some embodiments, the primary surfactant can include from 10% to 90% by weight (e.g., from 10% to 50% by weight) of the aqueous fluid, based on the total weight of the aqueous fluid.

In some embodiments, the one or more secondary surfactants can include at least 10% by weight (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, or at least 85% by weight) of the aqueous fluid, based on the total weight of the aqueous fluid. In some embodiments, the one or more secondary surfactants can include 90% by weight or less (e.g., 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less) of the aqueous fluid, based on the total weight of the aqueous fluid.

The one or more secondary surfactants can be present in the aqueous fluid in an amount ranging from any of the minimum values described above to any of the maximum values described above. For example, in some embodiments, the one or more secondary surfactants can include from 10% to 90% by weight (e.g., from 10% to 50% by weight) of the aqueous fluid, based on the total weight of the aqueous fluid.

In some embodiments, the aqueous fluid can include an anionic surfactant. In other embodiments, the aqueous fluid can consist essentially of an anionic surfactant (i.e., the anionic surfactant is the only surfactant present in the aqueous fluid). In other embodiments, the aqueous fluid can consist of an anionic surfactant. In some of these embodiments, the aqueous fluid further includes water. In some of these embodiments, the aqueous fluid does not include a hydrocarbon.

In some embodiments, the aqueous fluid can include an anionic surfactant and a non-ionic surfactant. In other embodiments, the aqueous fluid can consist essentially of an anionic surfactant and a non-ionic surfactant (i.e., the anionic surfactant and the non-ionic surfactant are the only surfactants present in the aqueous fluid). In other embodiments, the aqueous fluid can consist of an anionic surfactant and a non-ionic surfactant. In some of these embodiments, the aqueous fluid can further include water. In some of these embodiments, the aqueous fluid does not include a hydrocarbon.

In some embodiments, the aqueous fluid can include an anionic surfactant, a second anionic surfactant, and a non-ionic surfactant. In other embodiments, the aqueous fluid can consist essentially of an anionic surfactant, a second anionic surfactant, and a non-ionic surfactant (i.e., the anionic surfactant, the second anionic surfactant, and the non-ionic surfactant are the only surfactants present in the aqueous fluid). In other embodiments, the aqueous fluid can consist of an anionic surfactant, a second anionic surfactant, and a non-ionic surfactant. In some of these embodiments, the aqueous fluid further includes water. In some of these embodiments, the aqueous fluid does not include a hydrocarbon.

In some embodiments, the aqueous fluid can include a non-ionic surfactant. In other embodiments, the aqueous fluid can consist essentially of a non-ionic surfactant (i.e., the non-ionic surfactant is the only surfactant present in the aqueous fluid). In other embodiments, the aqueous fluid can consist of a non-ionic surfactant. In some of these embodiments, the aqueous fluid further includes water. In some of these embodiments, the aqueous fluid does not include a hydrocarbon.

In some embodiments, the aqueous fluid can include a non-ionic surfactant, an anionic surfactant, and a second anionic surfactant. In other embodiments, the aqueous fluid can consist essentially of a non-ionic surfactant, an anionic surfactant, and a second anionic surfactant (i.e., the anionic surfactant, the second anionic surfactant, and the non-ionic surfactant are the only surfactants present in the aqueous fluid). In other embodiments, the aqueous fluid can consist of a non-ionic surfactant, an anionic surfactant, and a second anionic surfactant. In some of these embodiments, the aqueous fluid further includes water. In some of these embodiments, the aqueous fluid does not include a hydrocarbon.

Suitable anionic surfactants for use as a primary surfactant and/or a secondary surfactant include a hydrophobic tail that includes from 6 to 60 carbon atoms. In some embodiments, the anionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the anionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The anionic surfactant can include a hydrophobic tail that comprises a number of carbon atoms ranging from any of the minimum values described above to any of the maximum values described above. For example, in some embodiments, the anionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the anionic surfactant can include a branched hydrophobic tail derived from Guerbet alcohols. The hydrophilic portion of the anionic surfactant can comprise, for example, one or more sulfate moieties (e.g., one, two, or three sulfate moieties), one or more sulfonate moieties (e.g., one, two, or three sulfonate moieties), one or more sulfosuccinate moieties (e.g., one, two, or three sulfosuccinate moieties), one or more carboxylate moieties (e.g., one, two, or three carboxylate moieties), or any combination thereof.

In some embodiments, the anionic surfactant can include, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some embodiments, the anionic surfactant can include, for example a sulfonate, a disulfonate, a sulfate, a disulfate, a sulfosuccinate, a disulfosuccinate, a carboxylate, a dicarboxylate, or any combination thereof. In some examples, the anionic surfactant can comprise an internal olefin sulfonate (IOS), an isomerized olefin sulfonate, an alfa olefin sulfonate (AOS), an alkyl aryl sulfonate (AAS), a xylene sulfonate, an alkane sulfonate, a petroleum sulfonate, an alkyl diphenyl oxide (di)sulfonate, an alcohol sulfate, an alkoxy sulfate, an alkoxy sulfonate, an alkoxy carboxylate, an alcohol phosphate, or an alkoxy phosphate. In some embodiments, the anionic surfactant can include an alkoxy carboxylate surfactant, an alkoxy sulfate surfactant, an alkoxy sulfonate surfactant, an alkyl sulfonate surfactant, an aryl sulfonate surfactant, or an olefin sulfonate surfactant.

An "alkoxy carboxylate surfactant" or "alkoxy carboxylate" refers to a compound having an alkyl or aryl attached to one or more alkoxylene groups (e.g., —$CH_2$—CH(ethyl)-O—, —$CH_2$—CH(methyl)-O—, or —$CH_2$—$CH_2$—O—) which, in turn is attached to —$COO^-$ or acid or salt thereof including metal cations such as sodium. In embodiments, the alkoxy carboxylate surfactant can be defined by the formulae below:

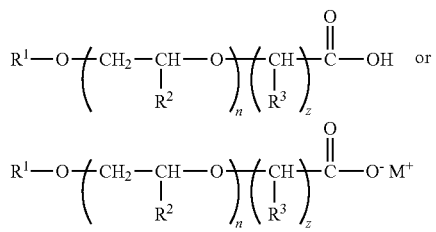

wherein $R^1$ is substituted or unsubstituted C6-C36 alkyl or substituted or unsubstituted aryl; $R^2$ is, independently for each occurrence within the compound, hydrogen or unsubstituted C1-C6 alkyl; R 3 is independently hydrogen or unsubstituted C1-C6 alkyl, n is an integer from 0 to 175, z is an integer from 1 to 6 and NV is a monovalent, divalent or trivalent cation. In some of these embodiments, $R^1$ can be an unsubstituted linear or branched C6-C36 alkyl.

In certain embodiments, the alkoxy carboxylate can be a C6-C32:PO(0-65):EO(0-100)-carboxylate (i.e., a C6-C32 hydrophobic tail, such as a branched or unbranched C6-C32 alkyl group, attached to from 0 to 65 propyleneoxy groups (—$CH_2$—CH(methyl)-O-linkers), attached in turn to from 0 to 100 ethyleneoxy groups (—$CH_2$—$CH_2$—O— linkers), attached in turn to —$COO^-$ or an acid or salt thereof including metal cations such as sodium). In certain embodiments, the alkoxy carboxylate can be a branched or unbranched C30:PO(30-40):EO(25-35)-carboxylate. In certain embodiments, the alkoxy carboxylate can be a branched or unbranched C6-C12:PO(30-40):EO(25-35)-carboxylate. In certain embodiments, the alkoxy carboxylate can be a branched or unbranched C6-C30:EO(8-30)-carboxylate.

An "alkoxy sulfate surfactant" or "alkoxy sulfate" refers to a surfactant having an alkyl or aryl attached to one or more alkoxylene groups (e.g., —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium. In some embodiment, the alkoxy sulfate surfactant has the formula R—$(BO)_e$—$(PO)_f$—$(EO)_g$—$SO_3^-$ or acid or salt (including metal cations such as sodium) thereof, wherein R is C6-C32 alkyl, BO is —$CH_2$—CH(ethyl)-O—, PO is —$CH_2$—CH(methyl)-O—, and EO is —$CH_2$—$CH_2$—O—. The symbols e, f and g are integers from 0 to 50 wherein at least one is not zero.

In embodiments, the alkoxy sulfate surfactant can be an aryl alkoxy sulfate surfactant. The aryl alkoxy surfactant can be an alkoxy surfactant having an aryl attached to one or more alkoxylene groups (e.g., —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium.

An "alkyl sulfonate surfactant" or "alkyl sulfonate" refers to a compound that includes an alkyl group (e.g., a branched or unbranched C6-C32 alkyl group) attached to —$SO_3^-$ or acid or salt thereof including metal cations such as sodium.

An "aryl sulfate surfactant" or "aryl sulfate" refers to a compound having an aryl group attached to —O—$SO_3^-$ or acid or salt thereof including metal cations such as sodium. An "aryl sulfonate surfactant" or "aryl sulfonate" refers to a compound having an aryl group attached to —$SO_3^-$ or acid or salt thereof including metal cations such as sodium. In some cases, the aryl group can be substituted, for example, with an alkyl group (an alkyl aryl sulfonate).

An "internal olefin sulfonate," "isomerized olefin sulfonate," or "IOS" refers to an unsaturated hydrocarbon compound comprising at least one carbon-carbon double bond and at least one $SO_3^-$ group, or a salt thereof. As used herein, a "C20-C28 internal olefin sulfonate," "a C20-C28 isomerized olefin sulfonate," or "C20-C28 IOS" refers to an IOS, or a mixture of IOSs with an average carbon number of 20 to 28, or of 23 to 25. The C20-C28 IOS may comprise at least 80% of IOS with carbon numbers of 20 to 28, at least 90% of IOS with carbon numbers of 20 to 28, or at least 99% of IOS with carbon numbers of 20 to 28. As used herein, a "C15-C18 internal olefin sulfonate," "C15-C18 isomerized olefin sulfonate," or "C15-C18 IOS" refers to an IOS or a mixture of IOSs with an average carbon number of 15 to 18, or of 16 to 17. The C15-C18 IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates or isomerized olefin sulfonates may be alpha olefin sulfonates, such as an isomerized alpha olefin sulfonate. The internal olefin sulfonates or isomerized olefin sulfonates may also comprise branching. In certain embodiments, C15-18 IOS may be added to the package when the aqueous fluid is intended for use in high temperature unconventional subterranean formations, such as formations above 130° F. (approximately 55° C.). The IOS may be at least 20% branching, 30% branching, 40% branching, 50% branching, 60% branching, or 65% branching. In some embodiments, the branching is between 20-98%, 30-90%, 40-80%, or around 65%. Examples of internal olefin sulfonates and the methods to make them are found in U.S. Pat. No. 5,488,148, U.S. Patent Application Publication No. 2009/0112014, and SPE 129766, all incorporated herein by reference.

In some embodiments, the anionic surfactant can be a disulfonate, alkyldiphenyloxide disulfonate, mono alkyldiphenyloxide disulfonate, di alkyldiphenyloxide disulfonate, or a di alkyldiphenyloxide monosulfonate, where the alkyl group can be a C6-C36 linear or branched alkyl group. In some embodiments, the anionic surfactant can be an alkylbenzene sulfonate or a dibenzene disufonate. In some embodiments, the anionic surfactant can be benzenesulfonic acid, decyl(sulfophenoxy)-disodium salt; linear or branched C6-C36 alkyl:PO(0-65):EO(0-100) sulfate; or linear or branched C6-C36 alkyl:PO(0-65):EO(0-100) carboxylate. In some embodiments, the anionic surfactant can be an isomerized olefin sulfonate (C6-C30), internal olefin sulfonate (C6-C30) or internal olefin disulfonate (C6-C30). In some embodiments, the anionic surfactant is a Guerbet-PO(0-65)-EO(0-100) sulfate (Guerbet portion can be C6-C36). In some embodiments, the anionic surfactant can be a Guerbet-PO(0-65)-EO(0-100) carboxylate (Guerbet portion can be C6-C36). In some embodiments, the anionic surfactant can be alkyl PO(0-65) and EO(0-100) sulfonate: where the alkyl group is linear or branched C6-C36. In some embodiments, the anionic surfactant can be a sulfosuccinate, such as a dialkylsulfosuccinate. In some embodiments, the anionic surfactant can be an alkyl aryl sulfonate (AAS) (e.g., an alkyl benzene sulfonate (ABS)), a C10-C30 internal olefin sulfate (IOS), a petroleum sulfonate, or an alkyl diphenyl oxide (di)sulfonate.

In some examples, the anionic surfactant can include a surfactant defined by the formula below:

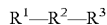

wherein $R^1$ comprises a branched or unbranched, saturated or unsaturated, cyclic or non-cyclic, hydrophobic carbon chain having 6-32 carbon atoms and an oxygen atom linking $R^1$ and $R^2$; $R^2$ comprises an alkoxylated chain comprising at least one oxide group selected from the group consisting of ethylene oxide, propylene oxide, butylene oxide, and combinations thereof; and $R^3$ comprises a branched or unbranched hydrocarbon chain comprising 2-12 carbon atoms and from 2 to 5 carboxylate groups.

In some examples, the anionic surfactant can include a surfactant defined by the formula below:

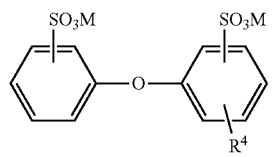

wherein $R^4$ is a branched or unbranched, saturated or unsaturated, cyclic or non-cyclic, hydrophobic carbon chain having 6-32 carbon atoms; and M represents a counterion (e.g., $Na^+$, $K^+$). In some embodiments, $R^4$ is a branched or unbranched, saturated or unsaturated, cyclic or non-cyclic, hydrophobic carbon chain having 6-16 carbon atoms.

Suitable non-ionic surfactants for use as a primary surfactant and/or a secondary surfactant include compounds that can be added to increase wettability. In some embodiments, the hydrophilic-lipophilic balance (HLB) of the non-ionic surfactant is greater than 10 (e.g., greater than 9, greater than 8, or greater than 7). In some embodiments, the HLB of the non-ionic surfactant can be from 7 to 10.

The non-ionic surfactant can include a hydrophobic tail comprising from 6 to 60 carbon atoms. In some embodiments, the non-ionic surfactant can include a hydrophobic tail that includes at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the non-ionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The non-ionic surfactant can include a hydrophobic tail that comprises a number of carbon atoms ranging from any of the minimum values described above to any of the maximum values described above. For example, in some embodiments, the non-ionic surfactant can include a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. In some cases, the hydrophobic tail may be a straight chain, branched chain, and/or may comprise cyclic structures. The hydrophobic carbon tail may include single bonds, double bonds, triple bonds, or any combination thereof. In some cases, the hydrophobic tail can comprise an alkyl group, with or without an aromatic ring (e.g., a phenyl ring) attached to it. In some embodiments, the hydrophobic tail can comprise a branched hydrophobic tail derived from Guerbet alcohols.

Example non-ionic surfactants include alkyl aryl alkoxy alcohols, alkyl alkoxy alcohols, or any combination thereof. In embodiments, the non-ionic surfactant may be a mix of surfactants with different length lipophilic tail chain lengths. For example, the non-ionic surfactant may be C9-C11:9EO, which indicates a mixture of non-ionic surfactants that have a lipophilic tail length of 9 carbon to 11 carbon, which is followed by a chain of 9 Eos. The hydrophilic moiety is an alkyleneoxy chain (e.g., an ethoxy (EO), butoxy (BO) and/or propoxy (PO) chain with two or more repeating units of EO, BO, and/or PO). In some embodiments, 1-100 repeating units of EO are present. In some embodiments, 0-65 repeating units of PO are present. In some embodiments, 0-25 repeating units of BO are present. For example, the non-ionic surfactant could comprise 10EO:5PO or 5EO. In embodiments, the non-ionic surfactant may be a mix of surfactants with different length lipophilic tail chain lengths. For example, the non-ionic surfactant may be C9-C11:PO9:EO2, which indicates a mixture of non-ionic surfactants that have a lipophilic tail length of 9 carbon to 11 carbon, which is followed by a chain of 9 Pos and 2 Eos. In specific embodiments, the non-ionic surfactant is linear C9-C11:9EO. In some embodiments, the non-ionic surfactant is a Guerbet PO(0-65) and EO(0-100) (Guerbet can be C6-C36); or alkyl PO(0-65) and EO(0-100): where the alkyl group is linear or branched C1-C36. In some examples, the non-ionic surfactant can comprise a branched or unbranched C6-C32: PO(0-65):EO(0-100) (e.g., a branched or unbranched C6-C30:PO(30-40):EO(25-35), a branched or unbranched C6-C12:PO(30-40):EO(25-35), a branched or unbranched C6-30:EO(8-30), or any combination thereof). In some embodiments, the non-ionic surfactant is one or more alkyl polyglucosides.

Example cationic surfactants include surfactant analogous to those described above, except bearing primary, secondary, or tertiary amines, or quaternary ammonium cations, as a hydrophilic head group. "Zwitterionic" or "zwitterion" as used herein refers to a neutral molecule with a positive (or cationic) and a negative (or anionic) electrical charge at different locations within the same molecule. Example zwitterionic surfactants include betains and sultains.

Examples of suitable surfactants are disclosed, for example, in U.S. Pat. Nos. 3,811,504, 3,811,505, 3,811,507, 3,890,239, 4,463,806, 6,022,843, 6,225,267, 7,629,299, 7,770,641, 9,976,072, 8,211, 837, 9,422,469, 9,605,198, 8,822,391, 9,783,729, 8,372,788, and 9,617,464; WIPO Patent Application Nos. WO/2008/079855; as well as U.S. Patent Application Publication Nos. 2005/0199395, 2006/0185845, 2006/189486, 2009/0270281, 2011/0046024, 2011/0100402, 2011/0190175, 2007/191633, 2010/004843, 2011/0201531, 2011/0190174, 2011/0071057, 2011/0059873, 2011/0059872, 2011/0048721, 2010/0319920, 2010/0292110, and 2017/0198202, each of which is hereby incorporated by reference herein in its entirety for its description of example surfactants.

In some embodiments, the primary surfactant can have a concentration within the aqueous fluid of at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least by weight, at least 0.35% by weight, at least 0.4% by weight, at least 0.45% by weight, at least 0.5% by weight, at least 0.55% by weight, at least 0.6% by weight, at least by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, or at least 2.25% by weight), based on the total weight of the aqueous fluid. In some embodiments, the primary surfactant can have a concentration within the aqueous fluid of 2.5% by weight or less (e.g., 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the aqueous fluid. In particular embodiments, the primary surfactant can have a concentration within the aqueous fluid of less than 1%, less than 0.5%, less than 0.2%, less than 0.1%, less than 0.075%, or less than 0.05%.

The primary surfactant can have a concentration within the aqueous fluid ranging from any of the minimum values described above to any of the maximum values described above. For example, in some embodiments, the primary surfactant can have a concentration within the aqueous fluid of from 0.01% to 2.5% by weight (e.g., from 0.05% to 0.5% by weight), based on the total weight of the aqueous fluid.

When present, the one or more secondary surfactants can have a concentration within the aqueous fluid of at least 0.001% by weight (e.g., at least 0.005% by weight, at least 0.01% by weight, at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least by weight, at least 0.4% by weight, at least 0.45% by weight, at least 0.5% by weight, at least 0.55% by weight, at least 0.6% by weight, at least 0.65% by weight, at least by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, or at least 2.25% by weight), based on the total weight of the aqueous fluid. In some embodiments, the one or more secondary surfactants can have a concentration within the aqueous fluid of 2.5% by weight or less (e.g., 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, 0.02% by weight or less, 0.01% by weight or less, or 0.005% by weight or less), based on the total weight of the aqueous fluid. In particular embodiments, the one or more secondary surfactants can have a concentration within the aqueous fluid of less than 2%, less than 1.5%, less than 1%, less than 0.5%, less than 0.2%, less than 0.1%, less than 0.075%, less than 0.05%, or less than 0.01%.

When present, the one or more secondary surfactants can have a concentration within the aqueous fluid ranging from any of the minimum values described above to any of the maximum values described above. For example, in some embodiments, the one or more secondary surfactants can have a concentration within the aqueous fluid of from 0.001% to 2.5% by weight (e.g., from 0.001% to 1.5% by weight, or from 0.05% to 0.5% by weight), based on the total weight of the aqueous fluid.

In some embodiments, the primary surfactant and one or more secondary surfactants can be present in the aqueous fluid at a weight ratio of primary surfactant to one or more secondary surfactants of at least 1:1 (e.g., at least 2:1, at least 2.5:1, at least 3:1, at least 4:1, at least 5:1, at least 6:1, at least 7:1, at least 8:1, or at least 9:1). In some embodiments, the primary surfactant and one or more secondary surfactants can be present in the aqueous fluid in a weight ratio of primary surfactant to one or more secondary surfactants of 10:1 or less (e.g., 9:1 or less; 8:1 or less, 7:1 or less, 6:1 or less, 5:1 or less, 4:1 or less, 3:1 or less, 2.5:1 or less, or 2:1 or less).

The primary surfactant and one or more secondary surfactants can be present in the aqueous fluid in a weight ratio ranging from any of the minimum values described above to any of the maximum values described above. For example, the primary surfactant and one or more secondary surfactants can be present in the aqueous fluid in a weight ratio of primary surfactant to one or more secondary surfactants of from 1:1 to 10:1 (e.g., 1:1 to 5:1).

In other embodiments, the one or more secondary surfactants are absent (i.e., the primary surfactant is the only surfactant present in the aqueous fluid).

In some embodiments, the total concentration of all surfactants in the aqueous fluid (the total concentration of the primary surfactant and the one or more secondary surfactants in the aqueous fluid) can be at least 0.01% by weight (e.g., at least 0.02% by weight, at least by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least by weight, at least 0.5% by weight, at least 0.55% by weight, at least 0.6% by weight, at least 0.65% by weight, at least 0.7% by weight, at least 0.75% by weight, at least by weight, at least 0.85% by weight, at least 0.9% by weight, at least 0.95% by weight, at least 1% by weight, at least 1.25% by weight, at least 1.5% by weight, at least 1.75% by weight, at least 2% by weight, at least 2.25% by weight, at least 2.5% by weight, at least 2.75% by weight, at least 3% by weight, at least 3.25% by weight, at least 3.5% by weight, at least 3.75% by weight, at least 4% by weight, at least 4.25% by weight, at least 4.5% by weight, or at least 4.75% by weight), based on the total weight of the aqueous fluid. In some embodiments, the total concentration of all surfactants in the aqueous fluid (the total concentration of the primary surfactant and the one or more secondary surfactants in the aqueous fluid) can be 5% by weight or less (e.g., 4.75% by weight or less, 4.5% by weight or less, 4.25% by weight or less, 4% by weight or less, 3.75% by weight or less, 3.5% by weight or less, 3.25% by weight or less, 3% by weight or less, 2.75% by weight or less, 2.5% by weight or less, 2.25% by weight or less, 2% by weight or less, 1.75% by weight or less, 1.5% by weight or less, 1.25% by weight or less, 1% by weight or less, by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, by weight or less, 0.04% by weight or less, 0.03% by weight or less, or 0.02% by weight or less), based on the total weight of the aqueous fluid.

The total concentration of all surfactants in the aqueous fluid (the total concentration of the primary surfactant and the one or more secondary surfactants in the aqueous fluid) can range from any of the maximum values described above to any of the maximum values described above. For example, in some embodiments, the total concentration of all surfactants in the aqueous fluid (the total concentration of the primary surfactant and the one or more secondary surfactants in the aqueous fluid) can be from 0.01% by weight to 5% by weight (e.g., from 0.01% to 2.5% by weight, from 0.01% to 1% by weight, or from to 0.5% by weight).

In some embodiments when the aqueous fluid is being injected into a horizontal well, the total concentration of all surfactants in the aqueous fluid (the total concentration of the primary surfactant and the one or more secondary surfactants in the aqueous fluid) can be from 0.01% to 1.5% by weight, from 0.01% to 1% by weight, or from 0.01% to 0.5% by weight.

In some embodiments when the aqueous fluid is being injected into a vertical well, the total concentration of all surfactants in the aqueous fluid (the total concentration of the primary surfactant and the one or more secondary surfactants in the aqueous fluid) can be from 0.01% to 5% by weight, from 0.01% to 1% by weight, from 0.5% to 5% by weight, from 0.5% to 2.5% by weight, from 0.5% to 1.5% by weight, from 0.5% to 1% by weight, from 1% to 5% by weight, from 1% to 2.5% by weight, or from 1% to 1.5% by weight.

In some embodiments, the aqueous fluid can comprise a non-ionic surfactant and an anionic surfactant (e.g., a sulfonate or disulfonate). In some embodiments, the aqueous fluid can comprise a non-ionic surfactant and two or more anionic surfactants (e.g., a sulfonate or disulfonate and a carboxylate). In some embodiments, the aqueous fluid can comprise a non-ionic surfactant (e.g., a C6-C16 alkyl phenol ethoxylate, or a C6-C16:PO(0-such as a C9-C11 ethoxylated alcohol, a C13 ethoxylated alcohol, a C6-C10 ethoxylated propoxylated alcohol, or a C10-C14 ethoxylated Guerbet alcohol) and a sulfonate surfactant (e.g., a C10-16 disulfonate, or a C16-28 IOS). In some embodiments, the aqueous fluid can comprise a non-ionic surfactant (e.g., a C6-C16 alkyl phenol ethoxylate, or a C6-16:PO(0-25):EO (0-25), such as a C9-C11 ethoxylated alcohol, a C13 ethoxylated alcohol, a C6-C10 ethoxylated propoxylated alcohol, or a C10-C14 ethoxylated Guerbet alcohol), a sulfonate surfactant (e.g., a C10-16 disulfonate, or a C16-28 IOS), and a carboxylate surfactant (e.g., a C10-16 alkyl polyglucoside carboxylate or a C22-C36 Guerbet alkoxylated carboxylate).

Specific example surfactant packages are shown in the table below.

| Example | Surfactants and Co-Surfactants in Surfactant Package (in weight percent) |
|---|---|
| 1 | 0.09% alkoxylated C6-C16 alcohol<br>0.06% disulfonate |
| 2 | 0.1% alkoxylated C6-C16 alcohol<br>0.1% carboxylate<br>0.1% disulfonate |
| 3 | 0.15% alkoxylated C6-C16 alcohol<br>0.075% carboxylate<br>0.075% disulfonate |
| 4 | 0.2% alkoxylated C6-C16 alcohol<br>0.1% carboxylate |
| 5 | 0.2% alkoxylated C6-C16 alcohol<br>0.033% carboxylate<br>0.066% disulfonate |
| 0 | 0.2% alkoxylated C6-C16 alcohol<br>0.033% carboxylate<br>0.066% disulfonate |
| 7 | 0.2% alkoxylated C6-C16 alcohol<br>0.05% carboxylate<br>0.05% olefin sulfonate |
| 8 | 0.15% alkoxylated C6-C16 alcohol<br>0.05% carboxylate<br>0.05% olefin sulfonate |

| Example | Surfactants and Co-Surfactants in Surfactant Package (in weight percent) |
|---|---|
| 9 | 0.05% alkyl polyglucoside
0.1% alkoxylated C6-C16 alcohol
0.05% carboxylate
0.05% olefin sulfonate |
| 10 | 0.1% alkyl polyglucoside
0.15% alkoxylated C6-C16 alcohol
0.07% carboxylate
0.03% olefin sulfonate |
| 11 | 0.1% alkyl polyglucoside
0.1% alkoxylated C6-C16 alcohol
0.04% carboxylate
0.05% olefin sulfonate
0.03% disulfonate |
| 12 | 0.1% alkyl polyglucoside
0.1% alkoxylated C6-C16 alcohol
0.04% carboxylate
0.06% disulfonate |
| 13 | 0.1% alkyl polyglucoside
0.15% alkoxylated C6-C16 alcohol
0.15% alkoxylated alkylphenol
0.1% olefin sulfonate
0.1% Guerbet alkoxylated carboxylate |
| 14 | 0.125% alkoxylated C6-C16 alcohol
0.175% alkoxylated alkylphenol
0.1% olefin sulfonate
0.1% Guerbet alkoxylated carboxylate |
| 15 | 0.1% alkoxylated C6-C16 alcohol
0.2% alkoxylated alkylphenol
0.1% olefin sulfonate
0.1% Guerbet alkoxylated carboxylate |
| 16 | 0.12% alkoxylated C6-C16 alcohol
0.22% alkoxylated alkylphenol
0.08% olefin sulfonate
0.08% Guerbet alkoxylated carboxylate |
| 17 | 0.15% alkoxylated C6-C16 alcohol
0.15% alkoxylated alkylphenol
0.08% olefin sulfonate
0.06% Guerbet alkoxylated carboxylate
0.06% carboxylate |
| 18 | 0.15% alkoxylated C6-C16 alcohol
0.15% alkoxylated alkylphenol
0.05% olefin sulfonate
0.1% Guerbet alkoxylated carboxylate
0.05% disulfonate |
| 19 | 0.5% olefin sulfonate
0.5% Guerbet alkoxylated carboxylate
0.55% glycosides or glucosides |
| 20 | 0.5% olefin sulfonate
0.5% Guerbet alkoxylated carboxylate
0.5% glycosides or glucosides
0.25% alkoxylated C6-C16 alcohol |
| 21 | 0.5% olefin sulfonate
0.5% Guerbet alkoxylated carboxylate
0.5% glycosides or glucosides
0.5% alkoxylated C6-C16 alcohol |
| 22 | 0.5% olefin sulfonate
0.5% Guerbet alkoxylated carboxylate
1% glycosides or glucosides
0.5% alkoxylated C6-C16 alcohol |
| 23 | 0.05% olefin sulfonate
0.05% Guerbet alkoxylated carboxylate
0.05% glycosides or glucosides
0.05% alkoxylated C6-C16 alcohol |
| 24 | 0.075% glycosides or glucosides
0.075% alkoxylated C6-C16 alcohol |
| 25 | 0.1% alkoxylated C6-C16 alcohol
0.05% disulfonate |
| 26 | 0.1% alkoxylated C6-C16 alcohol
0.05% disulfonate
0.03% hydroxyalkyl alkylammonium chloride |
| 27 | 0.03% olefin sulfonate
0.04% Guerbet alkoxylated carboxylate
0.08% glycosides or glucosides
0.05% alkoxylated C6-C16 alcohol |
| 28 | 0.4% olefin sulfonate
0.4% Guerbet alkoxylated carboxylate
0.7% glycosides or glucosides
0.5% alkoxylated C6-C16 alcohol |
| 29 | 0.05% olefin sulfonate
0.1% glycosides or glucosides
0.05% alkoxylated C6-C16 alcohol |
| 30 | 0.05% olefin sulfonate
0.1% alkyl polyglucoside
0.05% alkoxylated C6-C16 alcohol |
| 31 | 0.05% olefin sulfonate
0.1% glycosides or glucosides
0.05% alkoxylated C6-C16 alcohol |
| 32 | 0.05% olefin sulfonate
0.1% alkyl polyglucoside
0.05% alkoxylated C6-C16 alcohol |
| 33 | 0.05% olefin sulfonate
0.1% alkyl polyglucoside
0.05% alkoxylated C6-C16 alcohol |
| 34 | 0.05% olefin sulfonate
0.05% glycosides or glucosides
0.05% alkoxylated C6-C16 alcohol
0.05% carboxylate |
| 35 | 0.05% olefin sulfonate
0.05% glycosides or glucosides
0.05% alkoxylated C6-C16 alcohol
0.05% carboxylate |
| 36 | 0.05% olefin sulfonate
0.05% alkyl polyglucoside
0.05% alkoxylated C6-C16 alcohol |
| 37 | 0.06% olefin sulfonate
0.05% alkyl polyglucoside
0.04% alkoxylated C6-C16 alcohol |
| 38 | 0.04% olefin sulfonate
0.08% glycosides or glucosides
0.05% alkoxylated C6-C16 alcohol
0.03% disulfonate |
| 39 | 0.035% olefin sulfonate
0.075% glycosides or glucosides
0.05% alkoxylated C6-C16 alcohol
0.04% disulfonate |
| 40 | 0.035% olefin sulfonate
0.07% glycosides or glucosides
0.045% alkoxylated C6-C16 alcohol
0.05% disulfonate |
| 41 | 0.1% alkoxylated C6-C16 alcohol
0.1% disulfonate |
| 42 | 0.25% Guerbet alkoxylated carboxylate
0.25% olefin sulfonate
0.5% glycosides or glucosides
0.5% co-solvent |
| 43 | 0.075% alkoxylated C12-C22 alcohol
0.075% disulfonate |
| 44 | 0.075% alkoxylated C6-C16 Guerbet alcohol
0.075% disulfonate |
| 45 | 0.075% alkoxylated C12-C22 Guerbet alcohol
0.075% disulfonate |
| 46 | 0.075% alkoxylated C6-C16 alcohol
0.075% disulfonate |
| 47 | 0.075% disulfonate
0.075% alkoxylated C6-C16 alcohol |
| 48 | 0.0625% disulfonate
0.0875% alkoxylated C6-C16 alcohol |
| 49 | 0.055% disulfonate
0.095% alkoxylated C6-C16 alcohol |
| 50 | 0.075% disulfonate
0.075% alkoxylated C6-C16 alcohol |
| 51 | 1% alkoxylated C6-C16 alcohol
0.5% disulfonate |
| 52 | 1% alkoxylated C6-C16 alcohol |
| 53 | 1% alkoxylated C6-C16 alcohol
2.25% sulfosuccinate |
| 54 | 0.25% Guerbet alkoxylated carboxylate
1% alkoxylated C6-C16 alcohol
2.25% sulfosuccinate |
| 55 | 0.25% Guerbet alkoxylated carboxylate
1% alkoxylated alkylphenol
2.25% sulfosuccinate |

-continued

| Example | Surfactants and Co-Surfactants in Surfactant Package (in weight percent) |
|---|---|
| 56 | 0.25% Guerbet alkoxylated carboxylate |
|  | 1% alkoxylated C6-C16 alcohol |
| 57 | 0.25 Guerbet alkoxylated carboxylate |
|  | 1% alkoxylated alkylphenol |
| 58 | 0.65% carboxylate |
|  | 0.35% alkoxylated C6-C16 alcohol |
| 59 | 0.325% carboxylate |
|  | 0.925% alkoxylated C6-C16 alcohol |
| 60 | 0.25% olefin sulfonate |
|  | 1.0% alkoxylated C6-C16 alcohol |
| 61 | 0.15% olefin sulfonate |
|  | 0.2% Guerbet alkoxylated carboxylate |
|  | 0.92% carboxylate |
| 62 | 0.65% carboxylate |
|  | 0.35% second carboxylate |
| 63 | 0.65% carboxylate |
|  | 0.35% alkoxylated C6-C16 alcohol |
|  | 1% olefin sulfonate |
| 64 | 1% alkoxylated alcohol |
|  | 1% olefin sulfonate |
| 65 | 0.5% alkoxylated alcohol |
|  | 0.5% olefin sulfonate |
|  | 0.25% carboxylate |
| 66 | 0.6% co-solvent |
|  | 0.6% olefin sulfonate |
| 67 | 0.6% co-solvent |
|  | 0.3% disulfonate |
|  | 0.3% olefin sulfonate |
| 68 | 0.6% Guerbet alkoxylated carboxylate |
|  | 0.6% disulfonate |
| 69 | 0.6% co-solvent |
|  | 0.4% disulfonate |
|  | 0.2% olefin sulfonate |
| 70 | 0.5% alkoxylated C6-C16 alcohol |
|  | 0.4% disulfonate |
|  | 0.3% olefin sulfonate |
| 71 | 1% alkoxylated C6-C16 alcohol |
| 72 | 0.9% alkoxylated C6-C16 alcohol |
|  | 0.6% disulfonate |
| 73 | 0.4% alkoxylated C6-C16 alcohol |
|  | 0.35% disulfonate |
|  | 0.25% olefin sulfonate |
|  | 0.5% co-solvent |
| 74 | 0.25% Guerbet alkoxylated carboxylate |
|  | 0.5% alkoxylated C6-C16 alcohol |
|  | 0.35% disulfonate |
|  | 0.15% olefin sulfonate |
|  | 0.35% co-solvent |
| 75 | 0.25% Guerbet alkoxylated carboxylate |
|  | 0.25% alkoxylated C6-C16 alcohol |
|  | 0.25% olefin sulfonate |
|  | 0.25% co-solvent |
| 76 | 0.25% Guerbet alkoxylated carboxylate |
|  | 0.25% alkoxylated C6-C16 alcohol |
|  | 0.25% olefin sulfonate |
|  | 0.25% alkoxylated alcohol |
| 77 | 0.25% Guerbet alkoxylated carboxylate |
|  | 0.35% olefin sulfonate |
|  | 0.5% alkoxylated alcohol |
| 78 | 0.25% Guerbet alkoxylated carboxylate |
|  | 0.25% alkoxylated C6-C16 alcohol |
|  | 0.15% olefin sulfonate |
|  | 0.1% disulfonate |
|  | 0.25% co-solvent |
| 79 | 0.25% Guerbet alkoxylated carboxylate |
|  | 0.25% alkoxylated C6-C16 alcohol |
|  | 0.25% olefin sulfonate |
|  | 0.25% glycosides or glucosides |
|  | 0.25% co-solvent |
|  | 0.15% disulfonate |
| 80 | 0.25% Guerbet alkoxylated carboxylate |
|  | 0.25% olefin sulfonate |
|  | 0.5% glycosides or glucosides |
|  | 0.25% co-solvent |
| 81 | 0.15% alkoxylated C12-C22 alcohol |
| 82 | 0.075% disulfonate |
|  | 0.075% alkoxylated C12-C22 alcohol |
| 83 | 0.75% alkoxylated C12-C22 alcohol |
|  | 0.75% disulfonate |
| 84 | 0.075% alkoxylated C12-C22 alcohol |
|  | 0.075% alkoxylated C6-C16 Guerbet alcohol |
| 85 | 0.15% alkoxylated C6-C16 Guerbet alcohol |
| 86 | 0.075% disulfonate |
|  | 0.075% alkoxylated C6-C16 Guerbet alcohol |
| 87 | 0.075% alkoxylated C6-C16 Guerbet alcohol |
|  | 0.075% disulfonate |
|  | 0.05% co-solvent |
| 88 | 0.1% alkoxylated C6-C16 alcohol |
|  | 0.05% disulfonate |
| 89 | 1% alkoxylated C6-C16 alcohol |
|  | 0.5% disulfonate |
| 90 | 0.075% alkoxylated C6-C16 Guerbet alcohol |
|  | 0.075% disulfonate |
| 91 | 0.075% alkoxylated C6-C16 Guerbet alcohol |
|  | 0.125% disulfonate |
| 92 | 0.075% alkoxylated C12-C22 alcohol |
|  | 0.125% disulfonate |
| 93 | 0.75% disulfonate |
|  | 0.75% alkoxylated C12-C22 alcohol |
| 94 | 0.75% alkoxylated C6-C16 Guerbet alcohol |
|  | 0.75% disulfonate |
| 95 | 0.1% alkoxylated C6-C16 Guerbet alcohol |
|  | 0.05% disulfonate |
| 96 | 0.75% disulfonate |
|  | 0.75% alkoxylated C6-C16 Guerbet alcohol |
| 97 | 0.75% alkoxylated C6-C16 alcohol |
|  | 0.75% disulfonate |
| 98 | 0.75% disulfonate |
|  | 0.75% alkoxylated C6-C16 alcohol |
| 99 | 0.1% alkoxylated C6-C16 alcohol |
|  | 0.05% disulfonate |
| 100 | 0.09% alkoxylated C6-C16 alcohol |
|  | 0.06% disulfonate |
| 101 | 0.1% alkoxylated C6-C16 alcohol |
|  | 0.1% disulfonate |
|  | 0.1% Guerbet alkoxylated carboxylate |
| 102 | 0.1% alkoxylated C6-C16 alcohol |
|  | 0.1% disulfonate |
| 103 | 0.65% Guerbet alkoxylated carboxylate |
|  | 0.35% olefin sulfonate |
|  | 0.33% alkoxylated alkylphenol |
|  | 0.5% co-solvent |
|  | 0.25% second co-solvent |
| 104 | 0.075% alkoxylated C6-C16 alcohol |
|  | 0.075% benzenesulfonic acid, decyl(sulfophenoxy)-disodium salt |
| 105 | 0.15% alkoxylated C6-C16 alcohol |
|  | 0.05% benzenesulfonic acid, decyl(sulfophenoxy)-disodium salt |
| 106 | 0.9% Guerbet alkoxylated carboxylate |
|  | 0.9% alkoxylated C6-C16 alcohol |
|  | 1.2% olefin sulfonate |
|  | 0.225% co-solvent |
|  | 2% sodium tetraborate |
|  | 1% acetic acid |
| 107 | 1% alkoxylated C6-C16 alcohol |
|  | 1% olefin sulfonate |
|  | 2% sodium tetraborate |
|  | 1% acetic acid |
| 108 | 1% alkoxylated C6-C16 alcohol |
|  | 0.75% olefin sulfonate |
|  | 0.5% disulfonate |
|  | 2% sodium tetraborate |
|  | 1% acetic acid |
| 109 | 1% alkoxylated C6-C16 alcohol |
|  | 0.75% olefin sulfonate |
|  | 0.3% disulfonate |
|  | 2% sodium tetraborate |
|  | 1% acetic acid |
| 110 | 0.5% alkoxylated C6-C16 alcohol |
|  | 0.85% olefin sulfonate |
|  | 0.15% disulfonate |

| Example | Surfactants and Co-Surfactants in Surfactant Package (in weight percent) |
|---------|---|
| 111 | 2% sodium tetraborate<br>1% acetic acid<br>0.9% Guerbet alkoxylated carboxylate<br>0.9% alkoxylated C6-C16 alcohol<br>1.2% olefin sulfonate<br>0.225% co-solvent |
| 112 | 2% sodium tetraborate<br>1% citric acid<br>1% alkoxylated C6-C16 alcohol<br>0.75% olefin sulfonate<br>0.3% disulfonate |
| 113 | 2% sodium tetraborate<br>1% citric acid<br>0.9% Guerbet alkoxylated carboxylate<br>0.9% alkoxylated C6-C16 alcohol<br>1.2% olefin sulfonate<br>0.225% co-solvent |
| 114 | 2% sodium tetraborate<br>1.1% citric acid<br>0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent |
| 115 | 2% sodium tetraborate<br>1% acetic acid<br>0.5% C6-C16 alcohol alkoxylated carboxylate<br>0.25% alkoxylated C6-C16 alcohol<br>0.15% olefin sulfonate<br>0.35% disulfonate |
| 116 | 2% sodium tetraborate<br>1% acetic acid<br>0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent<br>0.02% cetyl betaine |
| 117 | 2% sodium tetraborate<br>1% acetic acid<br>0.075% a first alkoxylated C6-C16 alcohol<br>0.075% a second alkoxylated C6-C16 alcohol<br>0.125% disulfonate |

In some embodiments, the one or more surfactants in the aqueous fluid can decrease the interfacial tension (IFT) of the aqueous fluid with hydrocarbons in the reservoir. Reducing the IFT can decrease pressure required to drive the aqueous fluid into the formation matrix. In addition, decreasing the IFT reduces water block during production, facilitating the flow of hydrocarbons from the formation to the wellbore (e.g., facilitating the flow of hydrocarbons back through the fractures and to the wellbore). In this way, hydrocarbon recovery can be facilitated by the one or more surfactants in the aqueous fluid.

In some embodiments, the one or more surfactants in the aqueous fluid can change the wettability of the reservoir. In particular, in embodiments where the reservoir is oil-wet or mixed-wet, the one or more surfactants in the aqueous fluid can make the reservoir more water-wet. By increasing the water-wetness of the reservoir, the formation will imbibe injected aqueous fluid into the formation matrix, leading to a corresponding flow of hydrocarbon from regions within the formation back to the fractures. In this way, hydrocarbon recovery can be facilitated by the one or more surfactants in the aqueous fluid.

Nanoparticles

In some embodiments, the aqueous fluid can include nanoparticles. The nanoparticles can include any of the component of the aqueous fluid described herein. For example, the nanoparticles can include a well treatment agent and a friction reducer. Other examples of suitable nanoparticles are described, for example, in U.S. Pat. No. 10,266,750, which is hereby incorporated by reference in its entirety.

By way of non-limiting illustration, examples of certain embodiments of the present disclosure are given below.

EXAMPLES

FIG. 1 illustrates methods for increasing fluid injection efficiency and generating improved uplift. During EOR operations, increasing formation surface area contacted by surfactants can lead to higher incremental oil recovery.

Figure 2:
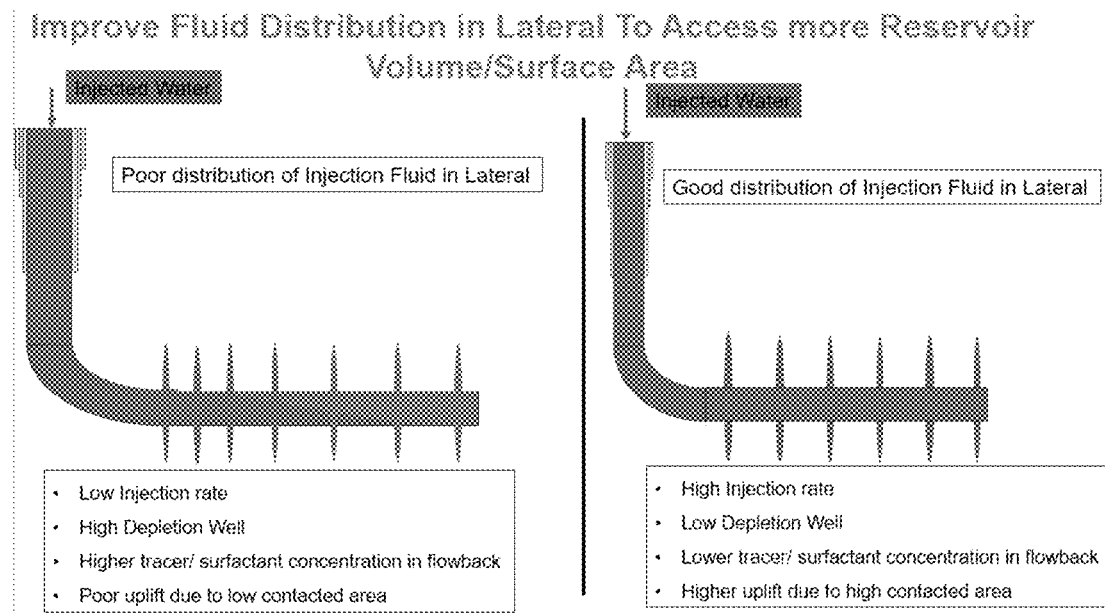
FIG. 2 shows a diagram to improve fluid distribution in lateral to access more reservoir volume/surface area.
Figure 3:
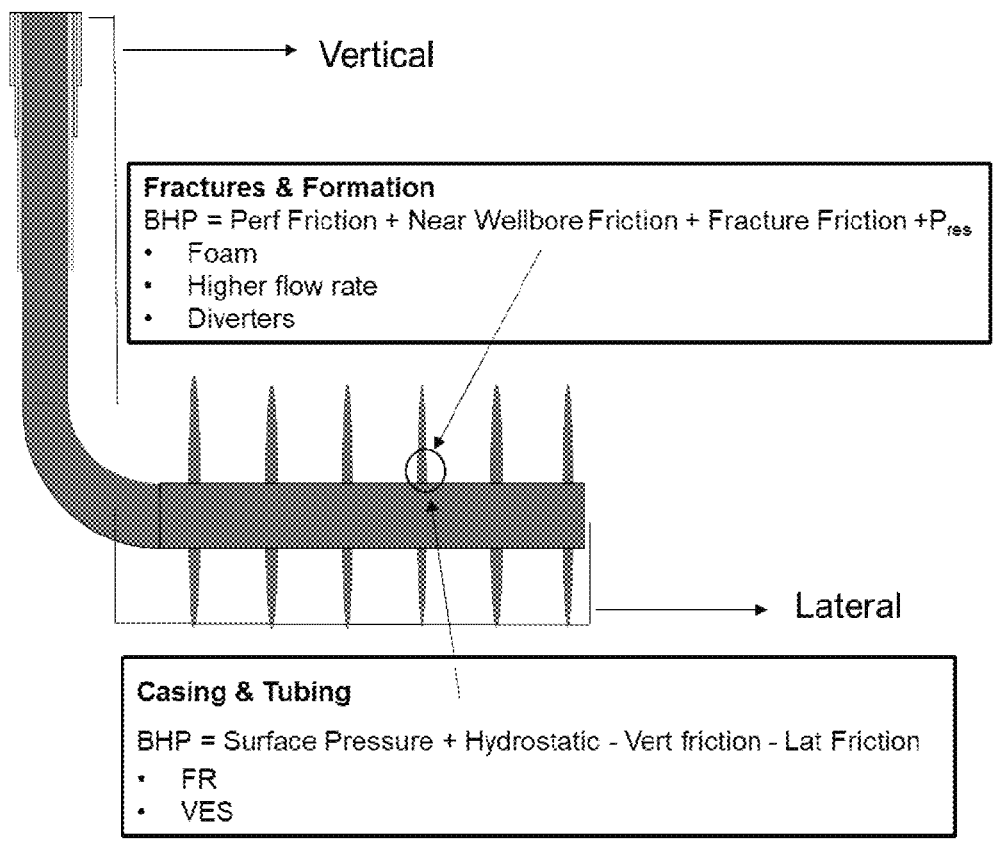
FIG. 3 shows a diagram of friction pressure components. VES in the figure refers to viscoelastic surfactant.
Figure 4:
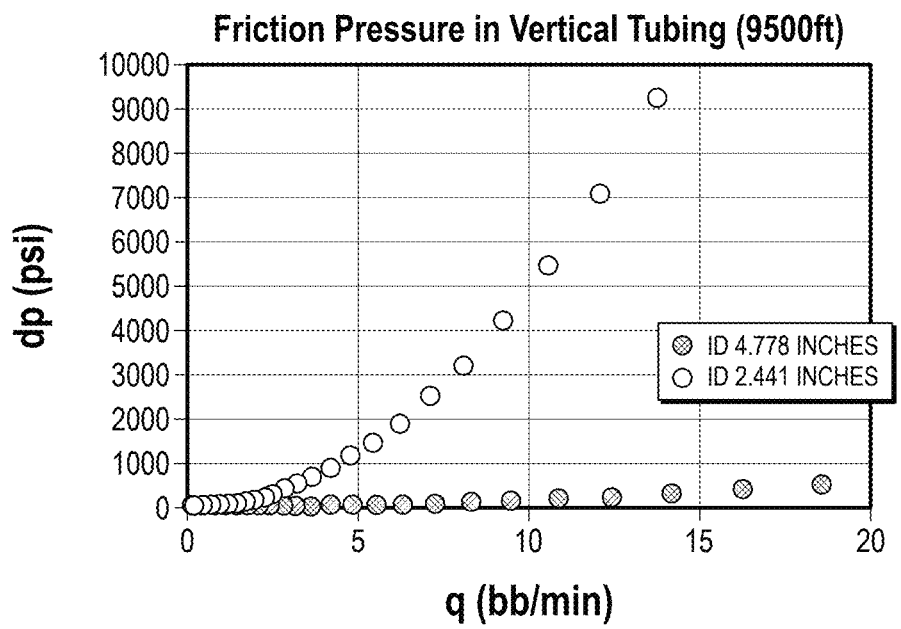
FIG. 4 shows a friction pressure profile in vertical tubing (9500 ft).
Figure 5:
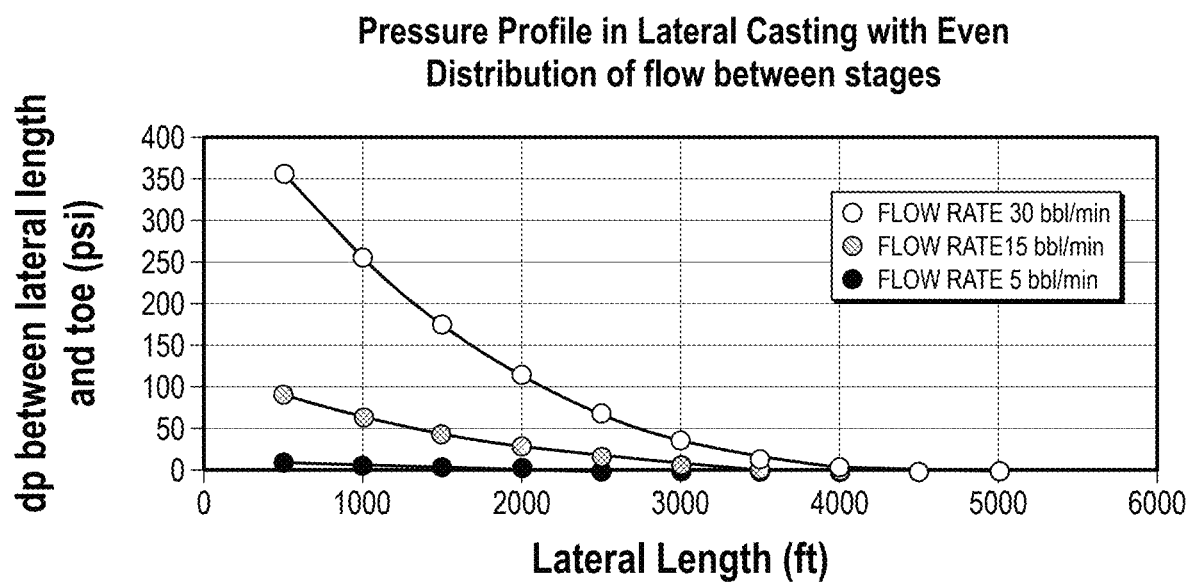
FIG. 5 shows a pressure profile in lateral casing with even distribution of flow between stages.
Figure 6A:
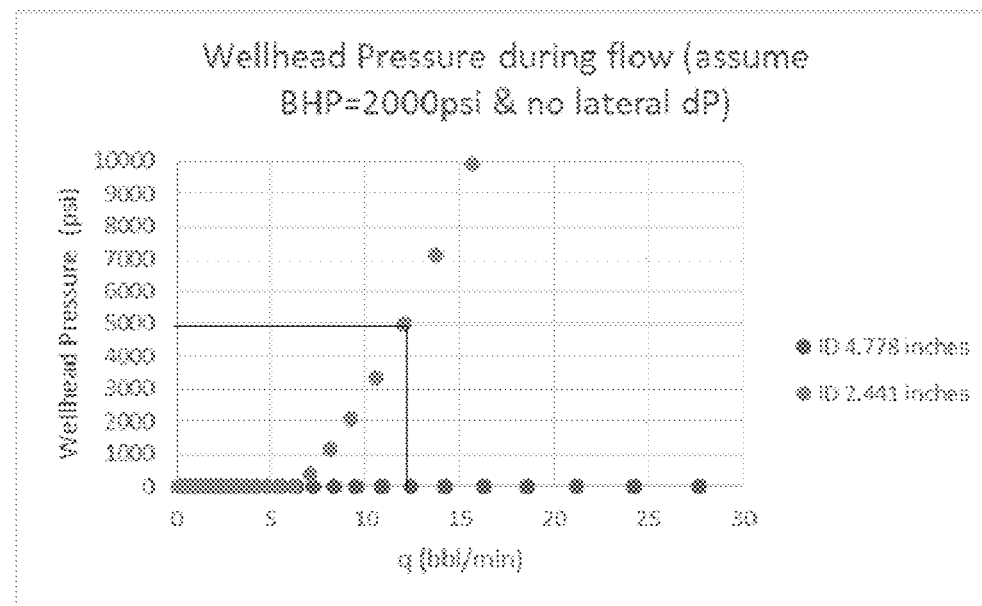
FIGS. 6A-6D show the vertical friction effect of water vs. friction reducer in well head pressure during flow (6A) with water at BHP of 2000 psi and no lateral-dP; (6B) with water at BHP of 4000 psi and no lateral-dP; (6C) with low concentration friction reducer at BHP of 2000 psi and no lateral-dP; (6D) with low concentration friction reducer at BHP of 4000 psi and no lateral-dP.
Figure 6B:
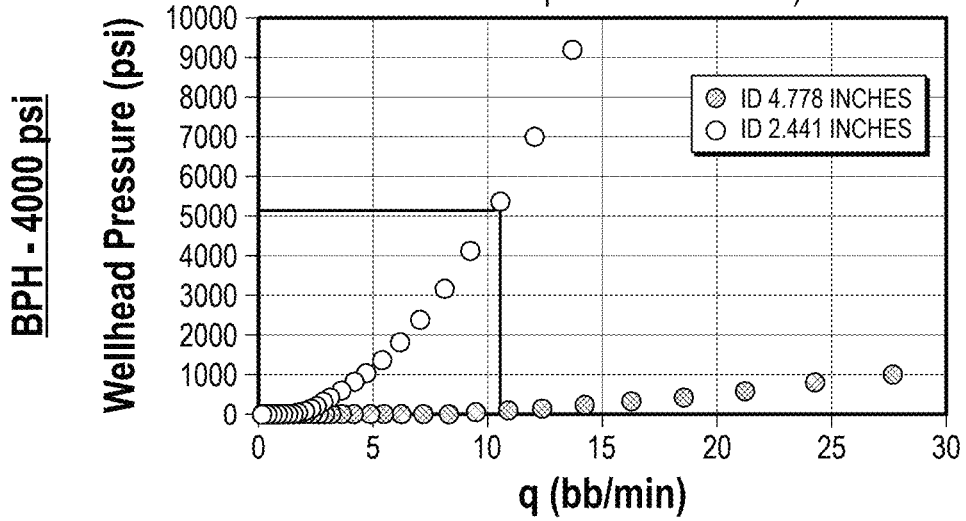
Figure 6C:
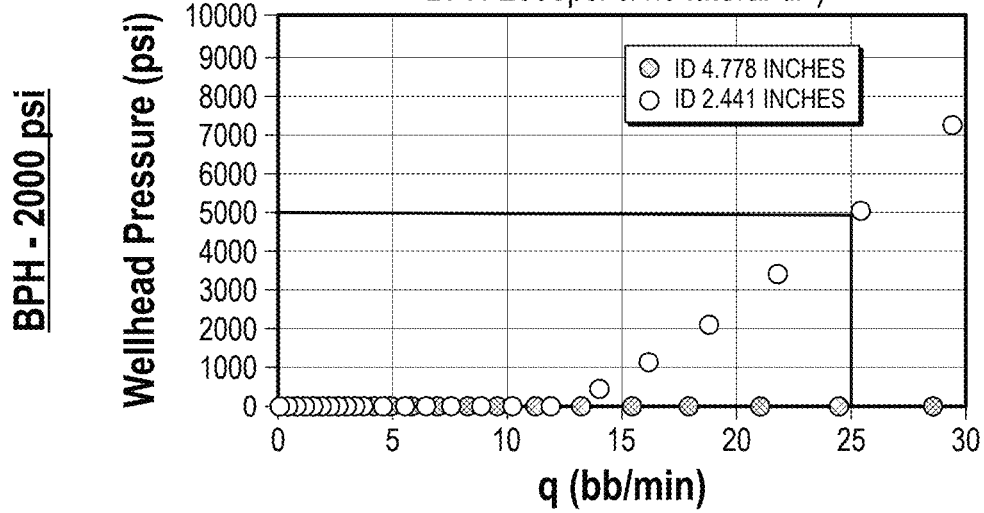
Figure 6D:
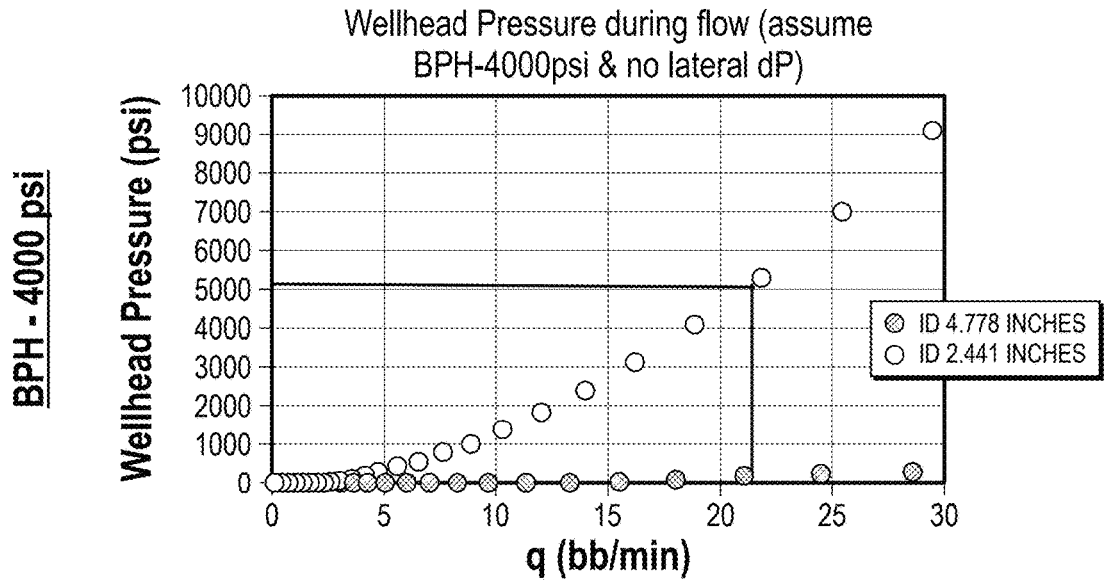
Figure 7:
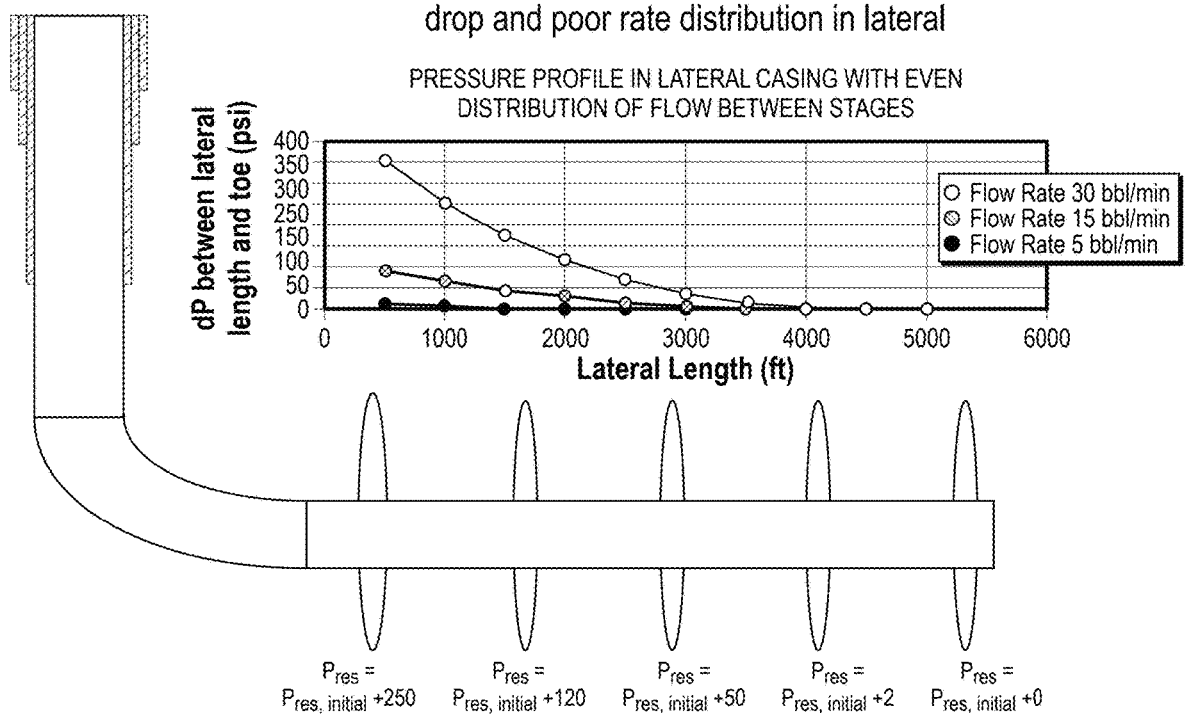
FIG. 7 shows a diagram and the pressure profile along lateral casing with even distribution of low between stages.

FIG. 3 illustrates an example wellbore having a vertical segment and a horizontal segment. Fluid distribution in a lateral segment of a wellbore is illustrated in FIG. 2. Fluid distribution in the lateral segment of the wellbore can be improved to access more reservoir volume/surface area. Left panel in FIG. 2 illustrates poor distribution of injection fluid in the lateral segment. Poor fluid distribution can lead to low injection rates, high depletion well, higher tracer/surfactant concentration in flowback, and/or poor uplift due to low contact area. Right panel in FIG. 2 illustrates good distribution of injection fluid in the lateral segment. Good fluid distribution can lead to high injection rates, low depletion well, lower tracer/surfactant concentration in flowback, and/or higher uplift due to high contact area. The friction pressure profile in vertical segment tubing (9500 ft) was measured for 4.778" ID and 2.441" ID results are shown in FIG. 4. A pressure profile for a lateral segment casing with even distribution of flow between stages was measured at different flow rates (5 bbl/min, 15 bbl/min, and 30 bbl/min) and results are shown in FIG. 5. Increasing injection rate without a friction reducer can lead to higher heel to toe pressure drop and poor rate distribution in a lateral segment of a wellbore as illustrated in FIG. 7.

Example 1: Faster Injection Rates

The vertical friction effect of adding a friction reducer was studied. The use of a friction reducer (HPAM) allows for higher injection rates and lower wellhead pressure. Injection (ESP) in a wellbore with a 4.778" ID casing showed that vertical pressure drop is not a factor in increasing injection rate from 15 bbl/min to 30 bbl/min (assuming overcoming erosional velocity concerns). Injection (Gas Lift) in a wellbore with a 2.441" ID tubing showed that vertical pressure drop is a factor in increasing injection rate from 7 bbl/min to 15 bbl/min (assuming overcoming erosional velocity concerns). Results for the vertical friction effect studies are shown in FIGS. 6A to 6D and Table 1. Results show that a low concentration of approximately 0.5 gpt to 1 gpt friction reducer (FR) can be used to reduce pressure drop.

TABLE 1

| | 4.778" ID | | 2.441" ID | |
|---|---|---|---|---|
| | Rate | | | |
| | 15 bbl/min | 30 bbl/min | 7 bbl/min | 15 bbl/min |
| Water | 350 psi | 1,400 psi | 2,500 psi | 12,000 psi |
| FR | 140 psi | 400 psi | 750 psi | 3,000 psi |

Example 2: Lower Pressure Drop in the Lateral Segment of a Wellbore

Pressure buildup during pressure pumping operations in each stage of a lateral wellbore correlates to the flowrate per stage. Other factors that contribute to pressure buildup include reservoir pressure and frictional losses in near wellbore area, perforation, fractures, etc. It is desired to have even distribution of water into each stage of the lateral wellbore. For example, decreasing flow rate as fluid goes toward toe section (10 stages in lateral would take 1 bbl/min each with injection rate=10 bbl/min).

Figure 8A:
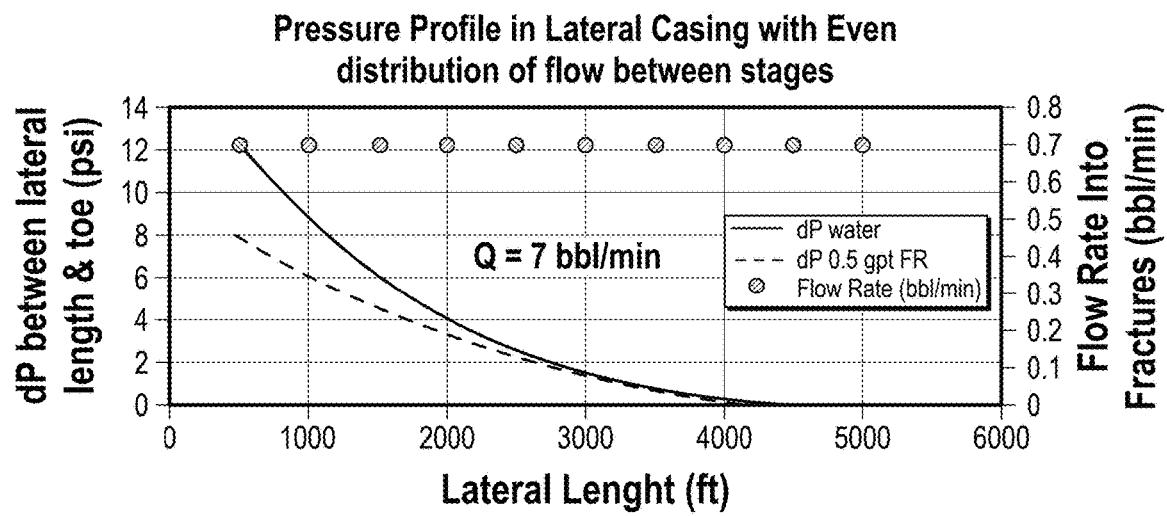
FIGS. 8A-8C show a pressure profile of the 1 mile lateral friction effect of water vs. friction reducer on the pressure in a lateral 4.778' ID casing with even distribution of flow between stages (8A) at injection rate of 7 bbl/min; (8B) at injection rate of 15 bbl/min; and (8C) at injection rate of 30 bbl/min.
Figure 8B:
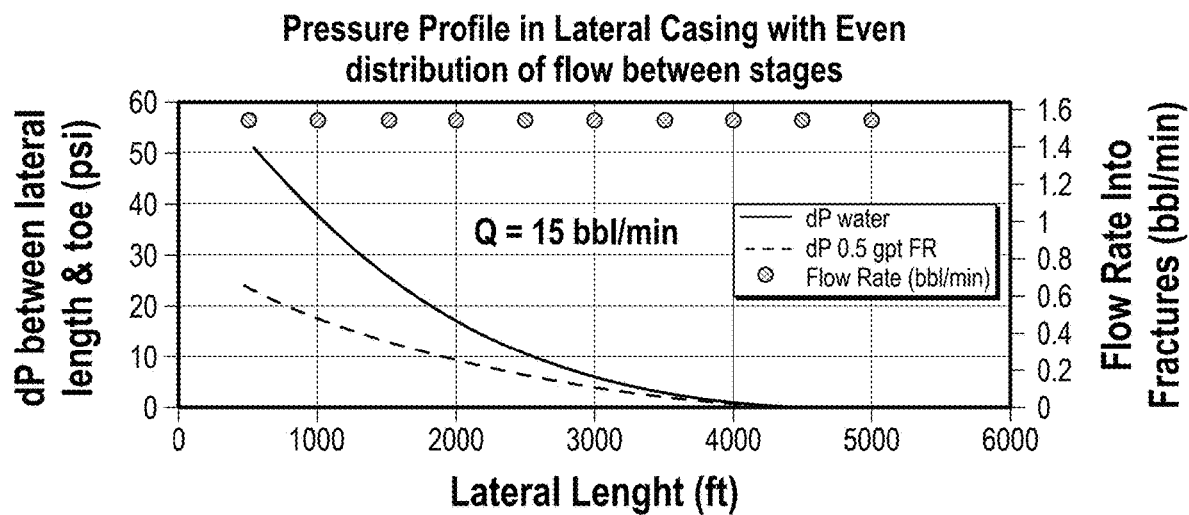
Figure 8C:
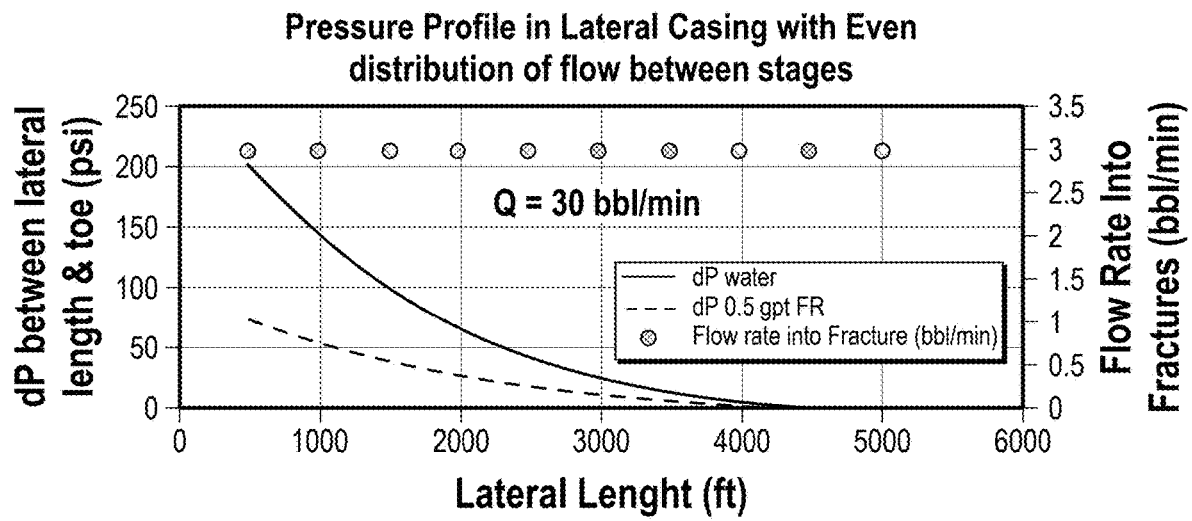

As demonstrated herein, using a friction reducer lowered pressure profile in a lateral segment of a wellbore showing improved fluid distribution in a lateral segment of a wellbore when compared to the pressure profile in a lateral segment of a wellbore at the same flow rate without a friction reducer. The lateral friction effect of injecting friction reducer versus water in a 4.778" ID casing for one-mile was studied. The results for the study demonstrate that lateral pressure drop is not a bottle-neck to increased flow rate (Q). In fact, the results show that the pressure drop in a lateral casing is small compared to a vertical casing/tubing (see FIGS. 8A to 8C).

Figure 9A:
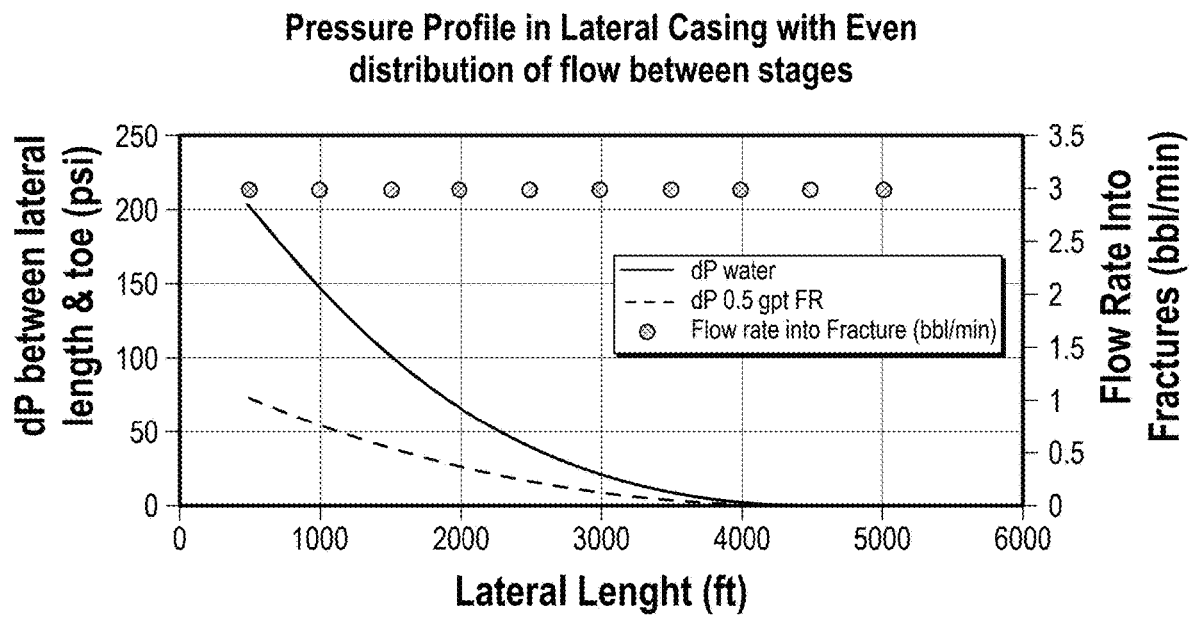
FIGS. 9A-9B show a pressure profile of 1 vs. 2 mile lateral friction effect on the pressure in a lateral 4.778' ID casing with even distribution of flow between stages and flow rate (Q) of 30 bbl/min casing with even distribution of flow between stages (9A) 1 mile lateral; and (9B) 2 miles lateral.
Figure 9B:
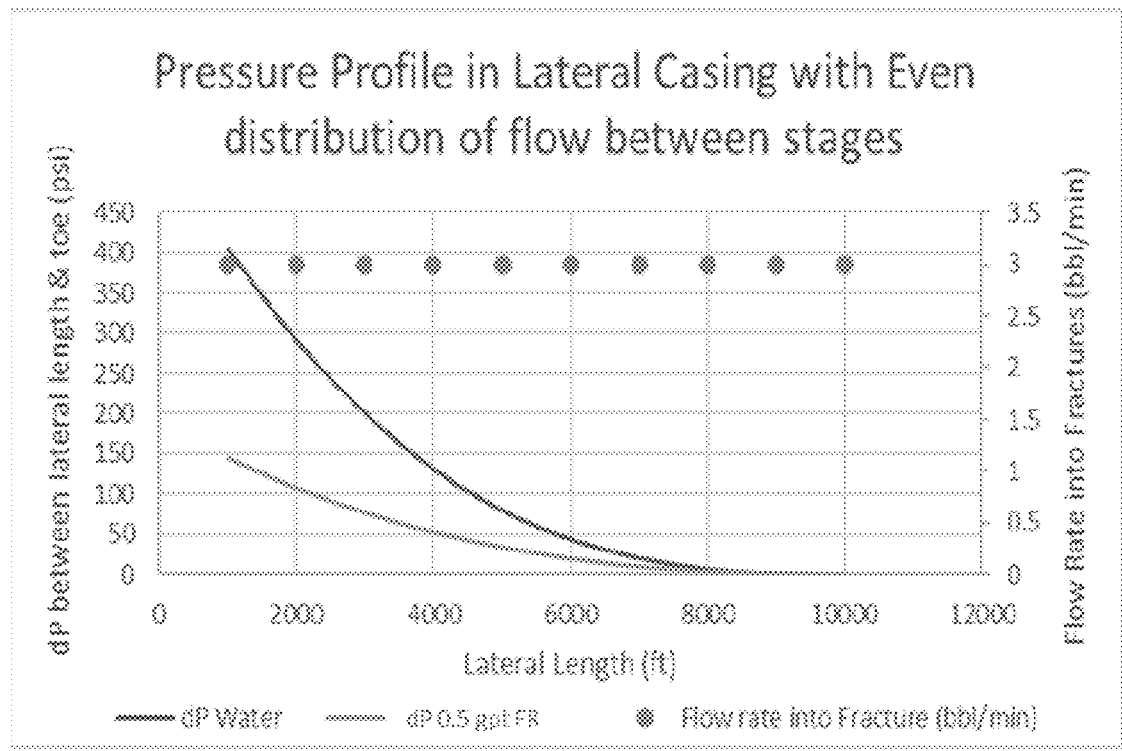
Figure 10:
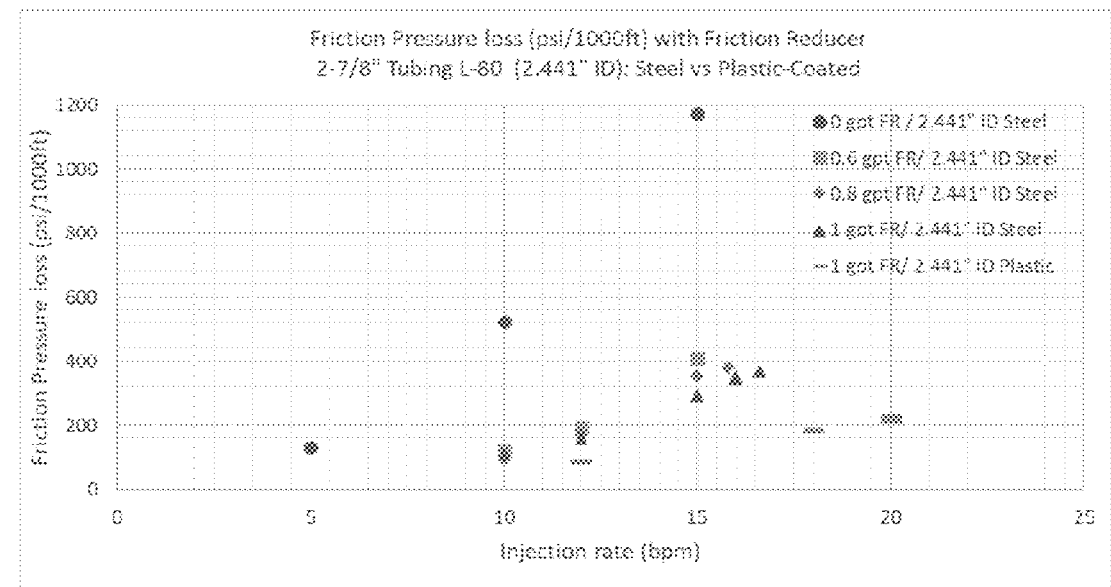
FIG. 10 shows a graph of friction pressure loss versus injection rate when using different friction reducer concentrations and different tubing/casing roughness on friction reduction.
Figure 11:
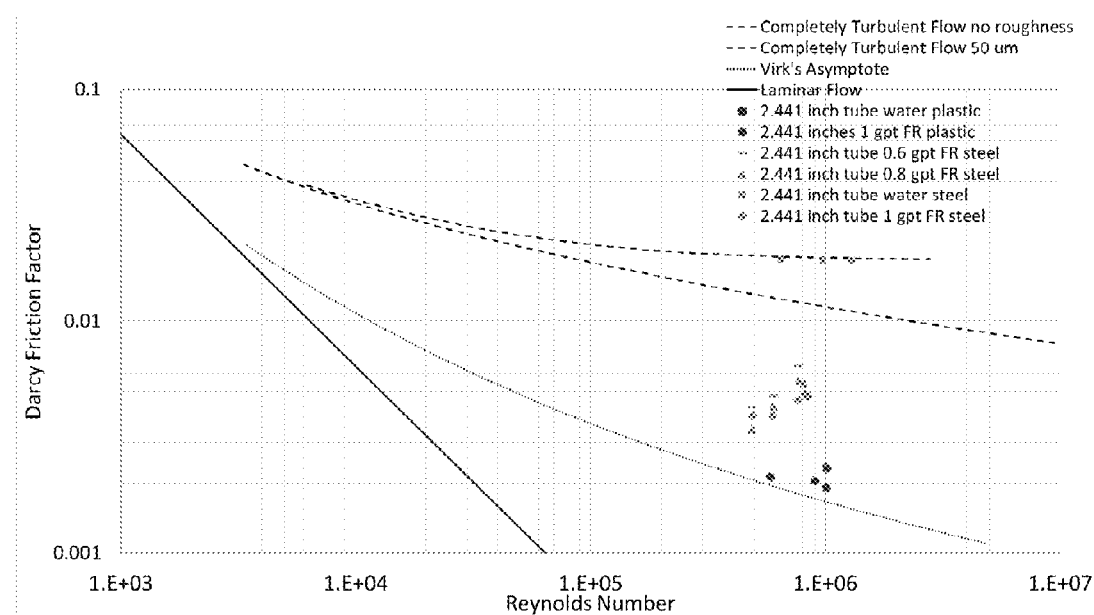
FIG. 11 shows a graph of Darcy friction factor versus Reynolds number when using different friction reducer concentrations and different tubing/casing roughness on friction reduction.

The lateral friction effect of injecting a friction reducer versus water in a 4.778" ID casing for 1 mile versus 2 miles with a flow rate of 30 bbl/min was also tested. The results demonstrate that fluid distribution in the lateral section of a wellbore is better with a friction reducer than without a friction reducer. Results show that there is less backpressure required for even flow through each stage. In fact, the benefit of injecting a friction reducer in the lateral section is bigger at higher flow rates and longer lateral length. Results for the 1 mile versus 2 miles lateral friction effect studies of water versus friction reducer are shown in FIGS. 9A to 9B.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

What is claimed is:

1. A method of decreasing pressure drop along a lateral segment of a wellbore in an unconventional subterranean formation, the method comprising:
   injecting an aqueous fluid into the unconventional subterranean formation via the wellbore in fluid communication with the unconventional subterranean formation, wherein the aqueous fluid comprises:
   (i) a well treatment agent; and
   (ii) a friction reducer in a concentration of from 0.1 gpt to 5 gpt;
   wherein injection of the aqueous fluid decreases pressure drop along the lateral segment of the wellbore;
   wherein the decrease in pressure drop along the lateral segment of the wellbore is measured as a drag reduction percentage (DR %) calculated using the equation below:

$$DR\ \% = \frac{dP_{water} - dP_{FR}}{dP_{water}} * 100\%,$$

wherein $dP_{water}$ is the calculated value for pressure drop along the lateral segment of the wellbore for water, and $dP_{FR}$ is the pressure drop along the later segment of the wellbore for the aqueous fluid;
   wherein the drag reduction percentage (DR %) is from 50% to 95%.

2. The method of claim 1, wherein the decrease in pressure drop along the lateral segment of the wellbore improves fluid distribution along the lateral segment and into a toe of the wellbore;
   wherein the pressure drop along the lateral segment of the wellbore is calculated using the equation below:

$$dP_{FR} = dP_{water} - (DR \times dP_{water}),$$

wherein drag reduction factor (DR) ranges from 0.5 to about 0.95, wherein $dP_{water}$ is the calculated value for pressure drop along the lateral segment of the wellbore for water, and $dP_{FR}$ is the pressure drop along the later segment of the wellbore for the aqueous fluid.

3. The method of claim 1, wherein the pressure drop along the lateral segment of the wellbore when the aqueous fluid is injected is from 10 psi/1000 ft to 600 psi/1000 ft.

4. The method of claim 1, wherein the method further comprises producing a hydrocarbon from the wellbore.

5. The method of claim 1, wherein the wellbore comprises tubing having an inner diameter of from 1.5 inches to less than 4 inches, casing having an inner diameter of from 4 inches to 9 inches, or any combination thereof.

6. The method of claim 5, wherein the tubing comprises a coating layer having a roughness of from 1 µm to 50 µm.

7. The method of claim 6, wherein the coating layer comprises a coating material comprising a thermoplastic material, a ceramic material, or any combination thereof.

8. The method of claim 1, wherein the aqueous fluid comprises an anionic surfactant and a non-ionic surfactant.

9. The method of claim 8, wherein the anionic surfactant comprises a disulfonate surfactant.

10. The method of claim 8, wherein the non-ionic surfactant comprises one or more alkoxylated alcohols.

11. The method of claim 1, wherein the friction reducer comprises a synthetic polymer selected from polyacrylamides, polyacrylic acid (PAA), polyvinyl alcohol (PVA), co-polymers of polyacrylamide (PAM) and 2-acrylamido 2-methylpropane sulfonic acid, or any combination thereof.

12. The method of claim 1, wherein the aqueous fluid comprises an alkoxylated C6-C32 alcohol, a disulfonate, and a polyacrylamide.

13. The method of claim 1, wherein the wellbore has a reservoir pressure that is less than original reservoir pressure.

14. The method of claim 1, wherein the aqueous fluid is injected at a pressure and flowrate effective to increase a wellbore pressure without substantially fracturing or refracturing the wellbore.

15. The method of claim 14, wherein the wellbore pressure is from 20% to 70% of an original reservoir pressure prior to injection of the aqueous fluid.

16. The method of claim 14, wherein injection of the aqueous fluid comprises injecting the aqueous fluid at a pressure and flowrate effective to increase the wellbore pressure by at least 30%, to increase the wellbore pressure to from greater than an original reservoir pressure to 150% of the original reservoir pressure, to increase the wellbore pressure to within 15% of original reservoir fracture pressure, or any combination thereof.

17. The method of claim 14, wherein the method further comprises injecting a fracturing fluid into the unconventional subterranean formation via a new wellbore at a sufficient pressure to create or extend at least one fracture in the unconventional subterranean formation.

18. The method of claim 17, wherein injection of the aqueous fluid comprises injecting the aqueous fluid into the unconventional subterranean formation via the wellbore at least 1 day before injecting the fracturing fluid into the unconventional subterranean formation via the new wellbore.

19. The method of claim 1, wherein injection of the aqueous fluid in the wellbore increases a relative permeability in a region of the unconventional subterranean formation proximate to the wellbore, optionally wherein injection of the aqueous fluid in the wellbore releases hydrocarbons from pores in the region of the unconventional subterranean formation proximate to the wellbore.

20. The method of claim 1, wherein the method further comprises modeling the wellbore to determine a volume of the aqueous fluid to be injected into the unconventional subterranean formation via the wellbore.

21. The method of claim 1, wherein the method further results in increased hydrocarbon recovery from the wellbore, a new wellbore of the unconventional subterranean formation, or any combination thereof.

22. The method of claim 1, wherein the method further comprises allowing the aqueous fluid to imbibe into the unconventional subterranean formation for a period of time.

23. The method of claim 1, wherein the method further comprises monitoring a fluid distribution in the wellbore using a production logging tool, fiber optics equipment, or any combination thereof.

24. The method of claim 1, wherein the well treatment agent comprises one or more of an acid, an alkali agent, a polymer, a gelling agent, a crosslinker, a biocide, a scale inhibitor, a breaker, a pH adjusting agent, a non-emulsifier agent, an iron control agent, a chelating agent, a corrosion inhibitor, a clay stabilizing agent, a wettability alteration chemical, an anti-foam agent, a sulfide scavenger, a mobility control agent, a co-solvent, a surfactant, a surfactant package, or any combination thereof.

25. A method of improving fluid distribution along a lateral segment of a wellbore and into a toe of the wellbore in an unconventional subterranean formation, the method comprising:
    injecting an aqueous fluid into the unconventional subterranean formation via the wellbore in fluid communication with the unconventional subterranean formation, wherein the aqueous fluid comprises:
    (i) a well treatment agent; and
    (ii) a friction reducer in a concentration of from 0.1 to 5 gpt;
    wherein injection of the aqueous fluid decreases pressure drop along the lateral segment of the wellbore;
    wherein the decrease in pressure drop along the lateral segment of the wellbore improves fluid distribution along the lateral segment and into the toe of the wellbore;
    wherein the pressure drop along the lateral segment of the wellbore is calculated using the equation below:

$$dP_{FR}=dP_{water}-(DR \times dP \text{ water}),$$

wherein drag reduction factor (DR) ranges from 0.5 to 0.95, wherein $dP_{water}$ is the calculated value for pressure drop along the lateral segment of the wellbore for water, and $dP_{FR}$ is the pressure drop along the later segment of the wellbore for the aqueous fluid.

* * * * *

UNITED STATES PATENT AND TRADEMARK OFFICE
CERTIFICATE OF CORRECTION

PATENT NO. : 12,352,149 B2
APPLICATION NO. : 18/326409
DATED : July 8, 2025
INVENTOR(S) : Gojko Matovic et al.

Page 1 of 1

It is certified that error appears in the above-identified patent and that said Letters Patent is hereby corrected as shown below:

In the Claims

In Claim 25, Column 58, Line 32, replace "$dP_{FR}=dP_{water}-(DR \times dP \text{ water})$," with -- $dP_{FR} = dP_{water} - (DR \times dP_{water})$, --

Signed and Sealed this
Nineteenth Day of August, 2025

Coke Morgan Stewart
*Acting Director of the United States Patent and Trademark Office*